(12) United States Patent
Marutani et al.

(10) Patent No.: US 10,159,942 B2
(45) Date of Patent: Dec. 25, 2018

(54) SEPARATION MEMBRANE, SHEET CHANNEL MATERIAL, AND SEPARATION MEMBRANE ELEMENT

(71) Applicant: TORAY INDUSTRIES, INC., Tokyo (JP)

(72) Inventors: Yoshie Marutani, Shiga (JP); Hiroyuki Yamada, Shiga (JP); Hiroho Hirozawa, Shiga (JP); Kentaro Takagi, Shiga (JP); Yoshiki Okamoto, Shiga (JP); Shunsuke Tabayashi, Ehime (JP); Hiroshi Umetani, Shiga (JP); Akira Katayama, Ehime (JP); Takao Sasaki, Shiga (JP); Masahiro Kimura, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 160 days.

(21) Appl. No.: 15/115,325

(22) PCT Filed: Jan. 29, 2015

(86) PCT No.: PCT/JP2015/052596
§ 371 (c)(1),
(2) Date: Jul. 29, 2016

(87) PCT Pub. No.: WO2015/115575
PCT Pub. Date: Aug. 6, 2015

(65) Prior Publication Data
US 2017/0001154 A1 Jan. 5, 2017

(30) Foreign Application Priority Data

Jan. 31, 2014 (JP) .................................. 2014-016973
Jan. 31, 2014 (JP) .................................. 2014-017889

(51) Int. Cl.
*B01D 69/12* (2006.01)
*B01D 63/10* (2006.01)
(Continued)

(52) U.S. Cl.
CPC ........... *B01D 69/12* (2013.01); *B01D 63/082* (2013.01); *B01D 63/10* (2013.01); *B01D 63/103* (2013.01);
(Continued)

(58) Field of Classification Search
None
See application file for complete search history.

(56) References Cited

U.S. PATENT DOCUMENTS

2008/0190838 A1   8/2008  Beppu et al.
2012/0261333 A1  10/2012  Moran et al.
(Continued)

FOREIGN PATENT DOCUMENTS

CN   101098745 A    1/2008
JP   53-124179 A   10/1978
(Continued)

OTHER PUBLICATIONS

Cystallization characteristics of polypropylene.pdf—"The crystallization characteristics of polypropylene and low ethylene content polypropylene copolymer with copolyesters"—Ou, Cheng-Fang—European Polymer Journal 38 (2002) 467-473 (Year: 2002).*

(Continued)

*Primary Examiner* — Krishnan S Menon
*Assistant Examiner* — Bradley R Spies
(74) *Attorney, Agent, or Firm* — Birch, Stewart, Kolasch & Birch, LLP

(57) ABSTRACT

The present invention provides a separation membrane and a separation membrane element capable of exhibiting a good water production performance even at a high temperature and also excellent handleability and quality. The separation membrane of the present invention includes a separation membrane main body having a feed-side face and a permeate-side face; and a permeate-side channel member fixed (Continued)

onto the permeate-side face of the separation membrane main body, and the permeate-side channel member includes polypropylene as a main component and satisfies the following requirements (a) to (c): (a) a softening point temperature is 60° C. or higher; (b) a tensile elongation in a standard state is 10% or more; and (c) a yield point stress under a wet condition at 50° C. is 2 MPa or more.

25 Claims, 15 Drawing Sheets

(51) Int. Cl.
    *B32B 27/06*     (2006.01)
    *B01D 65/00*     (2006.01)
    *B32B 27/32*     (2006.01)
    *B01D 63/08*     (2006.01)
    *B01D 67/00*     (2006.01)

(52) U.S. Cl.
    CPC ....... *B01D 65/003* (2013.01); *B01D 67/0013* (2013.01); *B32B 27/06* (2013.01); *B32B 27/32* (2013.01); *B01D 2313/146* (2013.01); *B01D 2323/08* (2013.01); *B01D 2325/22* (2013.01); *B01D 2325/24* (2013.01); *B32B 2307/54* (2013.01); *B32B 2307/724* (2013.01); *B32B 2307/726* (2013.01)

(56) References Cited

U.S. PATENT DOCUMENTS

2013/0101797 A1*   4/2013   Dontula ............... B01D 63/103
                                                                         428/157

2014/0224726 A1   8/2014   Kimura et al.
2014/0251896 A1   9/2014   Hirozawa et al.

FOREIGN PATENT DOCUMENTS

| JP | 1-288303 A | 11/1989 |
|---|---|---|
| JP | 9-29071 A | 2/1997 |
| JP | 2012-40487 A | 3/2012 |
| JP | 2012-161748 A | 8/2012 |
| WO | WO 2011/152484 A1 | 12/2011 |
| WO | WO 2012/142429 A2 | 10/2012 |
| WO | WO 2013/047746 A1 | 4/2013 |

OTHER PUBLICATIONS

Properties of Polymers Tables.pdf—"Properties of Polymers—Their Correlation with Chemical Structure; Their Numerical Estimation . . . " 4th, Completely Revised Edition—Krevelen, D.W. van et al—Elsevier—pp. 456-457 and 849-850; Tables 13.12 and 26.2 (Year: 2009).*
"Tensile and impact behavior of polypropylene-low density polyethylene blends"—Strapasson, R. et al—Polymer Testing 24 (2005) 468-473 (Year: 2005).*
Chinese Office Action and Search Report, dated May 4, 2017, for Chinese Application No. 201580006705.7, along with an English translation.
International Search Report, issued in PCT/JP2015/052596, PCT/ISA/210, dated Apr. 7, 2015.
Written Opinion of the International Searching Authority, issued in PCT/JP2015/052596, PCT/ISA/237, dated Apr. 7, 2015.
Japanese Office Action, dated Jun. 19, 2018, for Japanese Application No. 2015-511750, along with an English translation.

* cited by examiner

SEPARATION MEMBRANE, SHEET CHANNEL MATERIAL, AND SEPARATION MEMBRANE ELEMENT

TECHNICAL FIELD

The present invention relates to a separation membrane, a sheet channel member, and a separation membrane element for use in separation of ingredients contained in a fluid such as liquid and gas. More specifically, the present invention relates to a separation membrane, a sheet channel member, and a separation membrane element having good process passing property and having stable performance even under a high-temperature condition.

BACKGROUND ART

For separating ingredients contained in a fluid such as liquid and gas, various methods have been proposed. For example, in the recent technique for removal of ionic substances contained in seawater, brackish water, or the like, separation methods utilizing separation membrane elements have found increasing uses as processes for energy savings and conservation of resources.

Separation membranes adopted in the separation methods utilizing separation membrane elements are classified into groups of microfiltration membranes, ultrafiltration membranes, nanofiltration membranes, reverse osmosis membranes, forward osmosis membranes, and the like, based on their pore sizes and separation performance and so on. These membranes have been used in, for example, production of drinkable water from seawater, brackish water, or water containing deleterious substances, production of ultrapure water for industrial uses, effluent treatment, recovery of valuable substances, or the like, and membranes to be used therein have been changed to suit the ingredients targeted for separation and separation performance requirements.

Separation membrane elements have commonality in the sense that a raw fluid is fed to one surface of a separation membrane and a permeated fluid is obtained from the other surface of the separation membrane. By having a plurality of separation membranes tied in a bundle, each separation membrane element is configured to secure a large membrane area to give a large amount of a permeated fluid per the unit element, and various types of elements, such as those of a spiral type, a hollow fiber type, a plate-and-frame type, a rotating flat-membrane type, and a flat-membrane integration type, have been produced in accordance with their intended uses and purposes.

For example, spiral-type separation membrane elements have been widely used in reverse osmosis filtration. The spiral-type separation membrane element is provided with a perforated water collection tube, a feed-side channel member for feeding a raw fluid to a separation membrane, a separation membrane for separating ingredients contained in the raw fluid, and a permeate-side channel member for leading the permeated fluid that has permeated through the separation membrane toward the perforated water collection tube. The feed-side channel member, the separation membrane, and the permeate-side channel member are wound around the perforated water collection tube. The spiral-type separation membrane element applies a pressure to a raw fluid, thereby enabling a permeated fluid in greater quantity to be taken out, and is therefore used widely.

With the recent increase in the demand for reduction in water production cost, a need for cost reduction in producing separation membrane elements is increasing, and cost reduction by improving separation membranes, respective channel members, and separation membrane element members has been proposed. For example, in Patent Documents 1 to 3, in a spiral-type separation membrane element, there are provided channel members arranged in a dot-like or strip-like pattern on the front surface or the back surface of a flat membrane. In Patent Document 4, a channel member formed of a fibrous substance is arranged on a sheet.

BACKGROUND ART DOCUMENT

Patent Document

Patent Document 1: WO 2011/152484
Patent Document 2: JP-A-2012-40487
Patent Document 3: JP-A-2012-161748
Patent Document 4: WO 2012/142429

SUMMARY OF THE INVENTION

Problems that the Invention is to Solve

However, the separation membrane elements described in Patent Documents 1 to 4 can attain high-performance water production and safety operation by driving them under a pressure condition, but on the other hand, the separation membrane or the sheet channel member that is the constituent member of the separation membrane element is high in brittleness, and the handleability and quality thereof are problematic. In addition, in driving under a high-temperature condition, a performance variation is problematic.

Given the situation, an object of the present invention is to provide a separation membrane or a sheet channel member that is excellent in handleability and quality while exhibiting good water production performance even when driven under a low-pressure/high-temperature condition.

Means for Solving the Problems

The present inventors have assiduously studied for the purpose of solving the above-described problems and, as a result, have succeeded in obtaining a separation membrane or a sheet channel member capable of exhibiting good performances even under a high-temperature condition while securing handleability, storage stability, and process passing property of the separation membrane or sheet channel member, leading to accomplishment of the present invention.

Namely, gist of the present invention includes the following configurations.

A first invention is a separation membrane including: a separation membrane main body having a feed-side face and a permeate-side face; and a permeate-side channel member fixed onto the permeate-side face of the separation membrane main body, in which the permeate-side channel member includes polypropylene as a main component and satisfies the following requirements (a) to (c):

(a) a softening point temperature is 60° C. or higher;
(b) a tensile elongation in a standard state is 10% or more; and
(c) a yield point stress under a wet condition at 50° C. is 2 MPa or more.

A second invention is the separation membrane according to the first invention, in which a composition constituting the permeate-side channel member satisfies the following requirement (d) or (e):

(d) a crystallization peak temperature of the composition as measured with a differential scanning calorimeter (DSC) is 30° C. or higher; or (e) in a case where an exothermic peak based on crystallization cannot be confirmed with DSC, a half-crystallization time at 30° C. is 10 minutes or less.

A third invention is the separation membrane according to the first or second invention, in which the separation membrane main body includes a substrate, a porous supporting layer formed on the substrate, and a separation functional layer formed on the porous supporting layer.

A fourth invention is a sheet channel member having projections fixed to a sheet, in which the projections include polypropylene as a main component and satisfy the following requirements (a) to (c):

(a) a softening point temperature is 60° C. or higher;
(b) a tensile elongation in a standard state is 10% or more; and
(c) a yield point stress under a wet condition at 50° C. is 2 MPa or more.

A fifth invention is the sheet channel member according to the fourth invention, in which a composition constituting the projections satisfies the following requirement (d) or (e):

(d) a crystallization peak temperature of the composition as measured with a differential scanning calorimeter (DSC) is 30° C. or higher; or (e) in a case where an exothermic peak based on crystallization cannot be confirmed with DSC, a half-crystallization time at 30° C. is 10 minutes or less.

A sixth invention is a separation membrane element including a water collection tube and an envelope-shaped membrane wound around the water collection tube from an open side of the membrane, in which, in the envelope-shaped membrane, the separation membrane(s) according to any one of the first to third inventions is/are arranged such that the permeate-side faces thereof face to each other, and at least both edges in a width direction on the permeate-side faces of the separation membrane(s) are sealed by sealing parts.

A seventh invention is a separation membrane element including a water collection tube and an envelope-shaped membrane wound around the water collection tube from an open side of the membrane, in which, in the envelope-shaped membrane, a separation membrane main body(ies) having a feed-side face and a permeate-side face is/are arranged such that the permeate-side faces thereof face to each other via the sheet channel member according to the fourth or fifth invention, and at least both edges in a width direction on the permeate-side faces are sealed by sealing parts.

An eighth invention is the separation membrane element according to the seventh invention, in which the separation membrane main body includes a substrate, a porous supporting layer formed on the substrate, and a separation functional layer formed on the porous supporting layer.

A ninth invention is the separation membrane element according to any one of the sixth to eighth inventions, in which the sealing part is formed by an adhesive.

A tenth invention is the separation membrane element according to any one of the sixth to ninth inventions, in which a projected view of the sealing part includes a plurality of asperities, and a variation coefficient of widths of the asperities is 10% or less.

An eleventh invention is the separation membrane element according to the tenth invention, in which a width of the sealing part is 5 mm or more and 60 mm or less.

A twelfth invention is the separation membrane element according to any one of the sixth to eleventh inventions, in which when the envelope-shaped membrane is equally bisected so as to be orthogonal to a lengthwise direction thereof, a difference in projected area of the sealing parts provided on the both edges in the width direction of the separation membrane as compared while making a parting line as an axis of symmetry is 15% or less.

A thirteenth invention is the separation membrane element according to any one of the sixth to twelfth inventions, in which when the envelope-shaped membrane is equally bisected so as to be orthogonal to the width direction thereof, a difference in projected area of the sealing parts as compared while making a parting line as an axis of symmetry is 15% or less.

Advantage of the Invention

According to the present invention, when polypropylene is contained in a component constituting a permeate-side channel member, and a softening point temperature, a tensile elongation, and a yield point stress under a wet condition at 50° C. of the channel member satisfy specified requirements, not only handleability and storage stability of a separation membrane or a sheet channel member become good, but also a separation membrane element exhibiting a stable performance even in operation under a high-temperature condition can be obtained.

MODE FOR CARRYING OUT THE INVENTION

The separation membrane, the sheet channel member, and the separation membrane element of the present invention are hereunder described in detail.
<First Embodiment>
1. Separation Membrane As the separation membrane that is used for the separation membrane element of the present invention, separation membranes of various embodiments as described below are applicable. Various embodiments are described with reference to the accompanying drawings, but in the following, the same elements described in different drawings may be given the same numeral reference signs, and the description thereof given in one drawing may be omitted in the other drawings.
(1-1) Outline The separation membrane refers to a membrane which makes it possible to separate ingredients contained in fluid fed to the surface of the separation membrane and to obtain a permeated fluid having permeated through the separation membrane. The separation membrane includes a separation membrane main body and a channel member arranged on the separation membrane main body.

Figure 1:
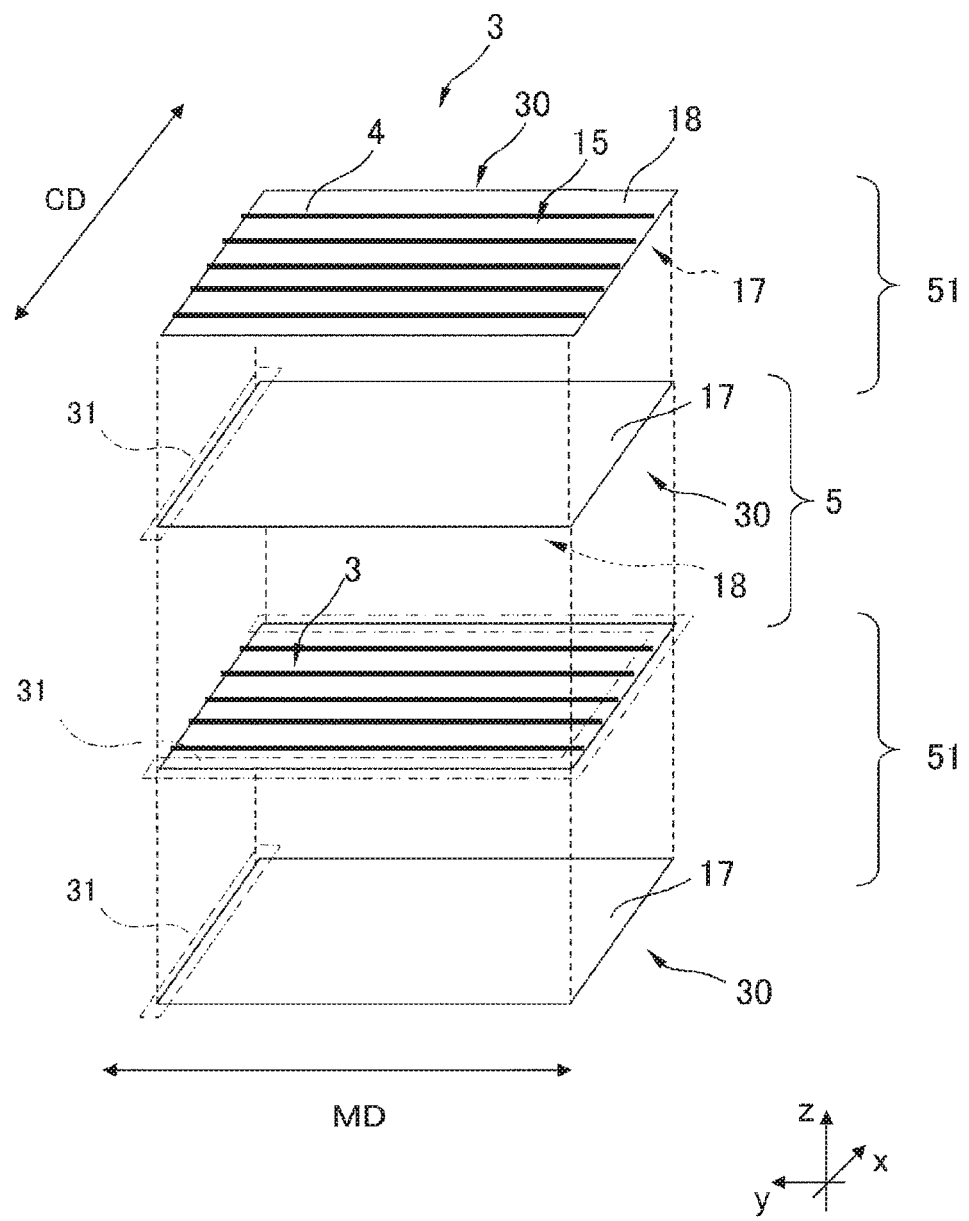
FIG. 1 is an exploded perspective view showing one configuration of an envelope-shaped membrane.

As an example of such a separation membrane, an exploded perspective view of an envelope-shaped membrane including one example of the present embodiment and a separation membrane leaf (hereinafter also referred to as simply as "leaf") is shown in FIG. 1. As shown in FIG. 1, a separation membrane 3 includes a separation membrane main body 30 and a permeate-side channel member 4. The separation membrane main body 30 has a feed-side face 17 and a permeate-side face 18, and the permeate-side channel member 4 is fixed onto the permeate-side face 18 of the separation membrane main body 30.

Figure 2:
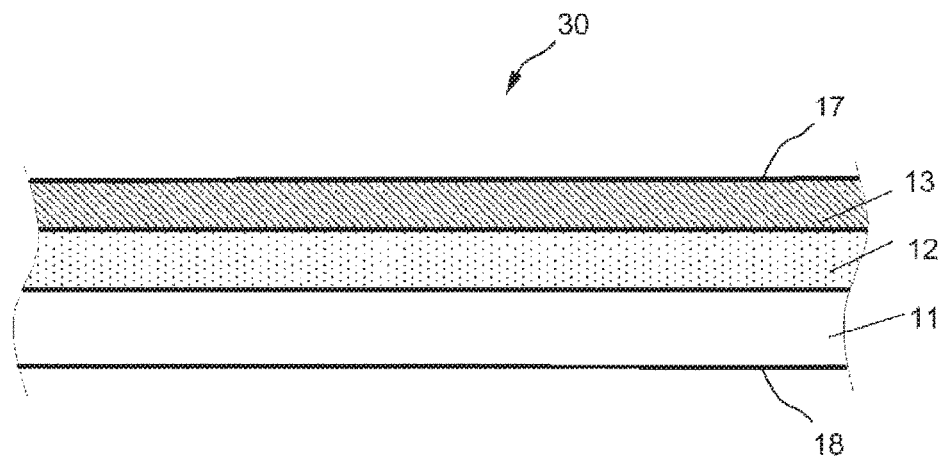
FIG. 2 is a cross-sectional view showing one example of a separation membrane main body.
Figure 3:
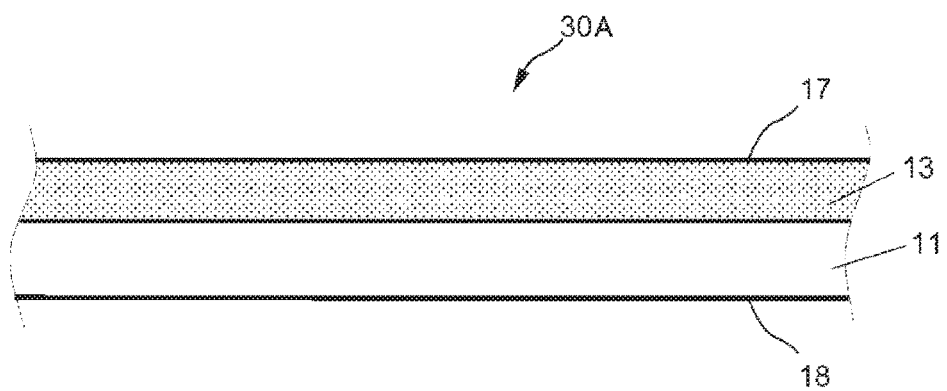
FIG. 3 is a cross-sectional view showing another example of a separation membrane main body.

In the present invention, the term "feed-side face" of a separation membrane main body refers to the surface which is one of the two faces of a separation membrane main body and is the side to which a raw fluid (feed water) is to be fed. The term "permeate-side face" refers to the face on the opposite side thereof. As shown in FIG. 2 and FIG. 3, when the separation membrane main body 30 includes a substrate 11 and a separation functional layer 13, in general, the face on the side of the separation functional layer 13 is the feed-side face 18, and the face on the side of the substrate 11 is the permeate-side face 18.

In the drawing, directional axes of an x-axis, a y-axis, and a z-axis are shown. As shown in FIG. 1 and the like, the separation membrane main body 30 is a rectangle, and the x-axis direction and the y-axis direction are parallel to an outer edge of the separation membrane main body 30. The x-axis direction is corresponding to the width direction of the separation membrane, and the y-axis direction is corresponding to the lengthwise direction. In addition, from the viewpoint of the direction at the time of forming a membrane, the width direction may be named CD (cross direction), and the lengthwise direction may be named MD (machine direction).
(1-2) Separation Membrane Main Body
(1-2-1) Outline As the separation membrane main body 30, a membrane having separation performance appropriate to the usage and intended purpose thereof and so on is used. The separation membrane main body 30 may be formed into a single layer, or it may be formed into a composite membrane including a substrate and a separation functional layer.

Examples of the composite membrane are shown in FIG. 2 and FIG. 3. The separation membrane main body 30 shown in FIG. 2 includes a substrate 11, a porous supporting layer 12, and a separation functional layer 13. On the other hand, a separation membrane main body 30A shown in FIG. 3 includes two layers of a substrate 11 and a separation functional layer 13. The respective layers are described below.
(1-2-2) Separation Functional Layer Though a thickness of the separation functional layer 13 is not limited to a specific numerical value, it is preferably 5 to 3,000 nm from the standpoints of separation performance and permeation performance. In particular, in a reverse osmosis membrane, a forward osmosis membrane, and a nanofiltration membrane, the thickness is preferably 5 to 300 nm.

The thickness of the separation functional layer can be determined in accordance with any of traditional methods to measure separation membrane thickness. For example, a separation membrane is embedded in a resin and cut to prepare ultrathin slices, followed by subjecting the slices obtained to a treatment such as dyeing. Thereafter, by observing the resultant slices with a transmission electron microscope, it is possible to measure the thickness thereof. In addition, when the separation functional layer has a pleated structure, the thickness thereof can be determined by making height measurements on 20 pleats at intervals of 50 nm in the direction of cross-sectional length of the pleated structure located above the porous supporting layer and calculating the average of these heights measured.

The separation functional layer may be a layer having both a separation function and a supporting function, or it may be a layer having a separation function alone. The term "separation functional layer" refers to a layer having at least a separation function.

When the separation functional layer has both a separation function and a supporting function (the example of FIG. 3), a layer containing cellulose, polyvinylidene fluoride, polyether sulfone, or polysulfone as a main component is preferably applied as the separation functional layer.

On the other hand, when the separation functional layer is arranged as a layer separately from the porous supporting layer (the example of FIG. 2), a crosslinked polymer is preferably used from the standpoints of easy pore size control and excellent durability. In particular, from the standpoint of excellent performance of separation of ingredients contained in raw fluid, a polyamide separation functional layer formed through polycondensation of a multifunctional amine and a multifunctional acid halide, an organic-inorganic hybrid functional layer, or the like is suitably used. It is possible to form such a separation functional layer through polycondensation of monomers on a porous supporting layer.

For example, the separation functional layer can contain a polyamide as the main component. The membrane of the type is formed through interfacial polycondensation of a multifunctional amine and a multifunctional acid halide according to a known method. For example, an aqueous solution of a multifunctional amine is applied on a porous supporting layer, the excessive aqueous amine solution is removed with an air knife or the like, and thereafter, an organic solvent solution containing a multifunctional acid halide is applied thereon, thereby obtaining a polyamide separation functional layer.

In addition, the separation functional layer may have an organic-inorganic hybrid structure containing Si or the like. The separation functional layer having an organic-inorganic hybrid structure can contain, for example, the following compounds (A) and (B):

(A) a silicon compound containing a silicon atom to which a reactive group having an ethylenically unsaturated group and a hydrolyzable group are directly bonded, and (B) an ethylenically unsaturated group-containing compound that is a compound other than the compound (A).

Specifically, the separation functional layer may contain a condensation product of the hydrolyzable group in the compound (A) and a polymerization product of the ethylenically unsaturated groups in the compound (A) and/or the compound (B). That is, the separation functional layer may contain at least one of the following polymerization products:

a polymerization product formed through condensation and/or polymerization of the compound (A) alone;

a polymerization product formed through polymerization of the compound (B) alone; and a product formed through copolymerization of the compound (A) and the compound (B).

Incidentally, a condensate is included in the polymerization product. In addition, the compound (A) may be condensed via its hydrolyzable group in the copolymer of the compound (A) and the compound (B).

It is possible to form the hybrid structure by a known method. One example of the method for forming a hybrid structure is as follows. A reaction solution containing the compound (A) and the compound (B) is applied on a porous supporting layer. The excess of the reaction solution is removed, and then, a heat treatment may be carried out for the purpose of condensing hydrolyzable groups. As the method for polymerizing ethylenically unsaturated groups in the compound (A) and the compound (B), a heat treatment, electromagnetic wave irradiation, electron beam irradiation, or plasma irradiation may be adopted. For the purpose of increasing the polymerization speed, a polymerization initiator, a polymerization accelerator, and the like can be added on the occasion of forming the separation functional layer.

Regarding any of the separation functional layers, a surface of the membrane may be rendered hydrophilic with, for example, an alcohol-containing aqueous solution or an alkaline aqueous solution before the use.

(1-2-3) Porous Supporting Layer

The following configuration is applicable to a separation functional layer in the case where a separation function and a supporting function are realized in one layer (see FIG. 3) and to a porous supporting layer in the case where a separation function and a supporting function are realized in different layers from each other (see FIG. 2).

The porous supporting layer 12 has no particular restrictions on materials used therein and shape thereof. For example, the porous supporting layer may be formed on a substrate through the use of a porous resin. In forming the porous supporting layer, polysulfone, cellulose acetate, polyvinyl chloride, an epoxy resin, or a mixture or a laminate thereof can be used. Among those, polysulfone is preferably used in view of high chemical, mechanical, and thermal stability and easiness of pore-size control.

The porous supporting layer imparts mechanical strength to the separation membrane, and unlike the separation membrane, it has no separation function for components having a small molecular size, such as ions. There are no particular limitation to sizes and size distribution of pores of the porous supporting layer. For example, the porous supporting layer may have uniform fine pores, or it may have such a size distribution that pores gradually increase in size from the surface on the side where the separation functional layer is formed toward the other face. In addition, in either case, a projected area diameter of fine pores present on the surface on the side where the separation functional layer is formed is preferably 1 to 100 nm as measured with an atomic force microscope or an electron microscope. In particular, from the standpoints of interfacial polymerization reactivity and retention of the separation functional layer, it is preferable that the pores present on the surface of the porous supporting layer on the side where the separation functional layer is formed have a projected area diameter of 3 to 50 nm.

Although a thickness of the porous supporting layer is not particularly limited, from the reason of imparting strength to the separation membrane, or the like, the thickness of the porous supporting layer is in the range of preferably from 20 to 500 μm, and more preferably from 30 to 300 μm.

A configuration of the porous supporting layer can be observed with a scanning electron microscope, a transmission electron microscope, or an atomic force microscope. For instance, when the observation is made with a scanning electron microscope, a sample for cross-sectional observation is made by peeling off the porous supporting layer from the substrate and then cutting the peeled-off layer by a freeze fracture method. This sample is coated with a thin film of platinum, platinum-palladium, or ruthenium tetrachloride, preferably ruthenium tetrachloride, and observed with an ultrahigh-resolution field-emission scanning electron microscope (UHR-FE-SEM) at an accelerating voltage of 3 to 6 kV. As the ultrahigh-resolution field-emission scanning electron microscope, it is possible to use an electron microscope Model S-900, manufactured by Hitachi, Ltd., or the like. On the basis of electron micrographs obtained, the thickness of the porous supporting layer and the projected area diameter of pores on the surface of the porous supporting layer can be determined.

The thickness and pore diameter of the porous supporting layer are represented as their respective average values. Specifically, the thickness of the porous supporting layer is an average value obtained by making the thickness measurement at 20 points chosen at intervals of 20 μm in the direction orthogonal to the thickness direction in cross-section observation and averaging out the measurement values. The pore diameter is an average value obtained by making the projected area diameter measurement on 200 pores and averaging out the measurement values.

Next, a method for forming the porous supporting layer is described. The porous supporting layer can be, for example, produced by casting an N,N-dimethylformamide (hereinafter abbreviated as DMF) solution of polysulfone as described above in a uniform thickness onto a substrate as described later, for example, a tightly woven polyester fabric or a nonwoven fabric, and subjecting the cast solution to wet coagulation in water.

The porous supporting layer is formed in accordance with the method described in "Office of Saline Water Research and Development Progress Report", No. 359 (1968). In order to obtain a desired configuration, it is possible to properly adjust a polymer concentration, a solvent temperature, or a poor solvent.

For example, the porous supporting layer can be obtained by taking the following steps. A predetermined concentration of a polysulfone resin solution is prepared by dissolving a predetermined amount of polysulfone in DMF, and an approximately uniform coat of the thus prepared polysulfone resin solution is applied on a substrate made of a polyester fabric or a nonwoven fabric, then allowed to stand in the air for a certain time to remove the solvent on the surface, and further immersed in a coagulating solution to coagulate the polysulfone.

(1-2-4) Substrate

As the substrate 11, it is preferred to use a fibrous substrate from the standpoints of strength, ability to form asperities, and fluid permeability. All of a long-fiber nonwoven fabric and a short-fiber nonwoven fabric can be preferably used as the fibrous substrate. In particular, the long-fiber nonwoven fabric has excellent membrane-forming properties, and therefore, prevents the possibilities that, when a polymer solution is flow-cast onto the fabric, the solution may permeate to the backside of the fabric, and the porous supporting layer may peel off because of overpermeation of the solution, and further can suppress the membrane formed thereon from becoming nonuniform owing to fluffiness of the substrate and defects including pinholes and the like. In addition, the case of using as the substrate a long-fiber nonwoven fabric made of a thermoplastic long fiber can reduce unevenness caused by fluffiness of fibers and membrane defects produced at the time of flow-cast of a polymer solution as compared with the case of using a short-fiber nonwoven fabric. Furthermore, when the separation membrane is formed continuously, a tension is applied to the direction in which a membrane is being formed. Therefore, it is preferred to use a long-fiber nonwoven fabric superior in dimensional stability as the substrate.

From the standpoints of formability and strength, it is advantageous for fibers of a long-fiber nonwoven fabric to be longitudinally oriented more in the surface layer on the side opposite to the porous supporting layer side than in the surface layer on the porous supporting layer side. Having such a configuration is advantageous because it allows not only retention of strength, thereby achieving a high effect on prevention of membrane failure and the like, but also an improvement in ability to form into a laminate including a porous supporting layer and a substrate at the occasion of giving asperities to a separation membrane, thereby stabilizing an uneven surface profile of the separation membrane.

More specifically, in the long-fiber nonwoven fabric, the degree of fiber orientation in the surface layer on the side opposite to the porous supporting layer side is preferably 0° to 25°. In addition, the difference in the degree of fiber orientation between the surface layer on the side opposite to the porous supporting layer side and that on the porous supporting layer side is preferably 10° to 90°.

In a process of making a separation membrane and in a process of making a membrane element, heating steps are included. There occurs a phenomenon in which a porous supporting layer or a separation functional layer shrinks when heated. In particular, this phenomenon is remarkable in the width direction to which no tension is applied in continued membrane formation. The shrinkage causes a problem in dimensional stability or the like, and therefore, it is desired that the substrate is low in a ratio of dimensional change by heat. In a nonwoven fabric, if a difference in a degree of fiber orientation between the surface layer on the side opposite to the porous supporting layer side and the surface layer on the porous supporting layer side is 10° to 90°, the change in the width direction to be caused due to heat can also be suppressed, and hence, such is preferred.

The term "degree of fiber orientation" as referred to herein is an index indicating the direction of fibers in a nonwoven fabric substrate constituting the porous supporting layer. Specifically, the degree of fiber orientation refers to an average value of angles between the fibers constituting the nonwoven fabric substrate and the direction of travel in continued membrane formation, namely the longitudinal direction of the nonwoven fabric substrate. Namely, when the longitudinal direction of fibers is parallel to the direction of travel in membrane formation, the degree of fiber orientation is 0°. On the other hand, when the longitudinal direction of fibers is orthogonal to the direction of travel in membrane formation, namely parallel to the width direction of the nonwoven fabric substrate, the degree of fiber orientation is 90°. Thus, the degree of fiber orientation nearer to 0° indicates that the direction of fibers is the nearer to the longitudinal direction, and the degree of fiber orientation nearer to 90° indicates that the direction of fibers is the nearer to the lateral direction.

The degree of fiber orientation is measured in the following manner. To begin with, 10 small sample pieces are randomly taken from a nonwoven fabric. Then, photographs of surfaces of these samples are taken with a scanning electron microscope set at a magnification of 100 to 1,000 times. From the photographs taken, 10 fibers per sample are chosen, and an angle which each fiber forms with the lengthwise direction of the nonwoven fabric is measured, with the longitudinal direction of nonwoven fabric (also referred to as the machine direction, or the direction of travel in membrane formation) being taken as 0°. In other words, the angle measurement is made on 100 fibers in total per piece of the nonwoven fabric. The average value of the angles thus measured on the 100 fibers is calculated. The value obtained by rounding off the thus calculated average value to the first decimal place is defined as the degree of fiber orientation.

It is preferred to adjust a thickness of the substrate in such a manner that a sum total of the substrate thickness and the porous supporting layer thickness falls within the range of from 30 to 300 μm, or within the range of from 50 to 250 μm.

(1-2-4) Production Method of Separation Membrane Main Body

As for a method for producing the separation membrane main body including a separation functional layer, for example, a resin solution prepared by dissolving a resin in a good solvent is cast onto a substrate and immersed in pure water to form a porous supporting layer, whereby the porous supporting layer and the substrate are combined. Thereafter, as described above, a separation functional layer is formed on the porous supporting layer. In order to enhance separation performance and permeation performance, a chemical treatment with chlorine, an acid, an alkali, nitrous acid, or so on is further carried out, if desired, and furthermore, the monomers or the like are washed out. Thus, a continuous sheet of the separation membrane main body is prepared.

Before or after the chemical treatment, a flow channel may be formed by processing the separation membrane main body into an uneven configuration. Examples of a processing method for forming an uneven configuration include methods of emboss forming, hydraulic forming, and calendering. The embossing condition, the configuration formed by embossing, and so on may be properly designed in accordance with a required performance of the separation membrane element, or the like. The processing for forming unevenness may be regarded as a part of the production of a separation membrane.

(1-3) Permeate-side Channel Member

As shown in FIG. 1, the permeate-side channel member (hereinafter also referred to simply as "channel member") 4 is fixed to the permeate-side face 18 of the separation membrane main body 30. Specifically, the permeate-side channel member 4 is arranged so as to form a permeate-side flow channel 15. The expression of "arranged so as to form a permeate-side flow channel" means that the channel member is configured so that a permeated fluid having permeated through the separation membrane main body can arrive at a water collection tube when the separation membrane is incorporated into a separation membrane element as described later.

In the present invention, the permeate-side channel member includes a composition containing polypropylene (A) as a main component and satisfies the following requirements (a) to (c).

(a) A softening point temperature is 60° C. or higher.
(b) A tensile elongation in the standard state is 10% or more.
(c) A yield point stress under a wet condition at 50° C. is 2 MPa or more.

In the present specification, the term "permeate-side channel member" may sometimes refer to not only a state after being formed as the channel member but also a composition constituting the channel member.

In the present invention, it is important that a softening point temperature of the permeate-side channel member fixed onto the permeate-side face of the separation membrane main body is 60° C. or higher.

When the softening point temperature of the permeate-side channel member is 60° C. or higher, even in the case of storage under a high-temperature environment, for example, in a state of stacking the separation membranes, or in a state of winding up around a paper tube or the like, the channel member is hardly softened and deformed. For that reason, even in the case of storage under a high-temperature environment, it is possible to suppress a fluctuation of quality of the separation membrane. Furthermore, on preparing an element using the stored separation membrane, adhesion of the channel member to a face (raw water-side face) facing to the permeate-side channel member is suppressed, and handleability in a preparation process of separation membrane element becomes good. Furthermore, even when performing operation of the separation membrane element under pressure at a high temperature for a long period of time, softening and deformation of the permeate-side channel member can be suppressed, whereby the performance of the separation membrane element becomes stable. The softening point temperature is preferably 70° C. or higher, and more preferably 80° C. or higher.

In the present invention, it is important that a tensile elongation of the permeate-side channel member in the standard state is 10% or more. In the present invention, the term "in the standard state" refers to a state where at atmospheric pressure, a temperature is 20° C., and a humidity is 65%.

In the case where the tensile elongation of the permeate-side channel member in the standard state is 10% or more, the permeate-side channel member has sufficient flexibility, and therefore, even when the separation membrane is conveyed on rolls or wound around a winder, the channel member can be prevented from being damaged or broken. That is, a separation membrane having good handleability and high quality can be obtained. The tensile elongation is preferably 15% or more, and still more preferably 20% or more. In addition, as the tensile elongation is high, the energy required for breakage becomes high, and such is preferred from the standpoint of toughness. However, when the tensile elongation is excessively high, the deformation amount under a constant stress becomes large. Therefore, the tensile elongation is preferably 1,000% or less, and more preferably 800% or less.

In the present invention, it is important that a yield point stress of the permeate-side channel member fixed onto the permeate-side face of the separation membrane main body under a wet condition at 50° C. is 2 MPa or more. In the present invention, the tem "under a wet condition at 50° C." means a state where a substance is wetted with water at 50° C. The term "yield point" means a boundary point of from elastic deformation to plastic deformation, and the term "yield point stress" means a stress when the substance changes from elastic deformation to elastic deformation.

When the yield point stress of the permeate-side channel member under a wet condition at 50° C. is 2 MPa or more, even when the separation membrane element is operated under high-temperature and high-pressure conditions, the channel member can be greatly prevented from being deformed, and hence, the performance of the separation membrane element becomes good. In order to suppress the deformation amount, the discussion is frequently performed while making an elastic modulus of material as an indicator. However, even by increasing the elastic modulus of material, there may be highly possibly the case where the yield point stress thereof is low. Namely, even if the elastic modulus is low, when the yield point stress is high, the deformation amount can be suppressed. Then, the present inventors paid attention to the yield point stress and made extensive and intensive investigations regarding a relation between the yield point stress and the performance of separation membrane element (the deformation amount of channel member), resulting in accomplishment of the present invention. The yield point stress is preferably 3 MPa or more, and more preferably 4 MPa or more. From the viewpoint of suppressing the deformation amount, it is preferred that the yield point stress is high as far as possible. However, it is substantially difficult to achieve a yield point stress of 20 MPa or more.

In the present invention, an elongation of the permeate-side channel member at a yield point under a wet condition at 50° C. is preferably 30% or less. When the elongation of the permeate-side channel member at a yield point under a wet condition at 50° C. is 30% or less, the excessive deformation amount under a high pressure can be suppressed, and the stable performance of the separation membrane element can be revealed. The elongation at a yield point is more preferably 25% or less, and still more preferably 20% or less.

Examples of the polypropylene (A) constituting the permeate-side channel member include a propylene homopolymer (e.g., isotactic polypropylene, syndiotactic polypropylene, or atactic polypropylene); a propylene random copolymer; a propylene block copolymer; a mixture of two or more kinds of these materials; and the like. Above all, from the viewpoints of versatility, handleability in the processing step, and performance of the separation membrane element, low-to high-stereoregularity isotactic polypropylenes are preferred. A content of the polypropylene in the channel member may be properly set so as to satisfy the above-described requirements (a) to (c). However, from the viewpoints of storage stability at high temperatures, process passing property in each step, and element performance, the content of the polypropylene is preferably 60% by weight or more, more preferably 70% by weight or more, and still more preferably 80% by weight or more in the composition.

In the present invention, the channel member fixed onto the permeate-side face of the separation membrane main body may contain one or more additives, such as a thermal flowability improver (B), a filler (C), a crystal nucleating agent (D), an antioxidant (E), and a lubricant (F), within the range where the object of the present invention is not impaired.

As the thermal flowability improver (B), for example, there can be exemplified:

(B-1) synthetic waxes, such as a polyethylene wax, a polypropylene wax, an atactic polypropylene wax, and a Fischer-Tropsch wax;

(B-2) terpene-based resins, such as terpene, hydrogenated terpene, aromatic modified terpene, and aromatic modified hydrogenated terpene;

(B-3) hydrogenated petroleum resins, such as "I-MARV" (a trade name), manufactured by Idemitsu Kosan Co., Ltd., "ARKON" (a trade name), manufactured by Arakawa Chemical Industry, Ltd., and "PETCOAL" and "PETROTACK" (both of which are a trade name), manufactured by Tosoh Corporation;

(B-4) petroleum waxes, such as a paraffin wax, and a microcrystalline wax;

(B-5) natural waxes, such as carnauba wax, and beeswax;

(B-6) rosin-based resins, such as rosin, hydrogenated rosin, polymerized rosin, and rosin ester;

and the like.

But, the thermal flowability improver (B) is not limited thereto. These materials may be used alone or as a mixture of any two or more thereof.

Among these, the synthetic wax (B-1), the terpene-based resin (B-2), and the hydrogenated petroleum resin (B-3) are preferred from the standpoints of an effect for improving thermal flowability of the composition, compatibility with the polypropylene (A), and thermal decomposition resistance of the composition at the time of heat melting. The content thereof may be properly set for the purpose of controlling a melt viscosity of the composition constituting the permeate-side channel member. However, in view of preventing the pressure resistance and tensile elongation at high temperatures from lowering and preventing the generation of bleeding out onto the surface of the channel member, it is preferred that the content thereof is lower than the content of polypropylene in the composition. Specifically, the content thereof is preferably 40% by weight or less, more preferably 35% by weight or less, and still more preferably 30% by weight or less.

As the filler (C), there can be exemplified inorganic compounds, such as calcium carbonate, talc, alumina, silica, mica, and clay. But, the filler (C) is not limited thereto. These materials may be used alone or as a mixture of any two or more thereof. From the standpoints of moldability into the permeate-side channel member, suppression of the viscosity increase of the composition, and abrasion of processing devices, a content of the filler (C) is preferably 3 to 30% by weight relative to the composition.

As the crystal nucleating agent (D), there can be exemplified organic carboxylic acid metal salt-based compounds (D-1); organic phosphoric acid metal salt-based compounds (D-2); sorbitol-based compounds (D-3); metal salt-based compounds of rosin; amide-based compounds; and the like. These materials may be used alone or as a mixture of any two or more thereof.

As the organic carboxylic acid metal salt-based compound (D-1), there are preferably exemplified aromatic carboxylic acid metal salts, such as aluminum benzoate, potassium benzoate, sodium benzoate, lithium benzoate, aluminum di-p-t-butyl benzoate, titanium di-p-t-butyl benzoate, chromium di-p-t-butyl benzoate, aluminum hydroxy-di-t-butyl benzoate, aluminum-p-butylbenzoate, and sodium 6-naphthoate.

As the organic phosphoric acid metal salt-based compound (D-2), there are preferably exemplified aromatic carboxylic acid metal salts, such as sodium bis(4-t-butylphenyl)phosphate, lithium bis(4-t-butylphenyl)phosphate, aluminum bis(4-t-butylphenyl)phosphate, sodium 2,2'-methylene-bis(4,6-di-t-butylphenyl)phosphate, lithium 2,2'-methylene-bis(4,6-di-t-butylphenyl)phosphate, aluminum 2,2'-methylene-bis(4,6-di-t-butylphenyl)phosphate, calcium 2,2'-methylidene-bis(4,6-di-t-butylphenyl)phosphate, sodium 2,2'-ethylidene-bis(4,6-di-t-butylphenyl)phosphate, lithium 2,2'-ethylidene-bis(4,6-di-t-butylphenyl)phosphate, aluminum 2,2'-ethylidene-bis(4,6-di-t-butylphenyl)phosphate, and calcium bis-(4-t-butylphenyl)phosphate. As these materials, commercially available products can be used, and for example, there are preferably exemplified "ADEKA STAB NA-11" (sodium 2,2'-methylene-bis(4,6-di-t-butylphenyl)phosphate) that is a trade name, manufactured by Adeka Corporation, "ADEKA STAB NA-21" (aluminum 2,2'-methylene-bis(4,6-di-tert-butylphenyl)phosphate) that is a trade name, manufactured by Adeka Corporation, and the like.

As the sorbitol-based compound (D-3), there are preferably exemplified dibenzylidene sorbitol, 1,3-di(methylbenzylidene) sorbitol, 2,4-di(methylbenzylidene) sorbitol, 1,3-di(ethylbenzylidene) sorbitol, 2,4-di(ethylbenzylidene) sorbitol, 1,3-di(butylbenzylidene) sorbitol, 2,4-di(butylbenzylidene) sorbitol, 1,3-di(methoxybenzylidene) sorbitol, 2,4-di(methoxybenzylidene) sorbitol, 1,3-di(ethoxybenzylidene) sorbitol, 2,4-di(ethoxybenzylidene) sorbitol, 1,3-chlorobenzylidene-2,4-methylbenzylidene sorbitol, mono(methyl)dibenzylidene sorbitol, and the like. As these materials, commercially available products can be used, and for example, there are preferably exemplified "GEL ALL MD" that is a trade name, manufactured by New Japan Chemical Co., Ltd., and the like.

A preferred content of the crystal nucleating agent (D) in the permeate-side channel member is in the range of from 0.01 to 1.00% by weight. When the content of the crystal nucleating agent is 0.01% by weight or more, a crystallization rate of the composition constituting the permeate-side channel member can be accelerated, and therefore, for example, moldability and handleability in the melt molding step of the channel member and mechanical properties and heat resistance of the channel member can be improved. On the other hand, when the content of the crystal nucleating agent is more than 1.00% by weight, the effect for improving the crystallization rate can be no longer expected, and such is not preferred from the viewpoint of economy. The content of the crystal nucleating agent is more preferably 0.02 to 0.80% by weight, and still more preferably 0.04 to 0.60% by weight.

As the antioxidant (E), there can be exemplified a phenol-based compound; a phosphorus-based compound; a hindered amine-based compound; a sulfur-based compound; and the like. But, the antioxidant (E) is not limited thereto. These materials may be used alone or as a mixture of any two or more thereof. From the standpoints of preventing thermal decomposition of the composition at the time of molding into the permeate-side channel member, the content thereof is preferably 0.001 to 1% by weight relative to the composition.

As the lubricant (F), there can be exemplified fatty acid amide-based compounds, such as stearic acid amide, oleic acid amide, erucic acid amide, and ethylene bis-stearic acid amide; metal soaps, such as calcium stearate, zinc stearate, magnesium stearate, and zinc stearate; fatty acid ester-based compounds; and the like. But, the lubricant (F) is not limited thereto. These materials may be used alone or as a mixture of any two or more thereof. From the viewpoint of reduction of friction between the composition and the processing machine, or between the compositions each other and the viewpoint of molding stability at the time of molding a permeate-side channel member, a content of the lubricant (F) is preferably 1 to 30% by weight relative to the composition.

In the present invention, a crystallization peak temperature of the resin composition constituting the permeate-side channel member is preferably 30° C. or higher. The crystallization peak temperature of the composition is a numerical value as measured with a differential scanning calorimeter (DSC), and details of the measurement method are described later.

When the crystallization peak temperature of the composition is 30° C. or higher, in the case of molding the permeate-side channel member in the separation membrane main body, the crystallization of the resin composition rapidly proceeds in a cooling process. For that reason, after molding processing of the channel member, even in the case of stacking the separation membrane or the case of winding up the separation membrane around a paper tube or the like, the permeate-side channel member does not adhere to a face (raw water-side) facing to the permeate-side channel member, and therefore, the handleability in the production process of the separation membrane element and the quality of the separation membrane become good. Furthermore, on the occasion of subjecting the separation membrane having the permeate-side channel member formed thereon to roll conveyance, even when the permeate-side channel member comes into contact with the rolls, deformation of the channel member or sticking of the channel member onto the rolls is suppressed. The crystallization peak temperature of the composition is preferably 35° C. or higher, and more preferably 40° C. or higher.

In the case where an exothermic peak based on crystallization cannot be confirmed with DSC, a half-crystallization time at 30° C. is preferably 10 minutes or less. The half-crystallization time is a numerical value as measured with DSC, and details thereof are described later.

When the half-crystallization time is 10 minutes or less, crystallization (solidification) of the permeate-side channel member thoroughly proceeds. Therefore, similar to that described above, the process passing property becomes good, such that in the case of stacking the separation membrane or the case of winding up the separation membrane, deformation of the permeate-side channel member or sticking of the permeate-side channel member onto the rolls can be suppressed, or the like. In addition, from the viewpoint of improving the productivity, such as an increase of processing speed, etc., the half-crystallization time at 30° C. of the composition is preferably 7 minutes or less, and more preferably 5 minutes or less.

The shape of the permeate-side channel member may be a continuous one or a discontinuous one. The "continuous" channel member is a channel member that is separated as a member having an integrated shape without being divided into plural sections when separated from one separation membrane main body. For example, a member of net, tricot (knitted fabric), film or the like is a continuous channel member.

On the other hand, the term "discontinuous" means that, when the channel member is peeled from the separation membrane main body, the channel member is divided into plural sections. All the individual parts divided on one separation membrane main body and the entire channel member arranged on one separation membrane main body may be conveniently referred to as "channel member".

For example, in the case where a knitted fabric, such as tricot, is used as the channel member, a height of the flow channel is smaller than a thickness of the knitted fabric. On the other hand, a thickness of a discontinuous channel member is entirely utilized as the height of the flow channel, and therefore, the flow resistance of the discontinuous channel member can be reduced as compared with that of the continuous channel member, so that a water production amount can be increased.

FIG. 4 to FIG. 7 and FIG. 9 to FIG. 11 show examples of a discontinuous channel member.

Figure 4:
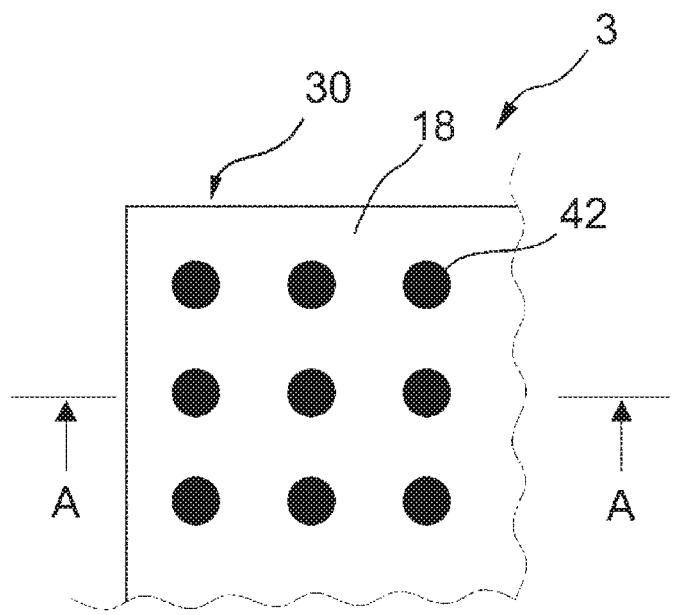
FIG. 4 is a plan view showing one example of a separation membrane including a permeate-side channel member.
Figure 5:
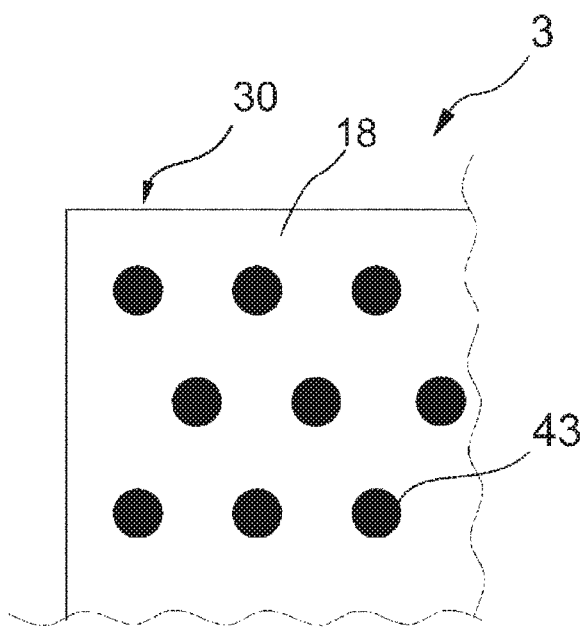
FIG. 5 is a plan view showing another example of a separation membrane including a permeate-side channel member.
Figure 9:
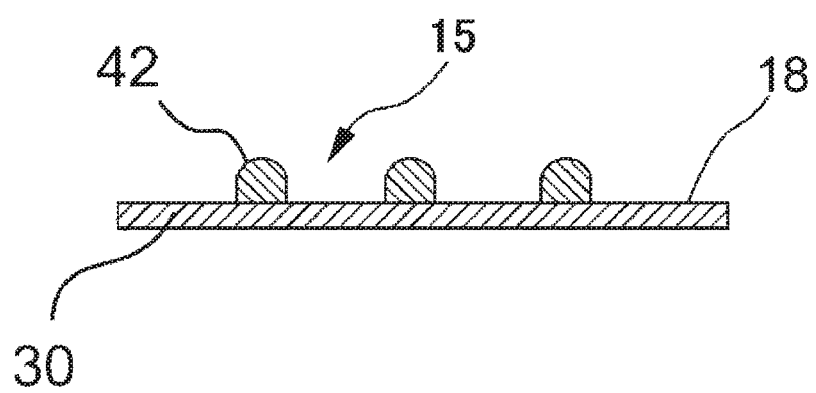
FIG. 9 is an A-A cross-sectional view of the separation membrane in FIG. 4.

As shown in FIG. 4 and FIG. 9, channel members 42 are a columnar member whose top is nearly semispherical and are arranged in a lattice-like pattern. Individual channel members 43 shown in FIG. 5 each have the same shape as that of the channel members 42 shown in FIG. 4, but in FIG. 5, the channel members 43 are arranged in zigzag.

Figure 6:
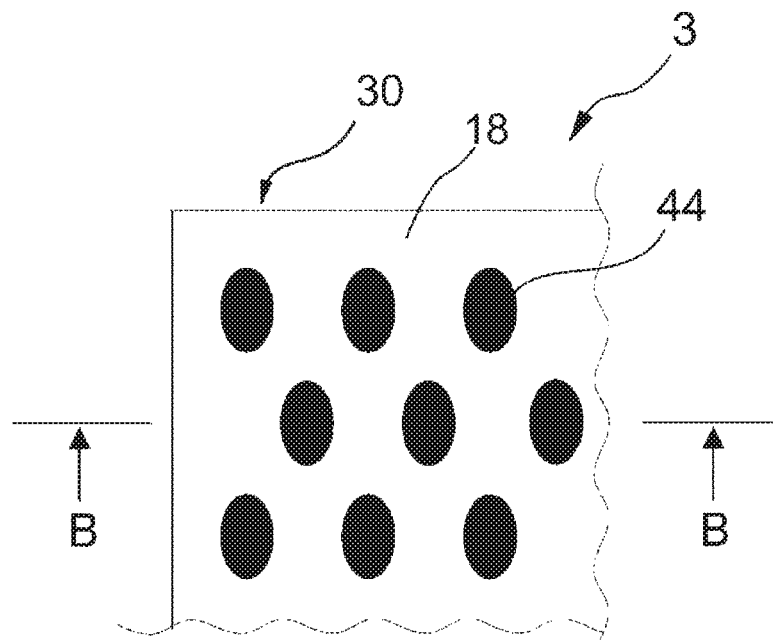
FIG. 6 is a plan view showing still another example of a separation membrane including a permeate-side channel member.
Figure 10:
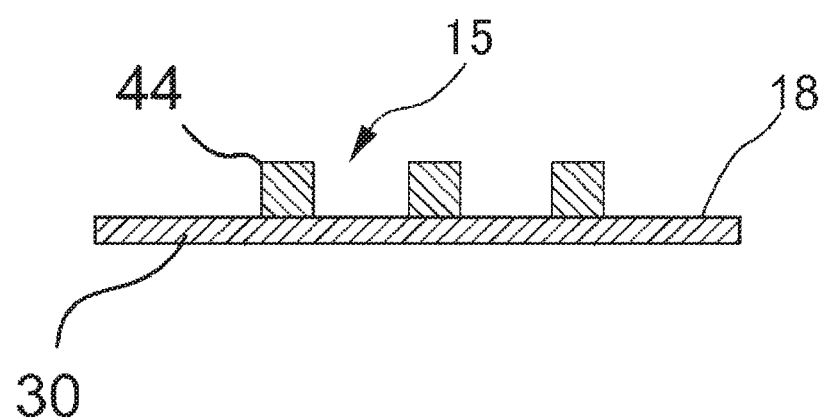
FIG. 10 is a B-B cross-sectional view of the separation membrane in FIG. 6.

As shown in FIG. 6, channel members 44 are a columnar member whose plan view is oval and are arranged in zigzag. As shown in FIG. 10, the top of the channel member 44 is flat, and a shape of a cross section thereof is rectangular.

Figure 7:
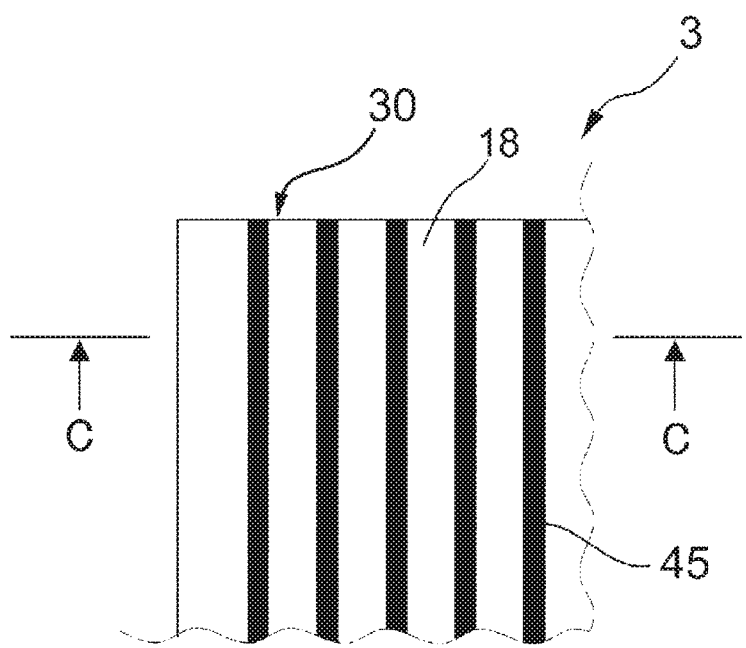
FIG. 7 is a plan view showing still another example of a separation membrane including a permeate-side channel member.
Figure 11:
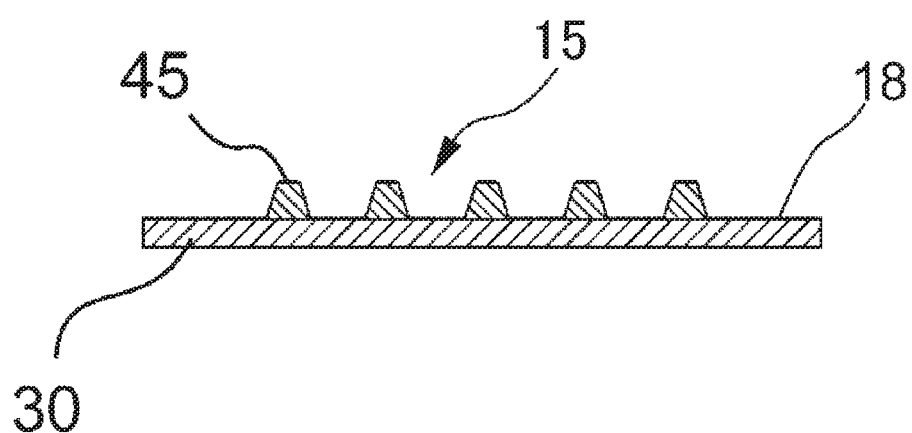
FIG. 11 is a C-C cross-sectional view of the separation membrane in FIG. 7.

As shown in FIG. 7, channel members 45 are a linear wall-like member as a plane shape thereof. The wall-like members are arranged in parallel to each other. As shown in FIG. 11, a cross section of the channel member 45 on the plane surface vertical to the membrane surface is a trapezoidal one in which an upper width is narrower than a lower width.

Figure 8:
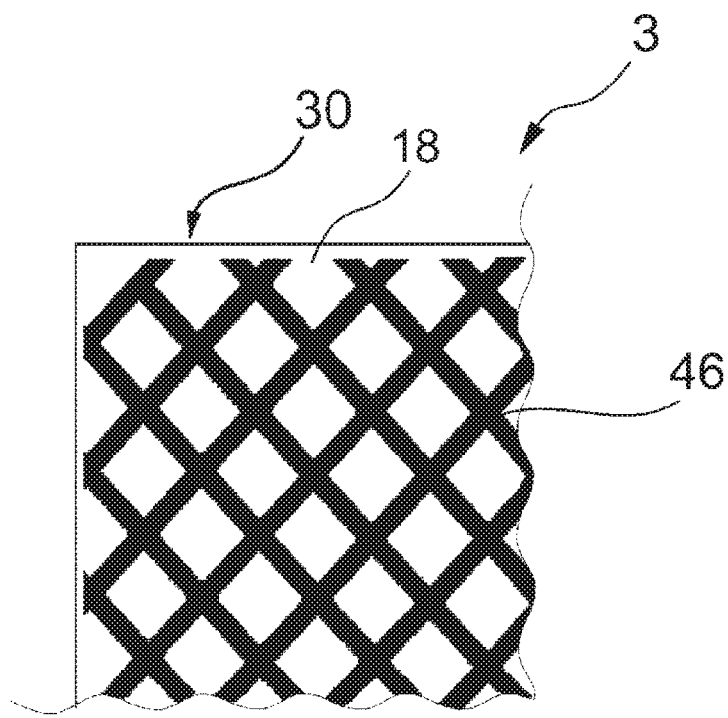
FIG. 8 is a plan view showing still another example of a separation membrane including a permeate-side channel member.

FIG. 8 shows an example of a continuous channel member. As shown in FIG. 8, a channel member 46 is a net-like member that continues in the membrane surface direction.

In any of the channel members shown in FIG. 4 to FIG. 8, a cross-sectional shape thereof may be changed to a cross-sectional shape shown in FIG. 9 to FIG. 11. In other words, the shape of the plane and the shape of the cross section of channel members and also the arrangement thereof that are described as different configurations can be combined with each other. In that manner, for the channel members, any of the plane shapes of FIG. 4 to FIG. 8 are combined in any desired manner with any of the cross-sectional shapes of FIG. 9 to FIG. 11, and the resulting variations are included in the scope of the embodiments of the present invention.

As shown in FIG. 9 to FIG. 11, the permeate-side flow channel 15 is formed of any of the permeate-side channel members 42, 44, and 45.

From the viewpoint of preventing sinking of the membrane among plural channel members during operation under pressure using the separation membrane element, a space between the neighboring channel members, namely the permeate-side flow channel is preferably 50 to 5,000 µm, and more preferably 100 to 2,000 µm, and it is desirable that the separation membrane element is arbitrarily designed within the range. The space between the channel members means a horizontal distance between a highest part of the channel members differing in height and a highest part of other channel members adjacent to the foregoing channel members.

A height difference on the permeate-side of the separation membrane, that is, a thickness of the permeate-side channel member is preferably 50 to 500 µm, more preferably 75 to 450 µm, and still more preferably 100 to 400 µm. When the thickness of the channel member is 500 µm or less, the number of separation membranes capable of being loaded in one vessel can be increased. When the thickness of the channel member is 50 µm or more, the flow resistance of a permeated fluid can be relatively reduced, and therefore, it is possible to make both good separation properties and a permeation performance compatible with each other.

The height difference on the permeate-side of the separation membrane can be measured from a cross-cut sample using a digital microscope "VHX-1000" (a trade name), manufactured by Keyence Corporation. Arbitrary points differing in height are measured, and values of the thickness are summed up, and the resulting value is divided by a total number of the measurement points, whereby the height difference can be determined.

Regarding a configuration of the separation membrane, the channel members may be arranged to the edge of the separation membrane main body, or the membrane may have some area with no channel member arranged around the edge thereof. In other words, so far as the channel members are so arranged as to form flow channels on the permeate-side, the separation membrane main body may have any space with no channel members arranged therein. For example, it is unnecessary to arrange channel members in the adhesion area in the permeate-side face to be adhered to other separation membranes. For any other reasons in use or in production, the separation membrane may have a region with no channel members arranged thereon, for example, partly around the edge thereof.

(1-4) Formation of Permeate-side Channel Member

A step of arranging the permeate-side channel member in the separation membrane main body may be carried out at any stage of separation membrane production. For example, the channel member may be arranged before the formation of the porous supporting layer on the substrate, or may be arranged after the formation of the porous supporting layer and before the formation of the separation functional layer, or may be arranged after the formation of the separation functional layer and before or after the above-described chemical treatment.

For the step of forming the respective layers contained in the channel member, coating, printing, spraying, or the like may be adopted. Examples of a device that is used include a nozzle-type hot-melt applicator, a spray-type hot-melt applicator, a flat nozzle-type hot-melt applicator, a roll coater, an extrusion-type coater, a gravure printer, a sprayer, and the like.

In the case of processing the permeate-side channel member by melt molding, a processing temperature is not particularly limited so far as the resin can be subjected to melt molding processing. From the standpoint of preventing the performance of the separation membrane from worsening by heat on the occasion when the resin melt lands on the substrate side of the separation membrane and standpoint of preventing the resin melt from thermal decomposition, the processing temperature is preferably 190° C. or lower, and more preferably 180° C. or lower.

On the occasion of melt molding processing, a melt viscosity (measurement temperature: 180° C.) of the composition constituting the permeate-side channel member is preferably 1 to 40 Pa·s. When the melt viscosity of the composition is 1 Pa·s or more, the melt moldability into the permeate-side channel member is enhanced, and a desired shape can be given to the member. In addition, the channel member is excellent in mechanical properties, and the separation membrane becomes good in handleability. On the other hand, when the melt viscosity is 40 Pa·s or less, the immersion of the composition into the permeate-side face of the separation membrane main body rapidly proceeds, and the fixation of the channel member can be enhanced. For example, even when the separation membrane is wound up or folded, the channel member does not peel from the separation membrane main body, and a separation membrane having excellent handleability and quality can be obtained. The melt viscosity of the composition is more preferably 3 to 35 Pa·s, and still more preferably 5 to 30 Pa·s.

In the melt molding processing, in the process of cooling and solidifying the resin melt, the composition constituting the permeate-side channel member may be forcedly cooled with cold air or liquid. In order to promote the crystallization of the composition constituting the permeate-side channel member, for example, an isothermal heat treatment may be carried out at a temperature at which the crystallization is most accelerated during a period until winding up around a winder. On that occasion, from the standpoint of productivity, a heat treatment time is preferably 10 minutes or less, more preferably 7 minutes or less, and still more preferably 5 minutes or less.

In the melt molding processing, after the permeate-side channel member is continuously processed and subjected to roll conveyance, it may be wound up around a winder, or the permeate-side channel member may be subjected to sheet processing.

2. Separation Membrane Element (2-1) Outline

In producing the separation membrane element, any of conventional element producing devices can be used. As a method for producing the element, any of the methods described in references (e.g., JP-B-44-14216, JP-B-4-11928, and JP-A-11-226366) can be adopted.

Figure 12:
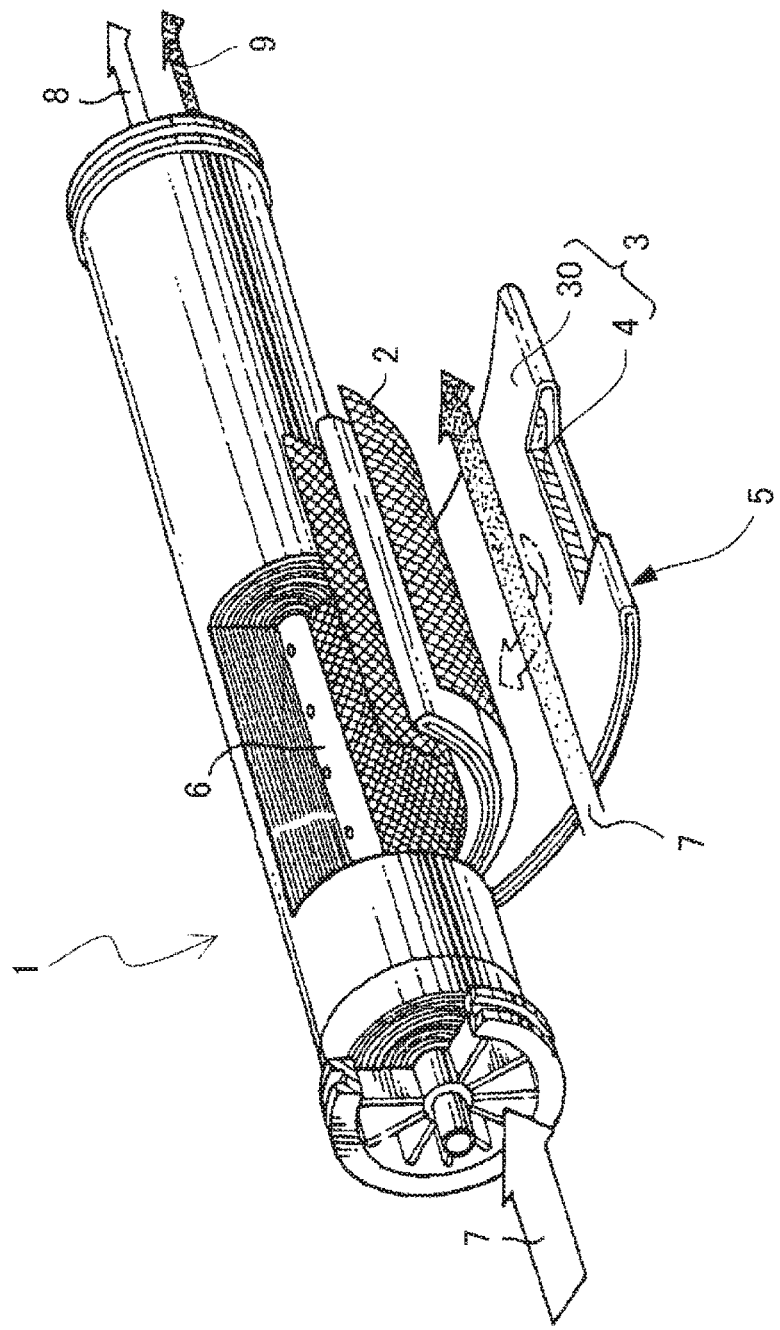
FIG. 12 is a partly developed perspective view showing an outline of a separation membrane element.

As shown in FIG. 12, a separation membrane element 1 includes a water collection tube 6 and a separation membrane 3 wound around the water collection tube 6. The separation membrane element 1 further includes members, such as a feed-side channel member 2, and a side plate.

As described above, the separation membrane 3 includes the separation membrane main body 30 and the permeate-side channel member 4 fixed onto the permeate-side face of the separation membrane main body 30.

The separation membrane 3 forms a rectangular envelope-shaped membrane 5 with the inside thereof facing the permeate-side. The envelope-shaped membrane 5 opens only on one side thereof such that permeated water flows through the water collection tube 6 and is sealed on the other three sides. The permeated water is isolated from the feed water by the envelope-shaped membrane 5.

The feed-side channel member 2 is arranged between the envelope-shaped membranes 5, namely between the feed-side faces of the separation membrane 3. The feed-side channel member 2 and the plurality of envelope-shaped membranes 5 are stacked and wound around the water collection tube 6.

Raw water fed from one end in the lengthwise direction of the separation membrane element 1 (shown as "feed water 7" in the drawing) passes through the flow channel formed by the feed-side channel member 2 and is fed to the separation membrane main body 30.

The water having penetrated through the separation membrane main body 30 (shown as "permeated water 8" in the drawing) runs through the flow channel formed by the permeate-side channel member 4 and flows into the water collection tube 6. In this way, the permeated water 8 is collected from one end of the water collection tube 6.

On the other hand, water not having penetrated through the separation membrane main body 30 (shown as "concentrated water 9" in the drawing) is collected from the other end of the separation membrane element 1.

The separation membrane element 1 shown in FIG. 12 is one example of a configuration of a spiral-type separation membrane element including a water collection tube and a separation membrane wound around the water collection tube, and the present invention is not limited to this embodiment.

(2-2) Envelope-shaped Membrane
(2-2-1) Outline

In the envelope-shaped membrane, the above-described separation membrane(s) is/are arranged such that the permeate-side faces thereof face to each other, and at least both edges in the width direction on the permeate-side faces of the separation membrane(s) are sealed by sealing parts, whereby the membrane is formed in an envelope-shaped state.

The envelope-shaped membrane is wound around periphery of the water collection tube 6 and is arranged such that the width direction thereof follows the longitudinal direction of the water collection tube 6. As a result, the separation membrane 3 is arranged such that the lengthwise direction thereof follows the winding direction.

Accordingly, the permeate-side channel members 4 that are a wall-like member are discontinuously arranged at least along the longitudinal direction of the water collection tube 6 on the permeate-side face 18 of the separation membrane main body 30 constituting the separation membrane 3. Namely, the permeate-side flow channel 15 is formed so as to continue from the outer edge to the inner edge of the separation membrane 3 in the winding direction. As a result, the permeated water 8 easily reaches a center pipe of the water collection tube 6, namely the flow resistance becomes small, so that a large water production amount can be obtained.

Figure 13:
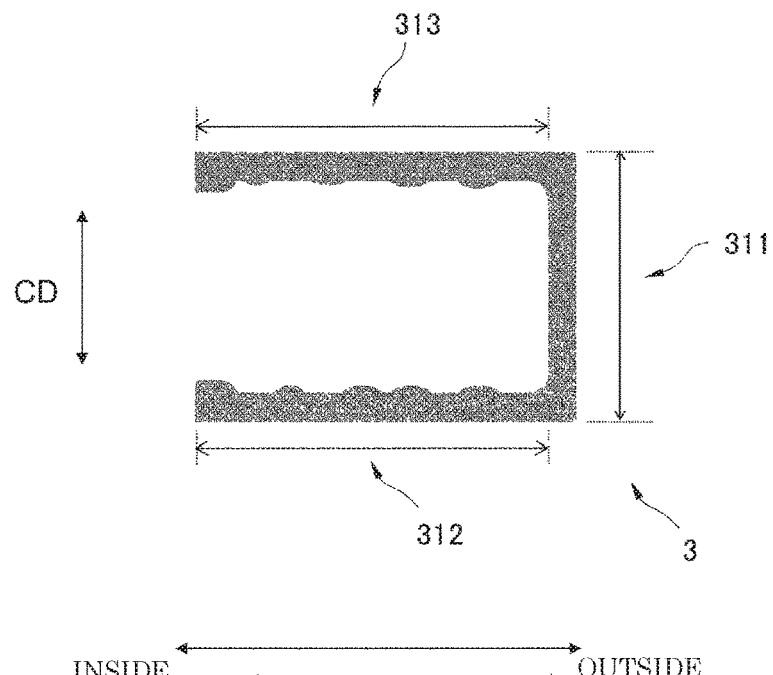
FIG. 13 is a schematic view showing a configuration of a sealing part.

The "inside in the winding direction" and the "outside in the winding direction" are as shown in FIG. 13 and the like. Namely, the "inner edge in the winding direction" and the "outer edge in the winding direction" are corresponding to a near edge to the water collection tube 6 and a far edge from the water collection tube 6, respectively in the separation membrane 3.

As shown in FIG. 1, the separation membrane 3 forms separation membrane leaves 51 and the envelope-shaped membrane 5. In the envelope-shaped membrane 5, the separation membrane 3 is arranged such that the permeate-side face 18 thereof faces to the permeate-side face 18 of the other separation membrane 3 across the permeate-side channel member 4. In the envelope-shaped membrane 5, the permeate-side flow channel 15 is formed between the permeate-side faces 18 of the separation membranes 3 facing to each other.

In one leaf 51, a space between the feed-side faces of the separation membranes facing to each other is closed by folding or sealing in an inner edge in the winding direction (a portion shown by a one-dot chain line).

When the feed-side face of the separation membrane is sealed but not folded, deflection in the edge of the separation membrane is hardly generated. In view of the fact that the generation of deflection in the neighborhood of the fold is suppressed, the generation of a space between the separation membranes when wound, and the generation of leakage due to this space are suppressed. In the case of forming the separation membrane leaf by folding, the longer the leaf (namely, the longer the original separation membrane), the longer the time required for folding the separation membrane is. However, by sealing but not folding the feed-side face of the separation membrane, even when the leaf is long, the increase of the production time can be suppressed.

As shown in FIG. 1, a plurality of separation membrane leaves 51 are stacked. In a space between the permeate-side faces facing to each other, in the rectangular shape of the separation membrane, only one side thereof is opened such that permeated water flows through the water collection tube 6, and the other three sides are sealed (shown by a two-dot chain line in the drawing). The permeated water is isolated from the raw water by this sealing part 31.

Examples of the configuration of the sealing part of the permeate-side face include adhesion with resin such as an adhesive (inclusive of a hot melt, etc.) or the like, fusion using heating or laser, or the like, sealing by inserting a rubber-made sheet, and the like. Sealing by adhesion is especially preferred because it is simplest and high in effects. Such methods may also be applied for sealing of the feed-side face. However, the sealing methods may be the same as or different from each other between the permeate-side face and the feed-side face.

As described above, in view of the fact that the feed-side face of the separation membrane is sealed but not folded, deflection in the edge of the separation membrane is hardly generated. As a result, the generation of leakage is suppressed.

A specific method of air leakage test is as follows. The edge of the center pipe of the separation membrane element is sealed, and air is injected from the other edge. The injected air passes through pores of the water collection tube and reaches the permeate-side of the separation membrane. Because of a reason, such as the generation of deflection in the neighborhood of the fold to be caused due to insufficient folding of the separation membrane as described above, etc., when voids are present in the sealed portion in the permeate-side face, the air moves into the feed-side of the separation membrane. Then, the air leaks into water from the edge of the separation membrane element, namely a space between the feed-side faces. The air leakage at this time can be confirmed as the generation of an air bubble.

In the envelope-shaped membrane, the separation membranes facing to each other may include the same configuration as or a different configuration from each other. That is, in the separation membrane element, the above-described permeate-side channel member has only to be arranged on at least one of the two permeate-side faces facing to each other, and therefore, a separation membrane including a permeate-side channel member and a separation membrane not including a permeate-side channel member may be alternately stacked. However, for the sake of explanation, in the separation membrane element and the related explanation thereto, the "separation membrane" includes a separation membrane not including a permeate-side channel member (for example, a membrane including the same configuration as in the separation membrane main body).

In the permeate-side face, or in the feed-side face, the separation membranes facing to each other may be two different separation membranes from each other, or may be one folded separation membrane.

The envelope-shaped membrane may be formed by folding a separation membrane such that the permeate-side face of the separation membrane is faced inwardly, or may be formed by sticking two separate separation membranes to each other such that the permeate-side faces face to each other.

(2-2-2) Sealing Part
<Configuration of Sealing Part>

The sealing part of the envelope-shaped membrane is hereunder described. In the sealing part sealing the space between the permeate-side faces of the separation membrane, at least a part thereof may be arranged more outwardly than the channel member in the membrane surface direction (x-y plane surface direction).

The sealing part is arranged in a strip-like state on at least both edges in the width direction of the separation membrane main body, and more preferably, the sealing part is arranged in a strip-like state on the both edges in the width direction of the separation membrane main body and the outer edge in the winding direction, respectively. Hereinafter, the sealing part of the outer edge in the winding direction may be referred to as a first sealing part 311, and the portions arranged on the both sides in the width direction may be referred to as second sealing parts (312, 313). The second sealing parts are provided in an upstream-side edge and a downstream-side edge, respectively in the feed direction of raw water and are referred to as "upstream-side sealing part 312" and "downstream-side sealing part 313", respectively. The ranges of the first sealing part 311 and the second sealing parts 312 and 313 are those shown in FIG. 13, respectively.

<Width of Sealing Part>

As shown in FIG. 13, when the separation membrane 3 constituted by applying an adhesive on the outer edge in the winding direction on the permeate-side face of the separation membrane main body and the both edges in the width direction is wound, the adhesive spreads between the separation membranes, and a plurality of asperities exist in a projected view (adhesive region) of the second sealing parts 312 and 313. This is caused due to variation in an application amount of the adhesive. The term "a plurality asperities exist" means that two or more structures in a state of including either one or both of a convex and a concave and having a difference in height between the convex and the concave of 0.5 mm or more exist. When the projected view of the second sealing part includes a plurality of asperities, the adhesive spreads well, the height of the adhesive becomes uniform, and as a result, the sealing properties of the whole of the envelope-shaped membrane become also uniform. At this time, a variation coefficient of the widths in the second sealing part (widths of the uneven parts) is preferably 10% or less, and more preferably 5% or less. When the variation coefficient of the widths of the uneven parts is 10% or less, an invalidated portion of the membrane can be minimized, and a high water production amount can be obtained. It is possible to measure the variation coefficient of the widths of the uneven parts by a method described in the Examples as described later.

However, in the case where the number of leaves is multiple as in a separation membrane element having a 4-inch size, a separation membrane element having an 8-inch size, or a separation membrane element having a 16-inch size, even when a part of the leaves falls outside the above-mentioned range, the influence against the whole becomes small, so that 40% or less of the number of charged leaves may fall outside the above-mentioned range.

A width of the sealing part (width of the strip-like adhesive region) is preferably in the range of 5 mm or more and 60 mm or less, and more preferably in the range of 10 mm or more and 45 mm or less. When the width of the sealing part falls within the foregoing range, the effects of the present invention can be enhanced. When the width of the sealing part is less than 5 mm, the sealing properties of the element become insufficient, leading to a lowering of salt removal properties. On the other hand, when the width of the sealing part is more than 60 mm, a sufficient effective membrane area is not obtained, and the water production amount decreases.

Figure 14:
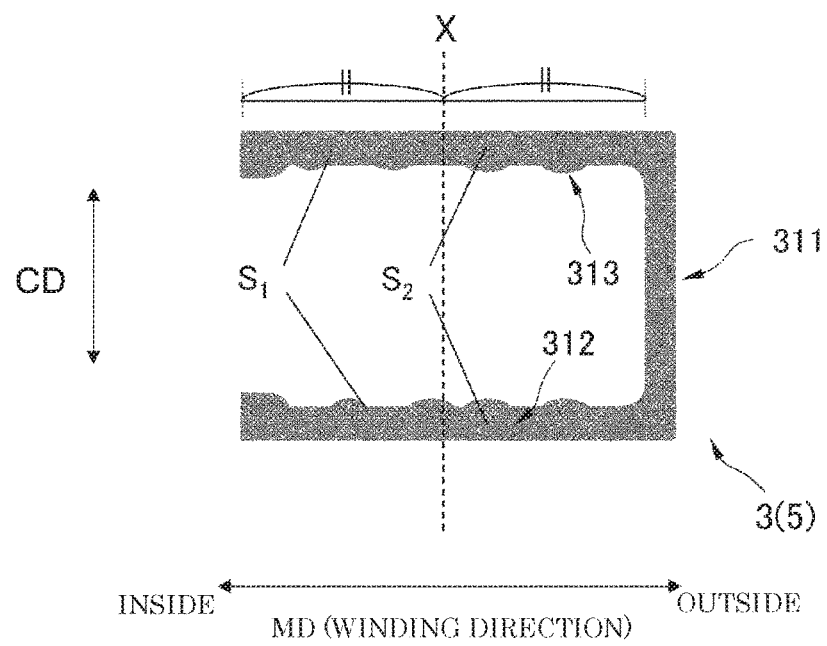
FIG. 14 is a schematic view showing a difference of projected area in a lengthwise direction of a sealing part.

As shown in FIG. 14, when the second sealing parts 312 and 313 of the envelope-shaped membrane are equally bisected so as to be orthogonal to the lengthwise direction thereof, the projected areas of the second sealing parts 312 and 313 as compared while making a parting line X as an axis of symmetry are defined as $S_1$ and $S_2$, respectively from the inside in the winding direction. The permeated water having been filtrated through the separation membrane moves from the outside in the winding direction toward the inside within the leaf. When a magnitude relation in the projected area between these second sealing parts is ($S_1 > S_2$), a range where the permeated water is capable of flowing therein is narrow, so that a high flow resistance is generated in the outer portion in the winding direction of the leaf. Conversely, when the magnitude relation is ($S_1 < S_2$), a moving range of the permeated water becomes gradually narrow, leading to an increase of the flow resistance, too. In any way, it becomes difficult to reveal a stable element performance over a long period of time. From this fact, it is preferred that $S_1$ and $S_2$ are equal to each other. Specifically, a difference between the both is preferably 15% or less.

Figure 15:
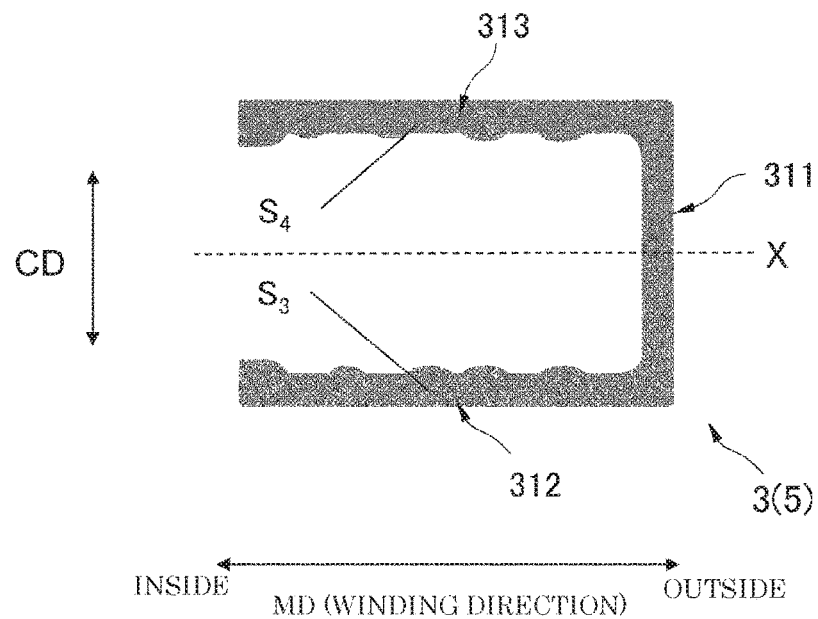
FIG. 15 is a schematic view showing a difference of projected area in a width direction of a sealing part.

Furthermore, as shown in FIG. 15, when the envelope-shaped membrane is equally bisected so as to be orthogonal to the width direction, so far as a difference between a projected area $S_3$ of the first sealing part 311 and the second sealing part 312 and a projected area $S_4$ of the first sealing part 311 and the second sealing part 313 as compared while making a parting line X as an axis of symmetry is 15% or less, the raw water can be equally fed into the upstream side and the downstream side of the separation membrane, so that the linear speed is kept constant. According to this, a stable element performance can be revealed over a long period of time, and hence, such is preferred.

Incidentally, a variation coefficient of the width of the first sealing part 311 is not particularly limited.

<Formation of Sealing part>

Examples of a method for arranging a sealing part include conventionally known methods, such as a method in which an adhesive is discharged while moving a discharge nozzle along the edge in the winding direction, and the separation membrane is wound to cure the adhesive, etc. Examples of a method for varying an application width of the adhesive include a method in which the discharge amount is gradually varied while moving the discharge nozzle at a fixed speed, and a method in which the moving speed is varied while fixing the discharge amount constant. It is also possible to provide a sealing part by a method of making the discharge nozzle gradually far from the edge, a method of making the discharge nozzle gradually near to the edge, or a combination of these methods.

As for a sealing step, the sealing part can be obtained by a method in which on the occasion of stacking the envelope-shaped membrane and winding, the adhesive is applied such that the width of the inner peripheral side is broader than that of the outer peripheral side, followed by adhesion and curing. As the adhesive, any of conventionally known adhesives, such as a urethane-based adhesive, an epoxy-based adhesive, and a hot-melt adhesive, can be used.

A viscosity of the adhesive is preferably in the range of 15 Pa·s or less, and more preferably in the range of 12 Pa·s or less. When the viscosity of the adhesive is 15 Pa·s or less, at the time of winding the envelope-shaped membrane around the water collection tube, wrinkles are hardly generated. Since the adhesive can be thoroughly impregnated in the separation membrane, the adhesive is able to embed voids in the substrate in the peripheral edge of the separation membrane, thereby enabling the raw water to be prevented from inflow. The viscosity of the adhesive is preferably 4 Pa·s or more, and more preferably 5 Pa·s or more. When the viscosity is 4 Pa·s or more, outflow of the adhesive from the edge of the envelope-shaped membrane can be suppressed. As a result, adhesion of the adhesive to undesired portions other than the portions to be sealed can be suppressed.

As such an adhesive, an adhesive that is a mixture of an isocyanate as a main ingredient and a polyol as a curing agent in a proportion of the isocyanate to the polyol of 1/1 to 1/5 is preferred. As for the viscosity of the adhesive, the viscosity of each of the main ingredient alone, the curing agent alone, and the mixture thereof in a specified blending ratio can be previously measured by a B-type viscometer (ISO 15605:2000).

Examples of the adhesive include not only a reactive-type adhesive but also an adhesive that is solidified upon vaporization of a solvent, a hot-melt or heat-seal thermoplastic resin, a UV-curable resin, and a thermosetting resin.

When the channel member includes a groove continuing from the inner periphery toward the outer periphery of the envelope-shaped membrane, even if the sealing material is crushed by winding, the channel member works as a wall to enable the sealing material to be prevented from spreading, leading to uniformity of the thickness of the sealing material. That is, since the thickness of the sealing material can be made uniform, the outside diameter of the element tends to become uniform, and even in the case of loading the element in a pressure vessel for the actual operation, the element is free from breakage.

<Adhesive Support>

At least a part of the sealing part may include an adhesive support arranged on the permeate-side face of the separation membrane and an adhesive layer arranged on the adhesive support. In particular, in the case of using a liquid adhesive for the formation of the sealing part, by including the adhesive support, there is brought an effect for absorbing the excessive adhesive, thereby suppressing excessive spreading of the adhesive. The position at which the adhesive support is arranged as well as the number, shape, and so on of the adhesive support are not limited to specific configurations.

A specific example of the configuration in which the sealing part includes the adhesive support and the adhesive layer is hereunder described.

Figure 16:
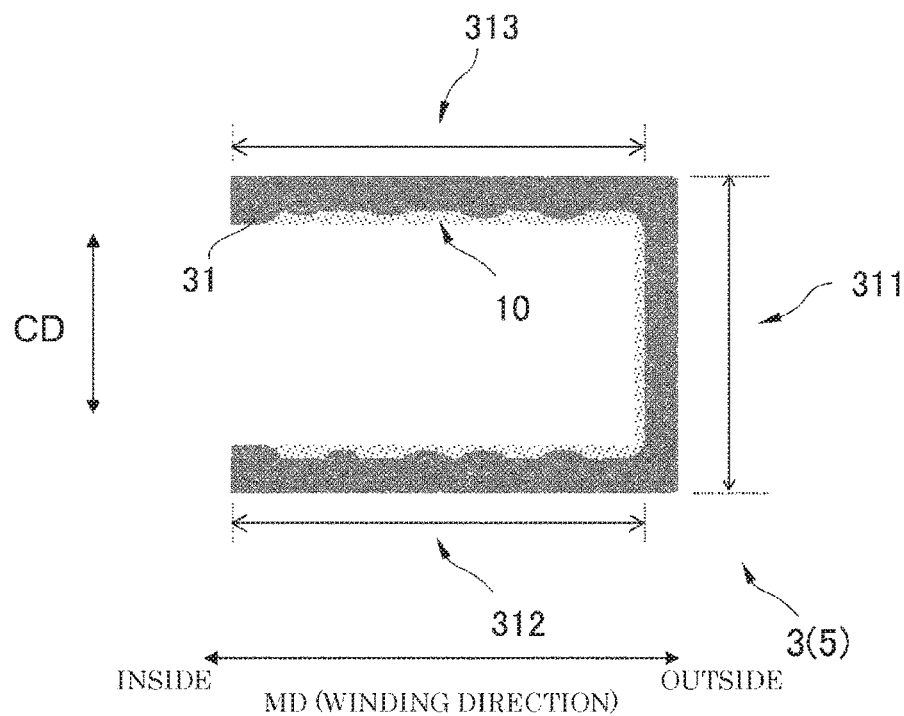
FIG. 16 is a schematic view showing another example of a configuration of a sealing part in a separation membrane.

In a configuration shown in FIG. 16, an adhesive support 10 is arranged over the whole of the first sealing part 311 and the second sealing parts (312, 313). In the present embodiment, the width of the sealing part 31, namely a maximum value of the width of the adhesive layer is coincident with the width of the adhesive support 10.

The position of the adhesive support 10 in the sealing part 31 is not particularly limited. For example, the adhesive support 10 may be arranged in only a part of the sealing part 31.

Figure 17:
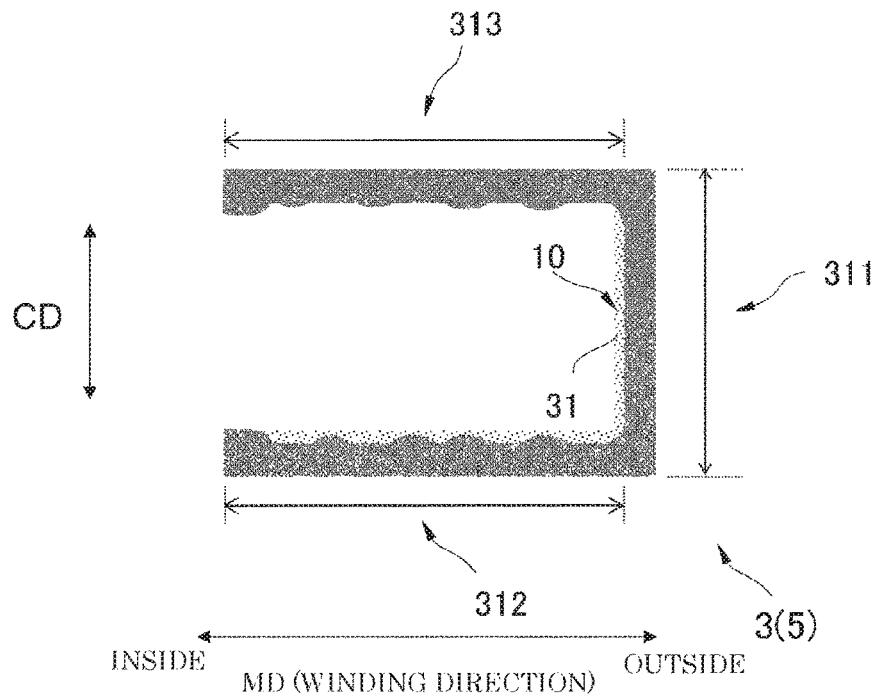
FIG. 17 is a schematic view showing still another example of a configuration of a sealing part in a separation membrane.

In FIG. 17, as such an example, the adhesive support 10 is arranged in only the first sealing part 311 and the upstream-side sealing part 312 but not arranged in the downstream-side sealing part 313.

Figure 18:
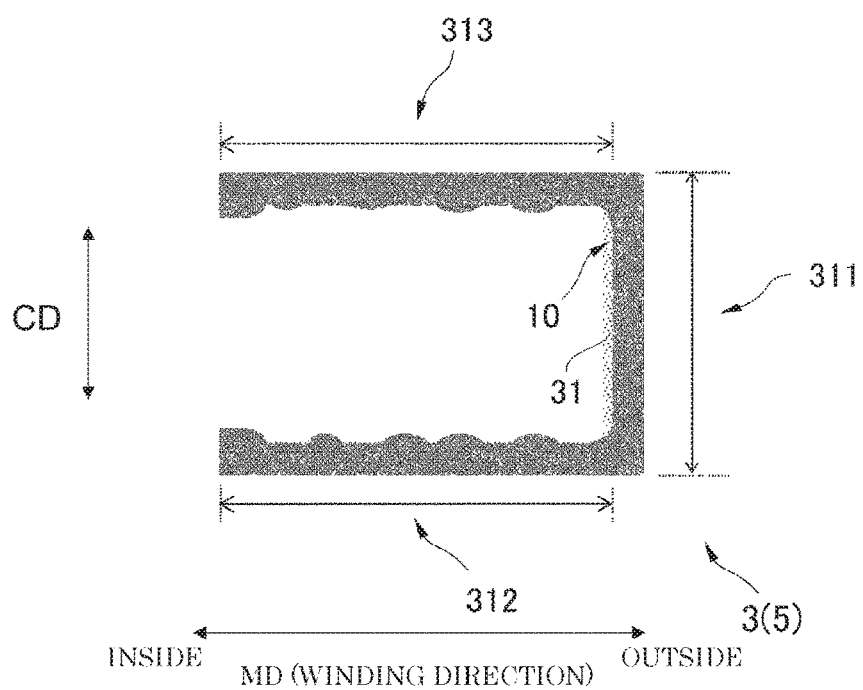
FIG. 18 is a schematic view showing still another example of a configuration of a sealing part in a separation membrane.

In FIG. 18, as such an example, the adhesive support 10 is arranged in only the first sealing part 311 but not arranged in the upstream-side sealing part 312 and the downstream-side sealing part 313.

Figure 19:
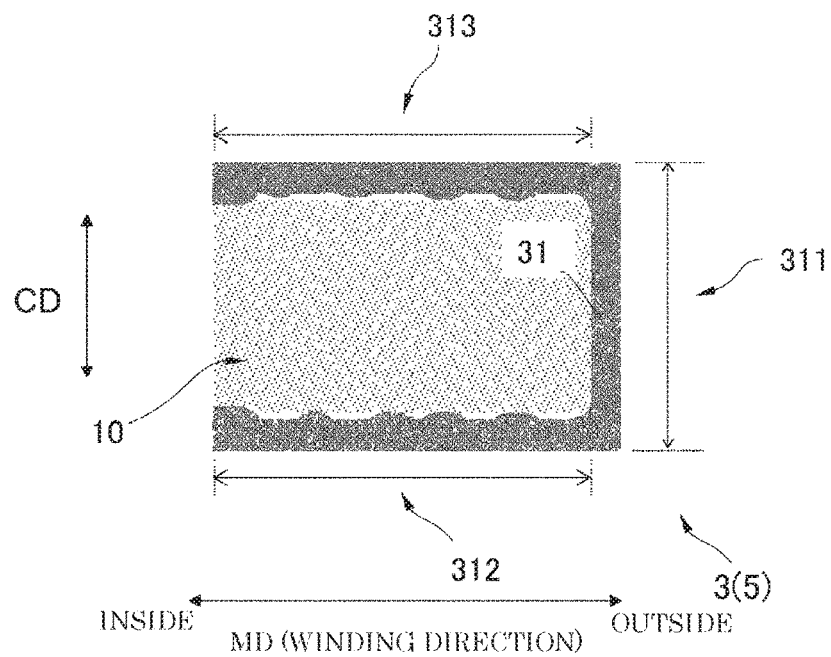
FIG. 19 is a schematic view showing still another example of a configuration of a sealing part in a separation membrane.

In FIG. 19, as such an example, the adhesive support 10 is arranged so as to cover the inside of the sealing part 31, namely the whole of an effective membrane portion in the separation membrane 3. At this time, a permeate-side channel member, such as a sheet onto which projections as described later are fixed, can also be used as the adhesive support.

In this way, the adhesive support may be arranged at any position of one side or both sides of the strip-shaped edge in the longitudinal direction of the water collection tube and the outer edge in the winding direction, and may also be arranged so as to cover the whole of an effective membrane portion in the separation membrane 3.

Figure 20:
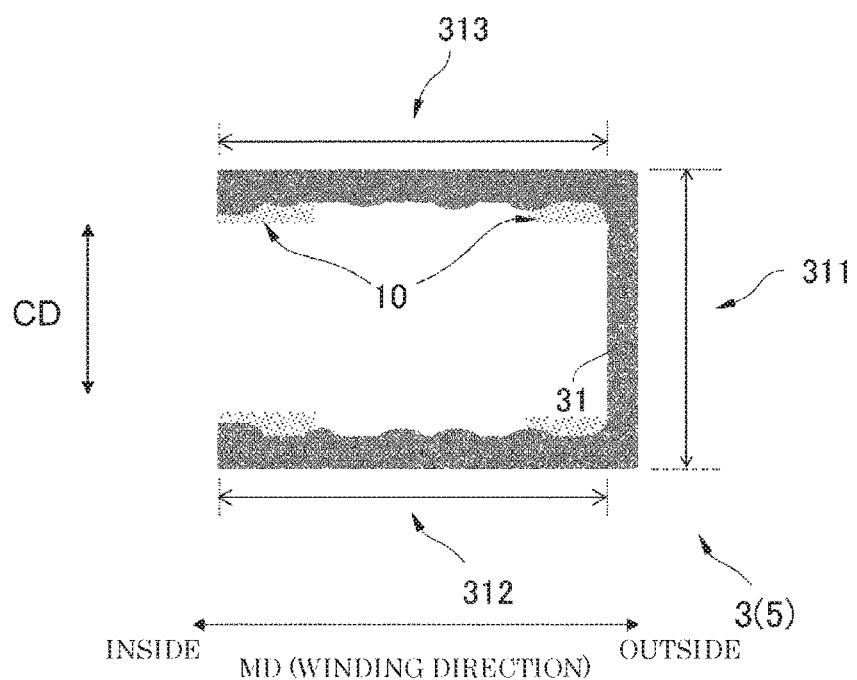
FIG. 20 is a schematic view showing still another example of a configuration of a sealing part in a separation membrane.

The adhesive support may be discontinuous. In FIG. 20, as such an example, the adhesive support 10 is arranged such that it is divided into two places in the second sealing parts 312 and 313.

In any configuration, the adhesive support 10 may be arranged after applying an adhesive on the separation membrane 3 or may be arranged such that the support having been impregnated with an adhesive in advance is arranged. The adhesive layer is formed by further applying an adhesive on the adhesive support 10.

It is preferred that the adhesive support is able to realize all or any of an effect for maintaining the adhesive, an effect for decreasing the use amount of the adhesive, and an effect for suppressing spreading of the adhesive.

The kind of the adhesive support is not particularly limited. However, when the adhesive support is a porous material, since the impregnation of the adhesive into the adhesive support is advanced, the adhesive can be applied after arranging the adhesive support in the separation membrane main body, and the process tends to become simple and easy, and hence, such is preferred. The impregnation amount of the adhesive into the adhesive support is not particularly limited so far as the effects of the present invention are obtained.

As the adhesive support, a film, a tape, a separation membrane, a resin-made sheet-shaped material, a paper, a glass fiber, a ceramic fiber, a silica fiber, an alumina fiber, a metal fiber, a metal thin plate, a rubber, a woven fabric, a knitted fabric such as a tricot, a nonwoven fabric, a sponge, porous silicon, a porous sheet-shaped material, a net, and the like are preferred. These materials can be used alone or as a mixture of any two or more thereof.

A thickness of the adhesive support is preferably equal to or less than the height of the channel member. This is because so far as the thickness of the adhesive support falls within the foregoing range, the membrane area capable of loading in the separation membrane element can be maintained.

The thickness of the adhesive support is preferably 0.02 mm or more. According to this, when the envelope-shaped membrane is wound around the water collection tube, there is obtained such an advantage that not only a decrease of the effective membrane area to be caused due to flowing of the adhesive can be suppressed, but also a space between the membranes can be effectively sealed while controlling the use amount of the adhesive.

<Second Embodiment>

As described above, the envelope-shaped membrane of the first embodiment is configured of the separation membrane main body including the permeate-side channel member; however, the separation membrane can also be configured of separate members without integrating the separation membrane main body and the permeate-side channel member with each other. The second embodiment of the present invention is hereunder described.

3. Separation Membrane (3-1) Separation Membrane Main Body

The separation membrane main body in the second embodiment can be formed of the same ingredients and configuration as in those capable of being used in the first embodiment.

(3-2) Sheet Channel Member Having Projections Fixed Thereto

Figure 21:
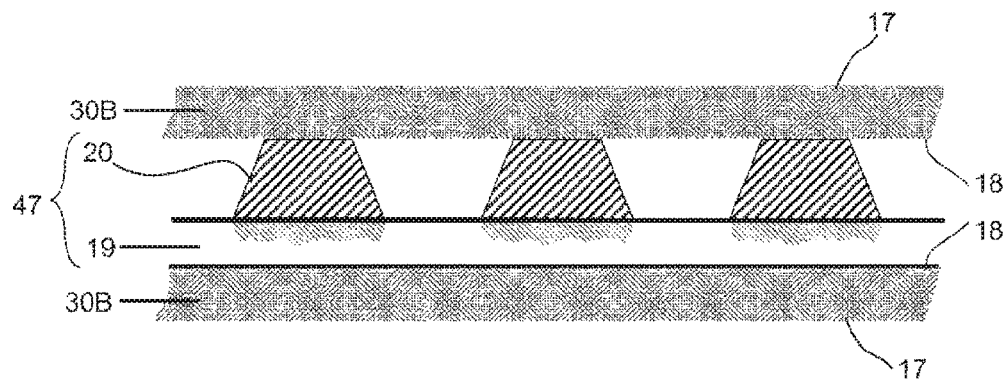
FIG. 21 is a cross-sectional view showing one example of a sheet channel member in which projections are fixed onto a sheet.

In the second embodiment, the sheet having projections fixed thereto (also referred to as "projection-fixed sheet") can be adopted as the permeate-side channel member. As shown in FIG. 21, a sheet channel member 47 in which projections 20 are fixed onto a sheet 19 is arranged as the permeate-side channel member on the permeate-side faces 18 of two separation membrane main bodies 30B.

In the case of the sheet channel member 47 in which the projections 20 are fixed to the sheet 19, even when the neighboring projections bond to each other owing to position accuracy failure or working malfunction in forming projections on a sheet to clog the permeated water flow channel (groove between projections), the inside area of the sheet could be a flow channel, and therefore, the permeated water can move to a different groove via the sheet. Further, since projections are fixed onto a sheet, the performance of the separation membrane itself does not degrade in forming the projections.

The sheet may be a fibrous substrate, a porous film, or the like, but from the standpoint of strength and water permeation, a fibrous substrate is preferably used.

As the fibrous substrate, any of a long-fiber nonwoven fabric or a short-fiber nonwoven fabric can be preferably used, and from the standpoints of adhesiveness of projections to the sheet, impregnation properties of adhesive into the sheet in sealing up the permeate-side faces of two separation membranes, and prevention of breakage of sheet in sheet conveyance, it is preferred that a thickness of the fibrous substrate is in the range of from 20 to 150 μm, and a unit weight thereof is in the range of from 20 to 100 g/m².

In the present invention, the projections comprise a composition containing the polypropylene (A) as a main component and satisfy the following requirements (a) to (c).

(a) A softening point temperature is 60° C. or higher.
(b) A tensile elongation in the standard state is 10% or more.
(c) A yield point stress under a wet condition at 50° C. is 2 MPa or more.

In the present invention, it is important that a softening point temperature of the projections fixed onto the sheet is 60° C. or higher.

When the softening point temperature of the projections is 60° C. or higher, even in the case of storage under a high-temperature environment, for example, in a state of stacking the projection-fixed sheets, or in a state of winding up around a paper tube or the like, the projections are hardly softened and deformed. For that reason, even in the case of storage under a high-temperature environment, it is possible to suppress a fluctuation of quality of the projection-fixed sheet. Furthermore, on preparing an element using the stored projection-fixed sheet, adhesion of the projections to a face (raw water-side face) facing to the projections is suppressed, and handleability in a preparation process of separation membrane element becomes good. Furthermore, even when performing operation of the separation membrane element under pressure at a high temperature for a long period of time, softening and deformation of the projections can be suppressed, whereby the performance of the separation membrane element becomes stable. The softening point temperature is preferably 70° C. or higher, and more preferably 80° C. or higher.

In the present invention, it is important that a tensile elongation of the projections fixed onto the sheet in the standard state is 10% or more.

In the case where the tensile elongation of the projections is 10% or more, the projections have sufficient flexibility, and therefore, even when the projection-fixed sheet is conveyed on rolls or wound around a winder, the projections can be prevented from being damaged or broken. That is, a projection-fixed sheet having good handleability and high quality can be obtained. The tensile elongation thereof is preferably 15% or more, and still more preferably 20% or more. In addition, as the tensile elongation is high, the energy required for breakage becomes high, and such is preferred from the standpoint of toughness. However, when the tensile elongation is excessively high, the deformation amount under a constant stress becomes large. Therefore, the tensile elongation is preferably 1,000% or less, and more preferably 800% or less.

In the present invention, it is important that a yield point stress of the projections fixed onto the sheet under a wet condition at 50° C. is 2 MPa or more.

When the yield point stress of the projections under a wet condition at 50° C. is 2 MPa or more, even when the separation membrane element is operated under high-temperature and high-pressure conditions, the projections can be greatly prevented from being deformed, and hence, the performance of the separation membrane element becomes good. The yield point stress of the projections is preferably 3 MPa or more, and more preferably 4 MPa or more. From the viewpoint of suppressing the deformation amount, it is preferred that the yield point stress is high as far as possible. However, it is substantially difficult to achieve a yield point stress of 20 MPa or more.

In the present invention, an elongation of the projections at a yield point under a wet condition at 50° C. is preferably 30% or less. When the elongation of the projections at a yield point under a wet condition at 50° C. is 30% or less, the excessive deformation amount under a high pressure can be suppressed, and the stable performance of the separation membrane element can be revealed. The elongation of the projections at a yield point is more preferably 25% or less, and still more preferably 20% or less.

Examples of the polypropylene (A) that is the main component of the composition constituting the projections fixed onto the sheet include a propylene homopolymer (e.g., isotactic polypropylene, syndiotactic polypropylene, or atactic polypropylene); a propylene random copolymer; a propylene block copolymer; a mixture of two or more kinds of these materials; and the like. Above all, from the viewpoints of versatility, handleability in the processing step, and performance of the separation membrane element, low-to high-stereoregularity isotactic polypropylenes are preferred. A content of the polypropylene in the projections may be properly set so as to satisfy the above-described requirements. However, from the viewpoints of storage stability at high temperatures, process passing property in each step, and element performance, the content of the polypropylene is preferably 70% by weight or more, more preferably 75% by weight or more, and still more preferably 80% by weight or more in the composition.

In the present invention, the projections fixed onto the sheet may contain one or more additives, such as a thermal flowability improver (B), a filler (C), a crystal nucleating agent (D), an antioxidant (E), and a lubricant (F), within the range where the object of the present invention is not impaired.

As the thermal flowability improver (B), for example, there can be exemplified the above-described synthetic waxes (B-1), terpene-based resins (B-2), hydrogenated petroleum resins (B-3), petroleum waxes (B-4), natural waxes (B-5), and rosin-based resins (B-6); and the like. But, the thermal flowability improver (B) is not limited thereto. These materials may be used alone or as a mixture of any two or more thereof.

Among these, the synthetic wax (B-1), the terpene-based resin (B-2), and the hydrogenated petroleum resin (B-3) are preferred from the standpoints of an effect for improving thermal flowability of the composition, compatibility with the polypropylene (A), and thermal decomposition resistance of the composition at the time of heat melting. The content thereof may be properly set for the purpose of controlling a melt viscosity of the composition constituting the projections. However, in view of preventing the pressure resistance and tensile elongation at high temperatures from lowering and preventing the generation of bleeding out onto the surfaces of the projections, it is preferred that the content thereof is lower than the content of polypropylene in the composition. Specifically, the content thereof is preferably 40% by weight or less, more preferably 35% by weight or less, and still more preferably 30% by weight or less.

As the filler (C), the above-described inorganic compounds can be exemplified. But, the filler (C) is not limited thereto. These materials may be used alone or as a mixture of any two or more thereof. From the standpoints of moldability of the projections, suppression of the viscosity increase of the composition, and abrasion of processing devices, a content of the filler (C) is preferably 3 to 30% by weight relative to the composition.

As the crystal nucleating agent (D), there can be exemplified the above-described organic carboxylic acid metal salt-based compounds (D-1), organic phosphoric acid metal salt-based compounds (D-2), sorbitol-based compounds (D-3), metal salt-based compounds of rosin, and amide-based compounds; and the like. These materials may be used alone or as a mixture of any two or more thereof.

A preferred content of the crystal nucleating agent (D) in the projections fixed onto the sheet is in the range of from 0.01 to 1.00% by weight. When the content of the crystal nucleating agent is 0.01% by weight or more, a crystallization rate of the composition constituting the projections can be accelerated, and therefore, for example, moldability and handleability in the melt molding step of the projections and mechanical properties and heat resistance of the projections can be improved. On the other hand, when the content of the crystal nucleating agent is more than 1.00% by weight, the effect for improving the crystallization rate can be no longer expected, and such is not preferred from the viewpoint of economy. The content of the crystal nucleating agent is more preferably 0.02 to 0.80% by weight, and still more preferably 0.04 to 0.60% by weight.

As the antioxidant (E), there can be exemplified the above-described phenol-based compound, phosphorus-based compound, hindered amine-based compound, and sulfur-based compound; and the like. But, the antioxidant (E) is not limited thereto. These materials may be used alone or as a mixture of any two or more thereof. From the standpoints of preventing thermal decomposition of the composition at the time of molding of the projections, the content thereof is preferably 0.001 to 1% by weight relative to the composition.

As the lubricant (F), there can be exemplified the above-described fatty acid amide-based compounds, metal soaps, and fatty acid ester-based compounds; and the like. But, the lubricant (F) is not limited thereto. These materials may be used alone or as a mixture of any two or more thereof. From the viewpoint of reduction of friction between the composition and the processing machine, or between the compositions each other and the viewpoint of molding stability at the time of molding projections, a content of the lubricant (F) is preferably 1 to 30% by weight relative to the composition.

In the present invention, a crystallization peak temperature of the resin composition constituting the projections fixed onto the sheet is preferably 30° C. or higher.

When the crystallization peak temperature of the composition is 30° C. or higher, in the case of molding the projections on the sheet, the crystallization of the resin composition rapidly proceeds in a cooling process. For that reason, after molding processing of the projections, even in the case of stacking the projection-fixed sheet and the case of winding up the projection-fixed sheet around a paper tube or the like, the projections do not adhere to a face (raw water-side) facing to the projections, and therefore, the handleability in the production process of the separation membrane element and the quality of the projection-fixed sheet become good. Furthermore, on the occasion of subjecting the projection-fixed sheet to roll conveyance, even when the projections come into contact with the rolls, deformation of the projections or sticking of the projections onto the rolls is suppressed. The crystallization peak temperature of the composition is preferably 35° C. or higher, and more preferably 40° C. or higher.

In the case where an exothermic peak based on crystallization cannot be confirmed with DSC, a half-crystallization time at 30° C. is preferably 10 minutes or less.

When the half-crystallization time is 10 minutes or less, crystallization (solidification) of the projections thoroughly proceeds. Therefore, similar to that described above, the process passing property becomes good, such that in the case of stacking the projection-fixed sheet or the case of winding up the projection-fixed sheet, deformation of the projections or sticking of the projections onto the rolls can be suppressed, or the like. In addition, from the viewpoint of improving the productivity, such as an increase of processing speed, the half-crystallization time at 30° C. of the composition is preferably 7 minutes or less, and more preferably 5 minutes or less.

The shape of the projection may be a continuous one or a discontinuous one. The "continuous" projection is a projection that is separated as a member having an integrated shape without being divided into plural sections when separated from one sheet. On the other hand, the term "discontinuous" means that when the projection is peeled from the sheet, the projection is divided into plural sections.

For example, in the case of a channel member in which projections having a continuous shape are arranged on the sheet, a height of the flow channel is smaller than a thickness of the projections having a continuous shape. On the other hand, a thickness of the channel member in which the projections having a discontinuous shape are arranged is entirely utilized as the height of the flow channel, and therefore, the flow resistance of the discontinuous channel member can be reduced as compared with that of the continuous channel member, so that a water production amount can be increased.

FIG. 22 to FIG. 25 and FIG. 27 to FIG. 29 show examples of a discontinuous channel member.

Figure 22:
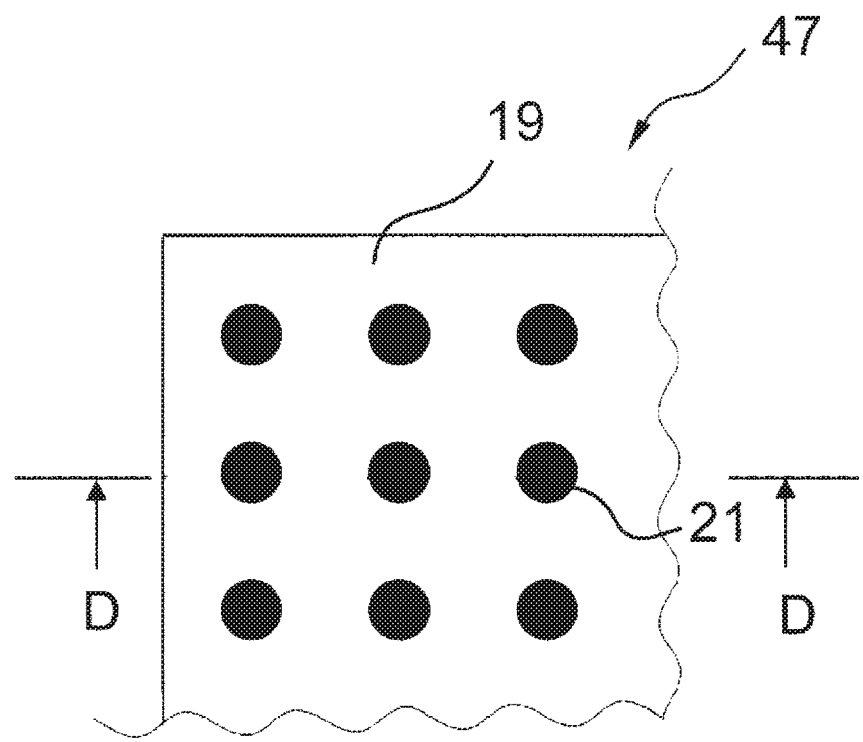
FIG. 22 is a plan view showing one example of a sheet channel member in which projections are fixed onto a sheet.
Figure 23:
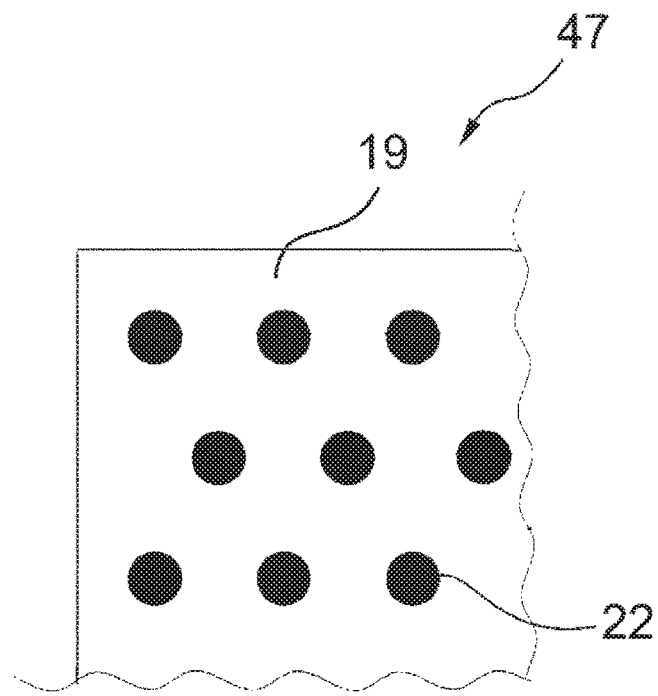
FIG. 23 is a plan view showing another example of a sheet channel member in which projections are fixed onto a sheet.
Figure 27:
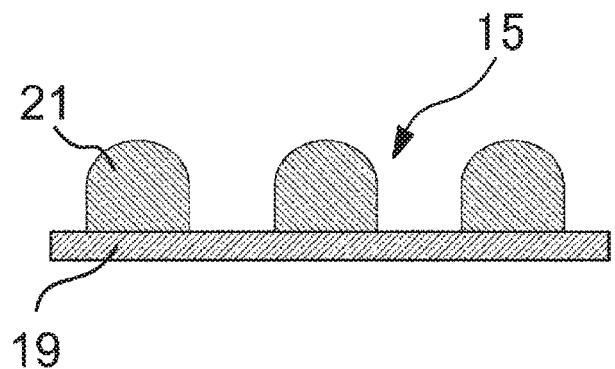
FIG. 27 is a cross-sectional view of the sheet channel member in which projections are fixed onto a sheet, viewing from the arrow direction of the D-D line in FIG. 22.

As shown in FIG. 22 and FIG. 27, projections 21 are a columnar member whose top is nearly semispherical and are arranged in a lattice-like pattern. Individual projections 22 shown in FIG. 23 each have the same shape as that of the projections 21 shown in FIG. 22, but in FIG. 23, the projections 22 are arranged in zigzag.

Figure 24:
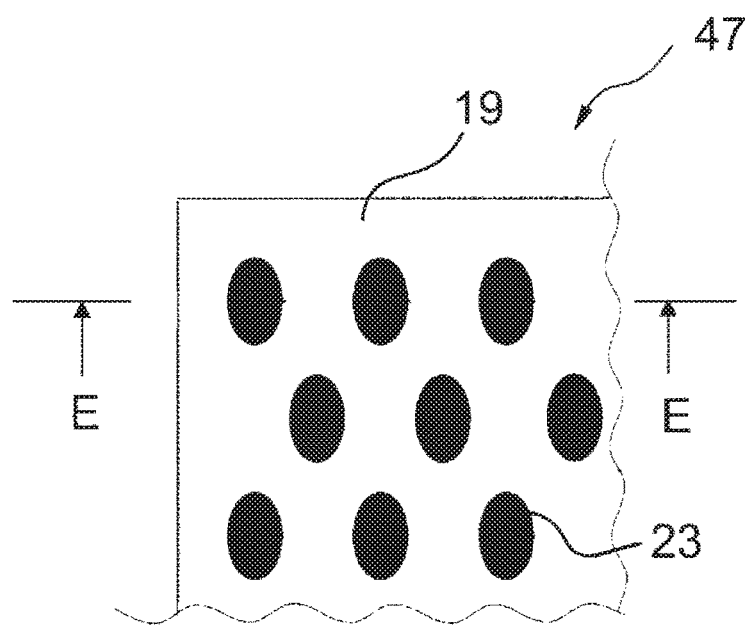
FIG. 24 is a plan view showing still another example of a sheet channel member in which projections are fixed onto a sheet.

As shown in FIG. 24, projections 23 are a columnar member whose plan view is oval and are arranged in zigzag. As shown in the cross section in FIG. 28, the top of the projection 23 is flat, and a shape of a cross section thereof is rectangular.

Figure 25:
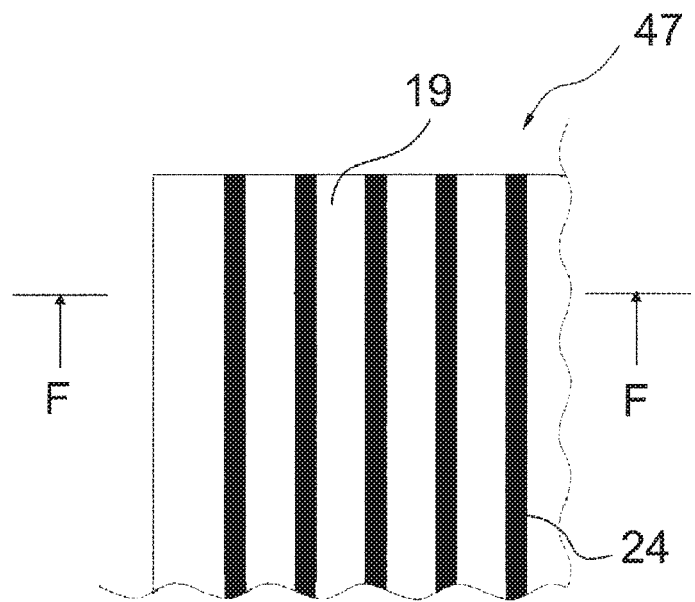
FIG. 25 is a plan view showing still another example of a sheet channel member in which projections are fixed onto a sheet.
Figure 29:
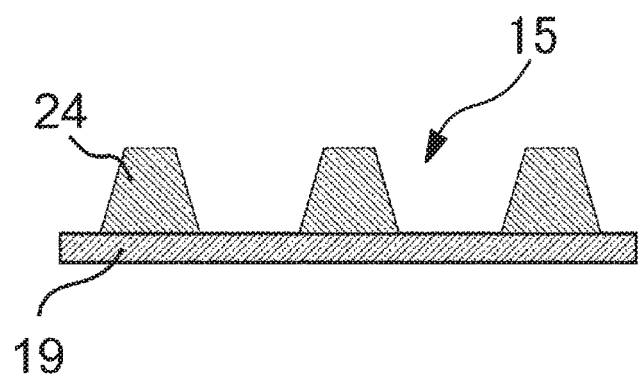
FIG. 29 is a cross-sectional view of the sheet channel member in which projections are fixed onto a sheet, viewing from the arrow direction of the F-F line in FIG. 25.

As shown in FIG. 25, projections 24 are a linear wall-like member as a plane shape thereof. The wall-like members are arranged in parallel to each other. As shown in FIG. 29, a cross section of the projection 24 on the plane surface vertical to the membrane surface is a trapezoidal one in which an upper width is narrower than a lower width.

Figure 26:
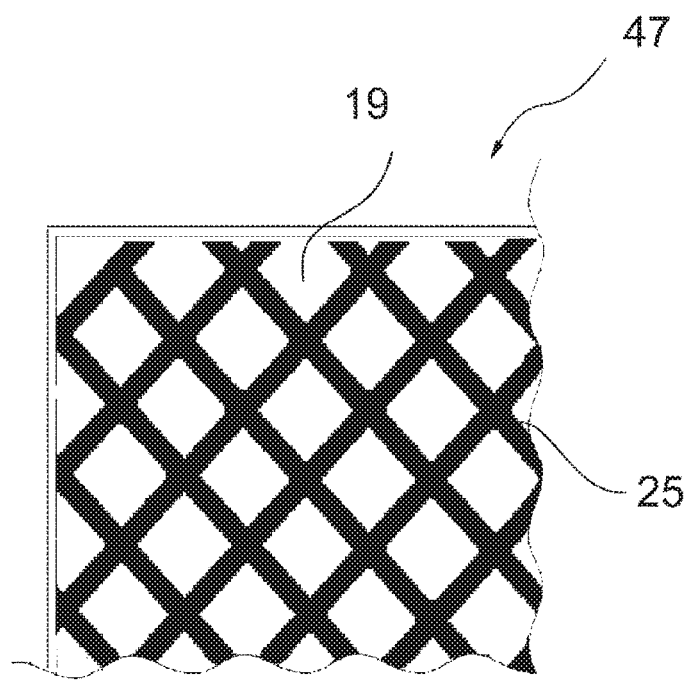
FIG. 26 is a plan view showing still another example of a sheet channel member in which projections are fixed onto a sheet.

FIG. 26 shows an example of continuous projections 25. As shown in FIG. 26, the projection 25 is a net-like member that continues in the membrane surface direction.

Figure 28:
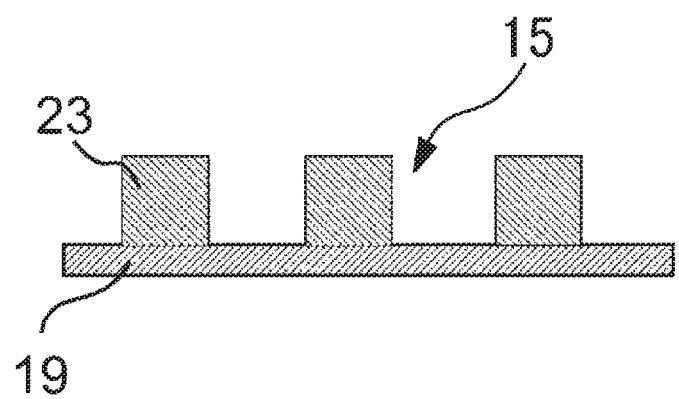
FIG. 28 is a cross-sectional view of the sheet channel member in which projections are fixed onto a sheet, viewing from the arrow direction of the E-E line in FIG. 24.

In any of the projections shown in FIG. 22 to FIG. 26, a cross-sectional shape thereof may be changed to a cross-sectional shape shown in FIG. 27 to FIG. 29. In other words, the shape of the plane and the shape of the cross section of projections and also the arrangement thereof that are described as different configurations can be combined with each other. In that manner, for the projections, any of the plane shapes of FIG. 22 to FIG. 26 are combined in any desired manner with any of the cross-sectional shapes of FIG. 27 to FIG. 29, and the resulting variations are included in the scope of the embodiments of the present invention.

As shown in FIG. 27 to FIG. 29, the permeate-side flow channel 15 is formed of any of projections 21, 23, and 24.

From the viewpoint of preventing sinking of the membrane among plural projections during operation under pressure using the separation membrane element, a space between the neighboring projections is preferably 50 to 5,000 μm, and more preferably 100 to 2,000 μm, and it is desirable that the separation membrane element is designed within the range. The space between the projections means a horizontal distance between a highest part of the projections differing in height and a highest part of other projections adjacent to the foregoing projections.

A thickness of the projections fixed onto the sheet is preferably 50 to 500 μm, more preferably 75 to 450 m, and still more preferably 100 to 400 m. When the thickness of the projections is 500 μm or less, the number of separation membranes capable of being loaded in one vessel can be increased. When the thickness of the projections is 50 μm or more, the flow resistance of a permeated fluid can be relatively reduced, and therefore, it is possible to make both good separation properties and a permeation performance compatible with each other.

The height difference of the projections fixed onto the sheet can be measured from a cross-cut sample using a digital microscope "VHX-1000" (a trade name), manufactured by Keyence Corporation. Arbitrary points differing in height are measured, and values of the thickness are summed up, and the resulting value is divided by a total number of the measurement points, whereby the height difference can be determined.

The projections fixed onto the sheet are arranged so as to continue from the inner edge to the outer edge of the sheet in the winding direction. It is preferred that the projections are orthogonal to the longitudinal direction of the water collection tube.

Regarding the configuration of the projections fixed onto the sheet, the projections may be formed to the edge of the sheet, or the sheet may have some area with no projection formed around the edge thereof. In other words, so far as the projections fixed onto the sheet are so arranged as to form flow channels on the permeate-side, the sheet may have any space with no projection formed therein. In the configuration having an area with no projection formed around the edge, when the permeate-side face of the separation membrane main body is fixed to another one with an adhesive, the adhesiveness between the separation membrane main bodies is improved because the adhesion faces do not have projections by asperities. Furthermore, in the case where no projection is formed on the adhesion face, the use amount of the channel member in such a part can be reduced.

As shown in FIG. 19, when the projection-fixed sheet is used so as to cover the inside of the sealing part 31, namely the whole of an effective membrane portion, it can play a role not only as the permeate-side channel member but also as the adhesive support 10.

As for the separation membrane element using the projection-fixed sheet having also a role as the adhesive support and including the above-described preferred composition as the projections, even in the case of performing the operation under pressure at a high temperature for a long period of time, softening and deformation of the projections can be suppressed, and not only the flow channel of the permeated water is ensured, but also the separation membrane main bodies are thoroughly adhered to each other. Thus, outflow of the permeated water toward the raw water side and inflow of the raw water toward the permeate-side are suppressed. That is, it is possible to maintain the stable water production amount and removal ratio under high-temperature and high-pressure conditions over a long period of time, and hence, such is preferred.

(3-3) Formation of Channel Member in Which Projections are Arranged on Sheet

Regarding a method of forming projections on a sheet and a case where a resin is formed into projections by heating, the requirements described in the above-described section "(1-4) Formation of permeate-side channel member" are favorably adopted.

4. Production Method of Separation Membrane Element

In the second embodiment, the configuration of the separation membrane element is the same as in the first embodiment.

(4-1) Preparation of Separation Membrane Leaf and Envelope-shaped Membrane

In the second embodiment, in the envelope-shaped membrane, the separation membrane main body(ies) is/are arranged such that the permeate-side faces thereof face to each other via the sheet channel member having projections fixed thereto, and at least both edges in the width direction on the permeate-side faces of the separation membrane main body(ies) are sealed by sealing parts, whereby the membrane is formed in an envelope-shaped state.

It is preferred that the production method of a separation membrane element includes a step of sealing the inner edge in the winding direction of the separation membrane on the feed-side face. In the sealing step, two separation membranes are stacked such that the respective feed-side faces face to each other. Furthermore, the inner edges of the two stacked separation membranes in the winding direction, namely the left-side edges in FIG. 13 and the like are sealed (preparation of a separation membrane leaf).

Examples of the "sealing" method include adhesion with an adhesive or a hot melt or the like, fusion using heating or laser, or the like, sealing by inserting a rubber-made sheet, and the like. Sealing by adhesion is especially preferred because it is simplest and high in effects.

On the occasion of preparing the separation membrane leaf, a feed-side channel member formed separately from the separation membrane may be arranged between the stacked separation membranes. As described above, by previously providing a height difference on the feed-side face of the separation membrane main body by embossing, resin application, or the like, the arrangement of the feed-side channel member can also be omitted.

Either sealing of the feed-side face (preparation of the separation membrane leaf) or sealing of the permeate-side face (preparation of the envelope-shaped membrane) may be first performed, and the sealing of the feed-side face and the sealing of the permeate-side face may be performed in parallel while stacking the separation membranes. However, in order to suppress the generation of wrinkles in the separation membranes at the time of winding, it is preferred that solidification of an adhesive or a hot melt, or the like on the edges in the width direction, namely solidification for forming the envelope-shaped membrane, or the like is completed after the finish of winding so as to tolerate a deviation of the separation membrane main bodies adjacent to each other in the lengthwise direction.

(4-2) Winding of Envelope-shaped membrane

When the envelope-shaped membrane (separation membrane) is wound around the periphery of the water collection tube, the envelope-shaped membrane is arranged such that the closed edge of the leaf, namely the closed portion of the envelope-shaped membrane faces the water collection tube. By winding the separation membrane around the periphery of the water collection tube in such an arrangement, the separation membrane is wound in a spiral fashion.

When a spacer, such as tricot or a substrate, is wound around the water collection tube, the adhesive applied to the water collection tube at the time of winding the element hardly flows, leading to suppression of leakage. Furthermore, a flow channel on the surroundings of the water collection tube is stably ensured. The spacer has only to be wound longer than the circumference of a circle of the water collection tube.

When tricot is wound around the water collection tube, the adhesive applied to the water collection tube at the time of winding the element hardly flows, leading to suppression of leakage. Furthermore, a flow channel on the surroundings of the water collection tube is stably ensured. The tricot has only to be wound longer than the circumference of a circle of the water collection tube.

(4-3) Other Steps

The method for producing the separation membrane element may include a step of further winding a film, a filament, or the like around the outside of the separation membrane-wound body formed in the foregoing manner, and additional other steps, such as a step of cutting the edges of separation membrane(s) in the longitudinal direction of the water collection tube and evening up them, and a step of attaching side plates.

5. Use of Separation Membrane Element

Separation membrane elements may be used as a separation membrane module by being connected in series or in parallel and housed in a pressure vessel.

In addition, the separation membrane element and the separation membrane module can be configured as a fluid separation apparatus by being combined with a pump for feeding a fluid thereinto, a fluid pre-treating unit, and the like. By using such an apparatus, for example, the feed water is separated into permeated water such as drinkable water, and concentrated water which has not passed through the membrane, whereby water meeting the intended purpose can be obtained.

The higher the pressure during operation of the fluid separation apparatus, the more improvement in removal efficiency is achieved, but the more energy is required for the operation. With consideration given to this point and further to maintenance capabilities of feed-side flow channel and permeate-side flow channel of the separation membrane element, it is preferred that the operation pressure at the time of permeation of raw fluid through the membrane module is in the range of from 0.1 to 2.0 MPa. Although the salt removal ratio decreases with an increase in raw fluid temperature, as the raw fluid temperature decreases, so does the membrane permeation flux. It is therefore preferred that the raw fluid temperature is in the range of from 5 to 50° C. Regarding the pH of raw fluid, when the pH thereof is high, a scale of magnesium or the like may form in the case of feed water having a high salt concentration, such as seawater, and there is a concern of membrane degradation owing to high pH operation, and therefore, the operation in a neutral range is preferred.

A fluid to be treated by the separation membrane element is not particularly limited, but when the separation membrane element is used for a water treatment, a liquid mixture containing 500 mg/L to 100 g/L of TDS (Total Dissolved Solids), such as seawater, brackish water, and waste water, may be exemplified as the feed water. In general, TDS represents a total dissolved solids amount and is expressed in terms of "weight/volume" or "weight ratio". According to the definition thereof, TDS can be calculated from the weight of matter remaining after evaporation of a solution filtered through a 0.45-μm filter at a temperature of 39.5 to 40.5° C., but more conveniently, it can be converted from practical salinity (S).

EXAMPLES

The present invention is hereunder described in more detail by reference to the following Examples, but it should be construed that the present invention is not limited to these Examples at all.

A. Softening Point Temperature of Permeate-side Channel Member

A sample prepared by peeling off a permeate-side channel member from a separation membrane main body was measured for the softening point temperature by using a thermomechanical analyzer, TMA/SS-6000, manufactured by Seiko Instruments Inc. under conditions of probe: penetration probe, measurement load: 10 g, and heating rate: 5° C./min. The measurement was repeated 5 times, and an average value thereof was defined as the softening point temperature.

B. Tensile Elongation of Permeate-side Channel Member

A sample prepared by peeling off a permeate-side channel member from a separation membrane main body was subjected to a tensile test in an environment at a temperature of 20° C. and a humidity of 65% by using an autograph, "AG-50NISMS" (a trade name), manufactured by Shimadzu Corporation under conditions of sample length: 10 cm and tensile rate: 10 cm/min. An elongation at a point of exhibiting a maximum load was defined as an elongation (%) of channel member. The measurement was repeated 5 times, and an average value thereof was defined as the elongation.

C. Yield Point Stress and Elongation of Permeate-side Channel Member

A sample prepared by peeling off a permeate-side channel member from a separation membrane main body was charged in a separately provided vessel and immersed in water (50±2° C.) for 10 minutes. Thereafter, the sample was lifted up from the vessel and then quickly subjected to a tensile test with an autograph, "AG-50NISMS" (a trade name), manufactured by Shimadzu Corporation under conditions of sample length: 10 cm and tensile rate: 10 cm/min. From the resulting stress-strain curve, a value obtained by dividing a stress at yield by a cross-sectional area of the sample provided for measurement was defined as a yield point stress, and an elongation at that time was defined as a yield point elongation. The measurement was repeated 5 times, and average values thereof were defined as the yield point stress and the yield point elongation, respectively.

D. Crystallization Temperature

The crystallization temperature was measured with a differential scanning calorimeter, Model DSC-7, manufactured by PerkinElmer, Inc. 10 mg of a resin composition sample constituting a permeate-side channel member was heated from 20° C. to 220° C. at a heating rate of 10° C./min, and after holding at 220° C. for 10 minutes, the resulting sample was cooled to 20° C. at a cooling rate of 10° C./min. A peak top temperature of an exothermic peak based on crystallization as measured on the occasion of cooling was defined as a crystallization temperature. The measurement was repeated 3 times, and an average value thereof was defined as the crystallization temperature.

E. Half-crystallization Time

The half-crystallization time was measured with a differential scanning calorimeter, Model DSC-7, manufactured by PerkinElmer, Inc. 10 mg of a resin composition sample constituting a permeate-side channel member was heated from 20° C. to 220° C. at a heating rate of 10° C./min, and after holding at 220° C. for 10 minutes, the resulting sample was cooled to 30° C. at a cooling rate of 10° C./min and held at 30° C. for 30 minutes. A time required for reaching ½ of a total heat quantity of crystallization obtained at this time was defined as a half-crystallization time. The measurement was repeated 3 times, and an average value thereof was defined as the half-crystallization time. Incidentally, in the case where a sample was not crystallized at 30° C., for convenience sake, the measurement at an isothermal crystallization temperature other than 30° C. was carried out in several points, and the half-crystallization time was determined from extrapolation values thereof.

F. Evaluation of Quality and Handleability of Separation Membrane Sheet

In a processing step of fixing a permeate-side channel member onto the substrate side of a separation membrane main body, processing with a length of 1 m at a processing rate of 2 m/min was carried out five times. Specifically, a resin melt was applied on the substrate side of a separation membrane main body. Thereafter, the resultant was conveyed on rolls having a diameter of 50 mm (angle of wrap: 180°, and after a processed part passed through the rolls, the conveyance was stopped.

Subsequently, the resultant was folded at 180° in a center of the separation membrane having the permeate-side channel member processed thereon in the lengthwise direction and held for one minute. Thereafter, the folding was released, the separation membrane was returned into an original state, and the number of defective places (broken places or peeled-off places) of the channel member was counted.

The same test was also carried out with respect to other samples, and five samples in total were evaluated. The quality and handleability were evaluated by using an average value of defective places generated in each sample according to the following criteria: "excellent", "good", and "poor". The grades "excellent" and "good" were regarded as acceptance, and the separation membrane was evaluated to be excellent in quality and handleability.

<Evaluation Criteria>
Excellent: 0≤(defective places)≤2
Good: 2<(defective places)≤5
Poor: 5<(defective places)

G. Evaluation of Separation Membrane and Sheet Channel Member Stored Under High-temperature Environment In a processing step of fixing a permeate-side channel member onto the substrate side of a separation membrane main body, or in a processing step of fixing projections onto a sheet, processing with a length of 1 m was carried out at a processing rate of 2 m/min. Specifically, a resin melt was applied on the substrate side of a separation membrane main body. Thereafter, the resultant was conveyed on rolls having a diameter of 50 mm (angle of wrap: 180°, and after a processed part passed through the rolls, the conveyance was stopped. Incidentally, in the case where the resin provided for the evaluation did not have a crystallization peak temperature, after stopping the conveyance, a heat treatment with a slit heater was carried out for ten minutes.

Thereafter, the separation membrane or sheet channel member in which the permeate-side channel member was processed was quickly cut out, two sample pieces having a size of 10 cm in square were prepared and stacked, and a load of 0.05 kgf/cm² was given to the sample pieces, followed by storing in a constant temperature and humidity chamber set up at a temperature of 50° C. and at a humidity of 95% RH for 24 hours.

With respect to the separation membrane or sheet channel member in which the permeate-side channel member was processed, before and after the storage, a height of the channel member was measured in 10 places by using a thickness measuring instrument, and a ratio of fluctuation in height was calculated according to the following expression.

Ratio of fluctuation in height [%]=[{(Height after storage)−(Height before storage)}/(Height before storage)]×100

Subsequently, an average value of the calculated ratio of fluctuation in height was determined, and after the storage, cut-off evaluation of the stacked sample pieces was carried out, thereby evaluating storage stability under a high-temperature environment according to the following criteria: "excellent", "good", and "poor". The grades "excellent" and "good" were regarded as acceptance, and the separation membrane or sheet channel member was evaluated to be excellent in storage stability.
<Evaluation Criteria>
Excellent: 0% (ratio of fluctuation in height)≤2%; the sample pieces are not adhered to each other
Good: 2% <(ratio of fluctuation in height)≤5%; the sample pieces are lightly adhered to each other
Poor: 5% <(ratio of fluctuation in height); the sample pieces are adhered to each other H. Space Between Permeate-side Channel Members Cross sections of ten arbitrary permeate-side channel members were photographed at a magnification of 500 times by using a scanning electron microscope, "S-800" (a trade name, manufactured by Hitachi, Ltd.). In the photographed image, a space between the permeate-side channel members adjacent to each other was measured.

I. Melt Viscosity

Using a capillary rheometer, "CAPILLOGRAPH 1B" (a trade name), manufactured by Toyo Seiki Seisaku-sho, Ltd. and using a die having L=40 mm and D=1 mm, a sample was measured at a temperature of 180° C. and at a shear rate of 24 sec$^{-1}$, and a value obtained was referred to as a melt viscosity [Pa·s]. Pellets provided for measuring the melt viscosity were dried in vacuum at a temperature of 100° C. for 8 hours before the measurement, and a melting time during the measurement was 5 minutes.

J. Variation Coefficient of Width of Sealing Part

As for a width of the sealing part in the both edges of the permeate-side of the separation membrane in the width direction, the resulting separation membrane element was disassembled; the width of the sealing part in each edge was measured at intervals of 1 mm in the membrane length direction by using a measure; an average value thereof and a standard deviation were calculated; and a value of (standard deviation)/(average value) was defined as a variation coefficient of the width of the sealing part.

K. Difference in Projected Area of Sealing Part Between Lengthwise Direction and Width Direction The separation membrane element after the operation was disassembled; as shown in FIG. 14, the second sealing parts 312 and 313 in each separation membrane were equally bisected so as to be orthogonal to the lengthwise direction; and the areas $S_1$ and $S_2$ of the second sealing parts in the respective portions were determined using a measure. Subsequently, a difference of the values in the respective portions was determined, and a value obtained by dividing by one-sided area was defined as the difference in projected area of the second dealing part.

In addition, as shown in FIG. 15, each of the separation membranes was equally bisected so as to be orthogonal to the width direction, and a sum of the areas of the sealing parts 311, 312, and 313 in each portion was determined using a measure and defined as $S_3$ and $S_4$, respectively. Subsequently, a difference between $S_3$ and $S_4$ was determined, and a value obtained by dividing by one-sided area was defined as the difference in projected area of the sealing part.

L. Effective Membrane Area

The separation membrane element after the operation was disassembled, and an area of the portion used for filtration in each of the separation membranes was determined using a measure.

M. Initial Water Production Amount and Initial Desalination Ratio (TDS Removal Ratio)

In the spiral-type separation membrane element, saline water having a concentration of 500 mg/L and a pH of 6.5 was fed as feed water. Operation was carried out for 24 hours (temperature: 25° C.) under a pressure condition as described in the Examples. Thereafter, the operation was carried out for 10 minutes under the same condition to obtain permeated water (p1). Subsequently, the temperature was changed to 50° C., and continuous operation was further carried out for 24 hours. Thereafter, the operation was carried out for 10 minutes under the same condition to obtain permeated water (p2). From the permeated water amounts (p1 and p2), the permeated water amount (cubic meter) per day per the separation membrane element was represented as the water production amount [m$^3$/day] (condition at 25° C.: P1, condition at 50° C.: P2), and a water production amount ratio was calculated according to the following expression.

Water production amount ratio=$P2/P1$

In addition, an electroconductivity of each of the feed water and the permeated water was measured with an electroconductivity meter, manufactured by DKK-TOA Corporation, thereby measuring a practical salinity (S). The resultant practical salinity was regarded as a salt concentration, and a TDS removal ratio (condition at 25° C.: R1, condition at 50° C.: R2) was determined according to the following expression.

TDS removal ratio (%)=100×[{1−(TDS concentration in permeated water)/(TDS concentration in feed water)}]

N. Long-term Evaluation

With respect to the element which had been subjected to the evaluation of the initial water production amount and the initial desalination ratio, a cycle (start-stop) of performing the operation for one minute at a temperature of 50° C. under a pressure condition as described in the Examples by using saline water having a concentration of 500 mg/L and a pH of 6.5 and then stopping the operation was repeated 5,000 times. Then, the operation was performed for 10 minutes at a temperature of 25° C. under a pressure condition as described in the Examples, to obtain permeated water (p3), thereby determining a water production amount [m$^3$/day] P3 after long-term evaluation. In addition, an electroconductivity of each of the feed water and the permeated water was measured, and a TDS removal ratio R3 after long-term evaluation was determined according to the foregoing expression.

(Production of Separation Membrane Sheet)

A dimethylformamide (DMF) solution containing 15.0% by weight of polysulfone was cast onto a nonwoven fabric made of polyethylene terephthalate long fibers (fineness: 1.1 dtex, thickness: 90 µm, air permeability: 1 cc/cm$^2$/sec, fiber orientation: 40° in the surface layer on the porous supporting layer side, 20° in the surface layer on the side opposite to the porous supporting layer) in a thickness of 180 µm at room temperature (25° C.), immediately immersed in pure water, and then allowed to stand for 5 minutes to obtain a roll of fiber-reinforced polysulfone porous supporting membrane having a thickness of 130 µm.

Thereafter, on the polysulfone-cast surface of the porous supporting membrane, an aqueous solution of metaphenylenediamine (1.8% by weight)/ε-caprolactam (4.5% by weight) was applied, and subsequently, nitrogen was sprayed thereover through an air nozzle to remove the excessive aqueous solution from the surface of the supporting membrane. Thereafter, an n-decane solution (25° C.) containing 0.06% by weight of trimesic acid chloride was applied thereto so as to completely wet the membrane surface. Thereafter, the excessive solution was removed from the membrane by means of air blowing, and the membrane was washed with hot water (80° C.) and then dried by means of air blowing to obtain a separation membrane continuous sheet that is a separation membrane main body.

(Preparation of Resin Constituting Permeate-side Channel Member) Polypropylene and additives were previously blended in a weight ratio shown in the tables and then melt-kneaded using a twin-screw extruder (KZW-15, manufactured by Technovel Corporation) at 180° C. The resin in a strand form as discharged through the extruder die was fully cooled in a water tank and subsequently cut into composition pellets having a size of about 5 mm.

Example 1

Composition pellets made of isotactic polypropylene (manufactured by Prime Polymer Co., Ltd., MFR under conditions at a temperature of 230° C. and at a load of 2.16 kg: 1,000 g/10 min), low-stereoregularity isotactic polypropylene ("L-MODU (S400)", manufactured by Idemitsu Kosan Co., Ltd.), and a filler (fine-powder talc, "MICRO ACE P-3", manufactured by Nippon Talc Co., Ltd.) were melted at 170° C., and the resin melt was then fed into an applicator equipped with a comb-shaped shim (slit width: 0.4 mm, pitch: 0.8 mm) by a gear pump.

Subsequently, the resin melt was discharged out from the comb-shaped shim, and a permeate-side channel member was processed in a stripe-like form on the permeate-side of a separation membrane main body sheet at a rate of 2 m/min. Thereafter, the resultant was conveyed on rolls having a diameter of 50 mm (angle of wrap: 180°, and after a processed part passed through the rolls, the conveyance was stopped.

The permeate-side channel member was cut off from the resultant separation membrane sheet, and the various properties of the channel member were evaluated. As a result, the softening point temperature was 130° C., the crystallization temperature was 103° C., the tensile elongation was 22%, and the yield point stress under a wet condition at 50° C. and its elongation were 6.1 MPa and 9%, respectively.

The quality and handleability of the separation membrane were evaluated. As a result, the tensile elongation was high, and the flexibility was excellent, so that the defective place was one place. Thus, the separation membrane had extremely good quality and handleability.

In addition, the storage stability of the separation membrane was evaluated. As a result, the ratio of fluctuation in height was 1.9% (before the evaluation: 270 µm, after the evaluation: 265 µm), and the sample pieces were not adhered. Thus, the storage stability was extremely good.

Subsequently, into a space between separation membrane leaves prepared by cutting the separation membrane sheet and folding it while making the feed-side face inward such that one side thereof was open, a net serving as a feed-side channel member (thickness: 800 µm, pitch: 5 mm×5 mm) was continuously stacked to provide 26 envelope-shaped membranes having a width of 930 mm. The sealing of the space between the leaves was carried out by applying an urethane-based adhesive (isocyanate/polyol=⅓) to a portion of 40 mm inside from the edge in the width direction of the leaf.

Thereafter, a predetermined part on the opening-side of the envelope-shaped membrane was adhered to the outer periphery of a perforated water collection tube and was spirally wound therearound to prepare a wound body. A film was overwound around the outer periphery of the wound body, fixed with a tape, and then edge-cut, a side plate was fitted, and a filament was wound therearound to obtain an element having a diameter of 8 inches.

The separation membrane element was put into a fiber-reinforced plastic cylindrical pressure vessel, and the water production amount was measured under an operation pressure of 1.5 MPa. As a result of determining a water production amount ratio, P2/P1 was 1.35. In view of the fact that this water production amount ratio exhibited the same degree as in the case where the permeate-side channel member was tricot (Reference Example 1), the separation membrane element exhibited extremely good performances even under high-temperature and high-pressure operation conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Reference Example 1

A separation membrane element (element having a diameter of 8 inches) was prepared in the same manner as in Example 1, except that in Example 1, the permeate-side channel member was changed to a polyester-based knitted fabric (tricot). As a result of using this separation membrane element and evaluating the water production amount thereof under the same conditions as in Example 1, the water production amount ratio was 1.43.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

Example 2

A separation membrane element was prepared and evaluated in the same manner as in Example 1, except that the resin constituting the permeate-side channel member was changed to a composition made of isotactic polypropylene (manufactured by Prime Polymer Co., Ltd., MFR under conditions at a temperature of 230° C. and at a load of 2.16 kg: 1,000 g/10 min), low-stereoregularity isotactic polypropylene ("L-MODU (S400)", manufactured by Idemitsu Kosan Co., Ltd.), and a terpene-based hydrogenated resin ("CLEARON P-125", manufactured by Yasuhara Chemical Co., Ltd.), the applied width of the urethane-based adhesive was changed, the adhesive was applied for sealing the space between the separation membranes, and thereafter, a polyethylene terephthalate-made short-fiber nonwoven fabric (unit weight: 75 g/m$^2$, thickness: 280 μm, apparent density: 0.27 g/cm$^3$, width: 30 mm) as an adhesive support was disposed in the inside of the applied adhesive, namely on the side of the effective membrane.

As a result of carrying out the evaluation of quality and handleability of the separation membrane, though the separation membrane had 3 defective places, it had good quality and handleability. In addition, as a result of carrying out the evaluation of storage stability of the separation membrane, the ratio of fluctuation in height was 1.2% (before the evaluation: 255 μm, after the evaluation: 252 μm), and the sample pieces were not adhered. Thus, the storage stability was extremely good.

As a result of carrying out the evaluation of performances in the separation membrane element, the water production amount ratio was 1.45, and the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Example 3

A separation membrane element was prepared in the same manner as in Example 1, except for making the following changes.

That is, the resin constituting the permeate-side channel member was changed to a composition made of isotactic polypropylene (manufactured by Prime Polymer Co., Ltd., MFR under conditions at a temperature of 230° C. and at a load of 2.16 kg: 1,000 g/10 min), low-stereoregularity isotactic polypropylene ("L-MODU (S600)", manufactured by Idemitsu Kosan Co., Ltd.), a hydrogenated petroleum resin ("ARKON P-140", manufactured by Arakawa Chemical Industry, Ltd.), and a crystal nucleating agent ("ADEKA STAB NA-21", manufactured by Adeka Corporation). In addition, a 2-inch element was prepared by preparing a single sheet folded while making the feed-side face inward such that one side thereof was open and having a width of 300 mm and a length of 1,100 mm as the leaf and using one row of a linear ABS water collection tube (width: 300 mm, diameter: 17 mm, pore number: 12). Furthermore, the application position of the urethane-based adhesive was changed to a portion of 30 mm inside from the edge in the width direction of the separation membrane.

The separation membrane element was put into a fiber-reinforced plastic cylindrical pressure vessel, and the evaluation was performed under an operation pressure of 0.5 MPa.

As a result of carrying out the evaluation of quality and handleability of the separation membrane, though the separation membrane had 5 defective places because of a low tensile elongation, it had good quality and handleability. In addition, as a result of carrying out the evaluation of storage stability of the separation membrane, the ratio of fluctuation in height was 1.7% (before the evaluation: 283 μm, after the evaluation: 278 μm), and the sample pieces were not adhered. Thus, the storage stability was extremely good.

As a result of carrying out the evaluation of performances in the separation membrane element, the water production amount ratio was 1.40, and in view of the fact that this water production amount ratio exhibited the same degree as in the case where the permeate-side channel member was tricot (Reference Example 2), the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Reference Example 2

A separation membrane element (element having a diameter of 2 inches) was prepared in the same manner as in Example 3, except that in Example 3, the permeate-side channel member was changed to a polyester-based knitted fabric (tricot). As a result of using this separation membrane element and evaluating the water production amount thereof under the same conditions as in Example 3, the water production amount ratio was 1.43.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

Example 4

A separation membrane element was prepared and evaluated in the same manner as in Example 1, except that the resin constituting the permeate-side channel member was changed to a composition made of low-stereoregularity isotactic polypropylene ("L-MODU (S400)", manufactured by Idemitsu Kosan Co., Ltd.) and a crystal nucleating agent ("ADEKA STAB NA-11", manufactured by Adeka Corporation), and the application position of the urethane-based adhesive was changed to a portion of 35 mm inside from the edge in the width direction of the separation membrane.

As a result of carrying out the evaluation of quality and handleability of the separation membrane, the separation membrane did not have a defective place because of a very high tensile elongation, and it had good quality and handleability. In addition, as a result of carrying out the evaluation of storage stability of the separation membrane, the ratio of fluctuation in height was 3.0% (before the evaluation: 301 µm, after the evaluation: 292 µm), and though the sample pieces were slightly adhered, the storage stability was extremely good.

As a result of carrying out the evaluation of performances in the separation membrane element, the water production amount ratio was 1.23, and the separation membrane element exhibited good performances even under high-temperature and high-pressure conditions. However, this water production amount ratio was a slightly low value as compared with those of the Reference Examples. It may be considered that the separation membrane element was softened and deformed during the operation.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Example 5

A separation membrane element was prepared in the same manner as in Example 3, except for making the following changes.

That is, the resin constituting the permeate-side channel member was changed to a composition made of low-stereoregularity isotactic polypropylene ("L-MODU (S600)", manufactured by Idemitsu Kosan Co., Ltd.) and a filler (fine-powder talc, "MICRO ACE P-3", manufactured by Nippon Talc Co., Ltd.). The adhesive was applied for sealing the space between the separation membrane sheets, and thereafter, a polyethylene terephthalate-made short-fiber nonwoven fabric (unit weight: 75 g/m$^2$, thickness: 280 µm, apparent density: 0.27 g/cm$^3$, width: 30 mm) as an adhesive support was disposed in the inside of the applied adhesive, namely on the side of the effective membrane.

The separation membrane element was put into a fiber-reinforced plastic cylindrical pressure vessel, and the evaluation was performed under an operation pressure of 0.5 MPa.

As a result of carrying out the evaluation of quality and handleability of the separation membrane, the separation membrane did not have a defective place because of a very high tensile elongation, and it had good quality and handleability. In addition, as a result of carrying out the evaluation of storage stability of the separation membrane, the ratio of fluctuation in height was 2.5% (before the evaluation: 295 µm, after the evaluation: 288 µm), and though the sample pieces were slightly adhered, the storage stability was extremely good.

As a result of carrying out the evaluation of performances in the separation membrane element, the water production amount ratio was 1.28, and the separation membrane element exhibited good performances even under high-temperature and high-pressure conditions. However, this water production amount ratio was a slightly low value as compared with that of Reference Example 2. It may be considered that the separation membrane element was softened and deformed during the operation.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Example 6

As a resin constituting the permeate-side channel member, composition pellets made of low-stereoregularity isotactic polypropylene ("L-MODU (S600)", manufactured by Idemitsu Kosan Co., Ltd.) and a terpene-based hydrogenated resin ("CLEARON P-125", manufactured by Yasuhara Chemical Co., Ltd.) were melted at 160° C., and the resin melt was then fed into an applicator equipped with a comb-shaped shim (slit width: 0.4 mm, pitch: 0.8 mm) by a gear pump.

Subsequently, the resin melt was discharged out from the comb-shaped shim, and a permeate-side channel member was processed in a stripe-like form on the permeate-side of a separation membrane main body sheet at a rate of 2 m/min. Thereafter, the resultant was conveyed on rolls having a diameter of 50 mm (angle of wrap: 180°, and after a processed part passed through the rolls, the conveyance was stopped. Subsequently, a heat treatment with a slit heater (30° C.) was carried out for 10 minutes.

As a result of carrying out the evaluation of quality and handleability of the separation membrane, the separation membrane did not have a defective place because of a very high tensile elongation, and it had good quality and handleability. In addition, as a result of carrying out the evaluation of storage stability of the separation membrane, the ratio of fluctuation in height was 4.0% (before the evaluation: 310 µm, after the evaluation: 298 µm), and though the sample pieces were slightly adhered, the storage stability was good.

As a result of carrying out the evaluation of performances in the separation membrane element, the water production amount ratio was 1.15, and the separation membrane element exhibited good performances even under high-temperature and high-pressure conditions. However, this water production amount ratio was a slightly low value as compared with those of the Reference Examples and Comparative Examples 4 and 5. It may be considered that the softening point temperature was low, so that the channel member was softened and deformed during the operation of the separation membrane element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Example 7

A separation membrane element was prepared and evaluation in the same manner as in Example 6, except that the resin constituting the permeate-side channel member was changed to low-stereoregularity isotactic polypropylene ("L-MODU (S400)", manufactured by Idemitsu Kosan Co., Ltd.), and the applied width of the urethane-based adhesive was changed.

As a result of carrying out the evaluation of quality and handleability of the separation membrane, the separation membrane did not have a defective place because of a very high tensile elongation, and it had good quality and handleability.

In addition, as a result of carrying out the evaluation of storage stability of the separation membrane, the ratio of fluctuation in height was 2.8% (before the evaluation: 285 µm, after the evaluation: 277 µm), and though the sample pieces were slightly adhered, the storage stability was good.

As a result of carrying out the evaluation of performances in the separation membrane element, the water production amount ratio was 1.26, and the separation membrane element exhibited good performances even under high-temperature and high-pressure conditions. However, this water production amount ratio was a slightly low value as compared with those of the Reference Examples. It may be considered that the channel member was softened and deformed during the operation of the separation membrane element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Example 8

A separation membrane element was prepared and evaluated in the same manner as in Example 1, except that the resin constituting the permeate-side channel member was changed to a composition made of low-stereoregularity isotactic polypropylene ("L-MODU (S600)", manufactured by Idemitsu Kosan Co., Ltd.) and a hydrogenated petroleum resin ("ARKON P-140", manufactured by Arakawa Chemical Industry, Ltd.), and the application position of the urethane-based adhesive was changed to a portion of 35 mm inside from the edge in the width direction of the separation membrane.

As a result of carrying out the evaluation of quality and handleability of the separation membrane, though the separation membrane had 5 defective places, it had good quality and handleability. In addition, as a result of carrying out the evaluation of storage stability of the separation membrane, the ratio of fluctuation in height was 4.6% (before the evaluation: 260 µm, after the evaluation: 248 µm), and though the sample pieces were slightly adhered, the storage stability was good.

As a result of carrying out the evaluation of performances in the separation membrane element, the water production amount ratio was 1.35, and the separation membrane element exhibited good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 1.

Example 9

Composition pellets made of isotactic polypropylene (MFR under conditions at a temperature of 230° C. and at a load of 2.16 kg: 1,000 g/10 min), low-stereoregularity isotactic polypropylene ("L-MODU (S400)"), and a filler ("MICRO ACE P-3") were melted at 170° C., and the resin melt was then fed into an applicator equipped with a comb-shaped shim (slit width: 0.4 mm, pitch: 0.8 mm) by a gear pump.

Subsequently, the resin melt was discharged out from the comb-shaped shim, and projections were formed in a stripe-like form on a sheet (polyethylene terephthalate long-fiber nonwoven fabric, single yarn fineness: 1.2 dtex, thickness: 55 µm, unit weight: 28 g/m$^2$) at a rate of 8.5 m/min, and via a free roll, this was wound up around a winder to obtain a sheet roll (winding tension: 15 N/m, core diameter used in winding: 3 inches). 10 m of the sheet was unwound from the sheet roll to obtain a projection-fixed sheet (sheet channel member).

The projections were cut off from the resulting sheet, and the various properties of the channel member were evaluated. As a result, the softening point temperature was 130° C., the crystallization temperature was 103° C., the tensile elongation was 22%, and the yield point stress under a wet condition at 50° C. and its elongation were 6.1 MPa and 9%, respectively.

The quality and handleability of the sheet were evaluated. As a result, the tensile elongation was high, and the flexibility was excellent, so that the defective place was one place. Thus, the sheet had extremely good quality and handleability.

In addition, the storage stability of the projection-fixed sheet was evaluated. As a result, the ratio of fluctuation in height was 1.9% (before the evaluation: 270 after the evaluation: 265 µm), and the sample pieces were not adhered. Thus, the storage stability was extremely good.

In addition, into a space between separation membrane sheets prepared by cutting the sheet channel member and folding it while making the feed-side face inward such that one side thereof was open, a net serving as a feed-side channel member (thickness: 800 µm, pitch: 5 mm×5 mm) was continuously stacked, and the projection-fixed sheet as the permeate-side channel member was inserted between the envelope-shaped membranes, followed by stacking to provide 26 envelope-shaped membranes having a width of 930 mm. The sealing of the space between the separation membrane sheets was carried out by applying a urethane-based adhesive (isocyanate/polyol=1/3) to a portion of 30 mm inside from the edge in the width direction of the separation membrane sheet.

Thereafter, a predetermined part on the opening-side of the envelope-shaped membrane was adhered to the outer periphery of a perforated water collection tube and was spirally wound therearound to prepare a wound body. A film was overwound around the outer periphery of the wound body, fixed with a tape, and then edge-cut, a side plate was fitted, and a filament was wound therearound to obtain an element having a diameter of 8 inches.

The separation membrane element was put into a fiber-reinforced plastic cylindrical pressure vessel, and the water production amount was measured under an operation pressure of 1.5 MPa. As a result of determining a water production amount ratio, P2/P1 was 1.35, and the separation membrane element exhibited extremely good performances even under high-temperature and high-pressure operation conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Example 10

A separation membrane element was prepared in the same manner as in Example 9, except for making the following changes.

That is, the resin constituting the projections was changed to a composition made of isotactic polypropylene (manufactured by Prime Polymer Co., Ltd., MFR under conditions at a temperature of 230° C. and at a load of 2.16 kg: 1,000 g/10 min), low-stereoregularity isotactic polypropylene ("L-MODU (S400)", manufactured by Idemitsu Kosan Co., Ltd.), and a terpene-based hydrogenated resin ("CLEARON P-125", manufactured by Yasuhara Chemical Co., Ltd.). In addition, a 2-inch element was prepared by preparing a single sheet folded while making the feed-side face inward such that one side thereof was open and having a width of 300 mm and a length of 1,100 mm as the sheet channel member and using one row of a linear ABS water collection tube (width: 300 mm, diameter: 17 mm, pore number: 12). Furthermore, the application position of the urethane-based adhesive was changed to a portion of 30 mm inside from the edge in the width direction of the separation membrane sheet.

As a result of carrying out the evaluation of quality and handleability of the projection-fixed sheet, though the projection-fixed sheet had 3 defective places, it had good quality and handleability. In addition, as a result of carrying out the evaluation of storage stability of the projection-fixed sheet, the ratio of fluctuation in height was 1.2% (before the evaluation: 255 µm, after the evaluation: 252 µm), and the sample pieces were not adhered. Thus, the storage stability was extremely good.

The separation membrane element was put into a fiber-reinforced plastic cylindrical pressure vessel, and the evaluation was performed under an operation pressure of 0.5 MPa. As a result, the water production amount ratio was 1.45, and the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Example 11

A separation membrane element was prepared and evaluated in the same manner as in Example 9, except that the resin constituting the projections was changed to a composition made of isotactic polypropylene (manufactured by Prime Polymer Co., Ltd., MFR under conditions at a temperature of 230° C. and at a load of 2.16 kg: 1,000 g/10 min), low-stereoregularity isotactic polypropylene ("L-MODU (S600)", manufactured by Idemitsu Kosan Co., Ltd.), a hydrogenated petroleum resin ("ARKON P-140", manufactured by Arakawa Chemical Industry, Ltd.), and a crystal nucleating agent ("ADEKA STAB NA-21", manufactured by Adeka Corporation), and the application position of the urethane-based adhesive was changed to a portion of 35 mm inside from the edge in the width direction of the separation membrane element.

As a result of carrying out the evaluation of quality and handleability of the projection-fixed sheet, though the projection-fixed sheet had 5 defective places because of a low tensile elongation, it had good quality and handleability. In addition, as a result of carrying out the evaluation of storage stability of the projection-fixed sheet, the ratio of fluctuation in height was 1.7% (before the evaluation: 283 µm, after the evaluation: 278 µm), and the sample pieces were not adhered. Thus, the storage stability was extremely good.

As a result of carrying out the evaluation of performances in the separation membrane element, the water production amount ratio was 1.40, and the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Example 12

A separation membrane element was prepared and evaluated in the same manner as in Example 9, except that the resin constituting the projections was changed to a composition made of low-stereoregularity isotactic polypropylene ("L-MODU (S400)", manufactured by Idemitsu Kosan Co., Ltd.) and a crystal nucleating agent ("ADEKA STAB NA-11", manufactured by Adeka Corporation), and the application position of the urethane-based adhesive was changed to a portion of 45 mm inside from the edge in the width direction of the separation membrane element.

As a result of carrying out the evaluation of quality and handleability of the projection-fixed sheet, the projection-fixed sheet did not have a defective place because of a very high tensile elongation, and it had good quality and handleability. In addition, as a result of carrying out the evaluation of storage stability of the projection-fixed sheet, the ratio of fluctuation in height was 3.0% (before the evaluation: 301 μm, after the evaluation: 292 μm), and though the sample pieces were slightly adhered, the storage stability was extremely good.

As a result of carrying out the evaluation of performances in the separation membrane element, the water production amount ratio was 1.23, and the separation membrane element exhibited good performances even under high-temperature and high-pressure conditions. However, this water production amount ratio was a slightly low value as compared with those of the Reference Examples. It may be considered that the channel member was softened and deformed during the operation of the separation membrane element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Example 13

A separation membrane element was prepared and evaluated in the same manner as in Example 9, except that the resin constituting the projections was changed to a composition made of low-stereoregularity isotactic polypropylene ("L-MODU (S400)", manufactured by Idemitsu Kosan Co., Ltd.) and a filler (fine-powder talc, "MICRO ACE P-3", manufactured by Nippon Talc Co., Ltd.), the applied width of the urethane-based adhesive was changed, and the width of the sheet was changed to 918 mm.

As a result of carrying out the evaluation of quality and handleability of the projection-fixed sheet, the projection-fixed sheet did not have a defective place because of a very high tensile elongation, and it had good quality and handleability. In addition, as a result of carrying out the evaluation of storage stability of the projection-fixed sheet, the ratio of fluctuation in height was 2.5% (before the evaluation: 295 μm, after the evaluation: 288 μm), and though the sample pieces were slightly adhered, the storage stability was extremely good.

As a result of carrying out the evaluation of performances in the separation membrane element, the water production amount ratio was 1.28, and the separation membrane element exhibited good performances even under high-temperature and high-pressure conditions. However, this water production amount ratio was a slightly low value as compared with those of the Reference Examples. It may be considered that the channel member was softened and deformed during the operation of the separation membrane element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Example 14

As a resin constituting the projections, composition pellets made of low-stereoregularity isotactic polypropylene ("L-MODU (S600)", manufactured by Idemitsu Kosan Co., Ltd.) and a terpene-based hydrogenated resin ("CLEARON P-125", manufactured by Yasuhara Chemical Co., Ltd.) were melted at 160° C., and the resin melt was then fed into an applicator equipped with a comb-shaped shim (slit width: 0.4 mm, pitch: 0.8 mm) by a gear pump.

Subsequently, the resin melt was discharged out from the comb-shaped shim, and a permeate-side channel member was processed in a stripe-like form on the permeate-side of a separation membrane main body at a rate of 2 m/min. Thereafter, the resultant was conveyed on rolls having a diameter of 50 mm (angle of wrap: 180°), and after a processed part passed through the rolls, the conveyance was stopped. Subsequently, a heat treatment with a slit heater (30° C.) was carried out for 10 minutes.

As a result of carrying out the evaluation of quality and handleability of the projection-fixed sheet, the projection-fixed sheet did not have a defective place because of a very high tensile elongation, and it had good quality and handleability. In addition, as a result of carrying out the evaluation of storage stability of the projection-fixed sheet, the ratio of fluctuation in height was 4.0% (before the evaluation: 310 μm, after the evaluation: 298 μm), and though the sample pieces were slightly adhered, the storage stability was good.

As a result of carrying out the evaluation of performances in the separation membrane element, the water production amount ratio was 1.15, and the separation membrane element exhibited good performances even under high-temperature and high-pressure conditions. However, this water production amount ratio was a slightly low value as compared with those of the Reference Examples and Comparative Examples 4 and 5. It may be considered that the softening point temperature was low, so that the channel member was softened and deformed during the operation of the separation membrane element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Example 15

A separation membrane element was prepared and evaluated in the same manner as in Example 10, except that the resin constituting the projections was changed to low-stereoregularity isotactic polypropylene ("L-MODU (S400)", manufactured by Idemitsu Kosan Co., Ltd.), and the width of the sheet channel member was changed to 300 mm.

As a result of carrying out the evaluation of quality and handleability of the projection-fixed sheet, the projection-fixed sheet did not have a defective place because of a very high tensile elongation, and it had good quality and handleability.

In addition, as a result of carrying out the evaluation of storage stability of the projection-fixed sheet, the ratio of fluctuation in height was 2.8% (before the evaluation: 285 µm, after the evaluation: 277 µm), and though the sample pieces were slightly adhered, the storage stability was good.

As a result of carrying out the evaluation of performances in the separation membrane element, the water production amount ratio was 1.26, and the separation membrane element exhibited good performances even under high-temperature and high-pressure conditions. However, this water production amount ratio was a slightly low value as compared with those of the Reference Example. It may be considered that the channel member was softened and deformed during the operation of the separation membrane element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Example 16

A separation membrane element was prepared and evaluated in the same manner as in Example 9, except that the resin constituting the projections was changed to a composition made of low-stereoregularity isotactic polypropylene ("L-MODU (S600)", manufactured by Idemitsu Kosan Co., Ltd.) and a hydrogenated petroleum resin ("ARKON P-140", manufactured by Arakawa Chemical Industry, Ltd.), and the application position of the urethane-based adhesive was changed to a portion of 35 mm inside from the edge in the width direction of the separation membrane element.

As a result of carrying out the evaluation of quality and handleability of the projection-fixed sheet, though the separation membrane had 5 defective places, it had good quality and handleability. In addition, as a result of carrying out the evaluation of storage stability of the projection-fixed sheet, the ratio of fluctuation in height was 4.6% (before the evaluation: 260 µm, after the evaluation: 248 µm), and though the sample pieces were slightly fixed, the storage stability was good.

As a result of carrying out the evaluation of performances in the separation membrane element, the water production amount ratio was 1.35, and the separation membrane element exhibited good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 2.

Comparative Example 1

A separation membrane element was prepared and evaluated in the same manner as in Example 6, except that the resin constituting the permeate-side channel member was changed to a composition made of low-stereoregularity isotactic polypropylene ("L-MODU (S600)", manufactured by Idemitsu Kosan Co., Ltd.) and a terpene-based hydrogenated resin ("CLEARON P-125", manufactured by Yasuhara Chemical Co., Ltd.).

As a result of carrying out the evaluation of quality and handleability of the separation membrane, the separation membrane had 2 defective places and had good quality and handleability. In addition, as a result of carrying out the evaluation of storage stability of the separation membrane, the ratio of fluctuation in height was 6.2% (before the evaluation: 304 µm, after the evaluation: 285 µm). In addition, the sample pieces were firmly adhered, and the storage stability was poor.

As a result of carrying out the evaluation of performances in the separation membrane element, the water production amount ratio was 0.50, and the element performances were remarkably lowered under high-temperature and high-pressure conditions. The softening point temperature of the permeate-side channel member was very low, and the yield point stress was also very low. Thus, it may be considered that the channel member was significantly softened and deformed during the operation of the separation member element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

Comparative Example 2

A separation membrane element was prepared and evaluated in the same manner as in Example 1, except that the resin constituting the permeate-side channel member was changed to a composition made of isotactic polypropylene (manufactured by Prime Polymer Co., Ltd., MFR under conditions at a temperature of 230° C. and at a load of 2.16 kg: 1,000 g/10 min), low-stereoregularity isotactic polypropylene ("L-MODU (S400)", manufactured by Idemitsu Kosan Co., Ltd.), and a hydrogenated petroleum resin ("ARKON P-100", manufactured by Arakawa Chemical Industry, Ltd.).

As a result of carrying out the evaluation of quality and handleability of the separation membrane, the separation membrane had 17 defective places because of a low tensile elongation and had poor quality and handleability. In addition, as a result of carrying out the evaluation of storage stability of the separation membrane, the ratio of fluctuation in height was 2.3% (before the evaluation: 289 µm, after the evaluation: 282 µm). In addition, the sample pieces were not slightly adhered, and the storage stability was extremely good.

As a result of carrying out the evaluation of performances in the separation membrane element, the water production amount ratio was 1.30, and the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

Comparative Example 3

A separation membrane element was prepared and evaluated in the same manner as in Example 1, except that the resin constituting the permeate-side channel member was changed to isotactic polypropylene (manufactured by Prime Polymer Co., Ltd., MFR under conditions at a temperature of 230° C. and at a load of 2.16 kg: 1,000 g/10 min), the adhesive was applied for sealing the space between the separation membranes, and thereafter, a polyethylene terephthalate-made short-fiber nonwoven fabric (unit weight: 75 g/m$^2$, thickness: 280 μm, apparent density: 0.27 g/cm$^3$, width: 30 mm) as an adhesive support was disposed in the inside of the applied adhesive, namely on the side of the effective membrane.

As a result of carrying out the evaluation of quality and handleability of the separation membrane, the separation membrane had 20 or more defective places because of a very low tensile elongation, and the channel member partially peeled off from the substrate starting from the defective (broken) places. Thus, the quality and handleability of the separation membrane were extremely poor. In addition, as a result of carrying out the evaluation of storage stability of the separation membrane, the ratio of fluctuation in height was 0.1% (before the evaluation: 265 μm, after the evaluation: 264 μm). In addition, the sample pieces were not adhered, and the storage stability was extremely good.

As a result of carrying out the evaluation of performances in the separation membrane element, the water production amount ratio was 1.46, and the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

Comparative Example 4

A separation membrane element was prepared and evaluated in the same manner as in Example 14, except that the resin constituting the projections was changed to a composition made of low-stereoregularity isotactic polypropylene ("L-MODU (S600)", manufactured by Idemitsu Kosan Co., Ltd.) and a terpene-based hydrogenated resin ("CLEARON P-125", manufactured by Yasuhara Chemical Co., Ltd.).

As a result of carrying out the evaluation of quality and handleability of the projection-fixed sheet, the projection-fixed sheet had 2 defective places and had good quality and handleability. In addition, as a result of carrying out the evaluation of storage stability of the projection-fixed sheet, the ratio of fluctuation in height was 6.2% (before the evaluation: 304 μm, after the evaluation: 285 μm). In addition, the sample pieces were firmly adhered, and the storage stability was poor.

As a result of carrying out the evaluation of performances in the separation membrane element, the water production amount ratio was 0.50, and the element performances were remarkably lowered under high-temperature and high-pressure conditions. The softening point temperature of the permeate-side channel member was very low, and the yield point stress was very low. Thus, it may be considered that the channel member was significantly softened and deformed during the operation of the separation member element.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

Comparative Example 5

A separation membrane element was prepared and evaluated in the same manner as in Example 9, except that the resin constituting the projections was changed to a composition made of isotactic polypropylene (manufactured by Prime Polymer Co., Ltd., MFR under conditions at a temperature of 230° C. and at a load of 2.16 kg: 1,000 g/10 min), low-stereoregularity isotactic polypropylene ("L-MODU (S400)", manufactured by Idemitsu Kosan Co., Ltd.), and a hydrogenated petroleum resin ("ARKON P-100", manufactured by Arakawa Chemical Industry, Ltd.).

As a result of carrying out the evaluation of quality and handleability of the projection-fixed sheet, the projection-fixed sheet had 17 defective places because of a low tensile elongation and had poor quality and handleability. In addition, as a result of carrying out the evaluation of storage stability of the projection-fixed sheet, the ratio of fluctuation in height was 2.3% (before the evaluation: 289 μm, after the evaluation: 282 μm). In addition, the sample pieces were not slightly adhered, and the storage stability was extremely good.

As a result of carrying out the evaluation of performances in the separation membrane element, the water production amount ratio was 1.30, and the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

Comparative Example 6

A separation membrane element was prepared and evaluated in the same manner as in Example 10, except that the resin constituting the projections was changed to isotactic polypropylene (manufactured by Prime Polymer Co., Ltd., MFR under conditions at a temperature of 230° C. and at a load of 2.16 kg: 1,000 g/10 min).

As a result of carrying out the evaluation of quality and handleability of the projection-fixed sheet, the projection-fixed sheet had 20 or more defective places because of a very low tensile elongation, and the channel member partially peeled off from the substrate starting from the defective (broken) places. Thus, the quality and handleability of the projection-fixed sheet were extremely poor. In addition, as a result of carrying out the evaluation of storage stability of the projection-fixed sheet, the ratio of fluctuation in height was 0.1% (before the evaluation: 265 μm, after the evaluation: 264 μm). In addition, the sample pieces were not adhered, and the storage stability was extremely good.

As a result of carrying out the evaluation of performances in the separation membrane element, the water production amount ratio was 1.46, and the separation membrane element exhibited extremely good performances even under high-temperature and high-pressure conditions.

After the operation, the separation membrane element was disassembled. As a result, the projected view of the second sealing part included a plurality of asperities. The variation coefficient of the width of the sealing part, the difference of projected area in the lengthwise direction of the second sealing part, the difference of projected area in the width direction of the sealing part, and the effective membrane area were measured, respectively according to the above-described methods. The element performances and the respective parameters are shown in Table 3.

TABLE 1

| | | | Example 1 | Example 2 | Example 3 | Example 4 |
|---|---|---|---|---|---|---|
| Permeate-side channel member | Constituent resin and composition ratio | Polypropylene (A1) | High-stereoregularity PP | High-stereoregularity PP | High-stereoregularity PP | Low-stereoregularity PP |
| | | Polypropylene (A2) | Low-stereoregularity PP | Low-stereoregularity PP | Low-stereoregularity PP | — |
| | | Additive (B) | Talc | Terpene-based hydrogenated resin | Hydrogenated petroleum resin | Crystallization nucleating agent |
| | | Additive (C) | — | — | Crystallization nucleating agent | — |
| | | Weight ratio (A1)/(A2)/(B)/(C) | 35/55/10/0 | 30/40/30/0 | 25/40/34.5/0.5 | 99.7/0/0.3/0 |
| | Melt viscosity [Pa · sec] | | 12.9 | 11.0 | 24.0 | 6.9 |
| | Softening point temperature [° C.] | | 130 | 125 | 122 | 78 |
| | Crystallization temperature [° C.] | | 103 | 99 | 92 | 48 |
| | Half-crystallization time [min] | | — | — | — | — |
| | Mechanical properties | Tensile elongation [%] | 22 | 16 | 13 | 620 |
| | | Yield point stress [MPa] (50° C.) | 6.1 | 7.0 | 6.3 | 3.1 |
| | | Yield point elongation [%] (50° C.) | 9 | 6 | 8 | 20 |
| | Height of permeate-side channel member [μm] | | 270 | 255 | 283 | 301 |
| | Space between permeate-side channel members [μm] | | 409 | 410 | 399 | 406 |
| Sealing part | Maximum value of width [mm] | | 56 | 50 | 45 | 55 |
| | Minimum value of width [mm] | | 35 | 30 | 4 | 30 |
| | Variation coefficient of width [%] | | 10 | 6 | 10 | 16 |
| | Difference of projected area (in the lengthwise direction of separation membrane) [%] | | 18 | 13 | 12 | 15 |
| | Difference of projected area (in the width direction of separation membrane) [%] | | 15 | 14 | 19 | 13 |
| Separation membrane | Evaluation of quality and handleability of separation membrane | | Excellent | Good | Good | Excellent |
| | Evaluation of storage stability of separation membrane | | Excellent | Excellent | Excellent | Good |
| Separation membrane element | Initial evaluation | Water production amount P1 [m³/day] | 36.2 | 37.5 | 0.62 | 32.1 |
| | | Water production amount ratio P2/P1 | 1.35 | 1.45 | 1.40 | 1.23 |
| | | Desalination ratio R1 [%] | 97.5 | 97.8 | 96.3 | 97.4 |
| | | Effective membrane area [m²] | 34.0 | 36.1 | 0.47 | 30.7 |
| | Long-term evaluation | Water production amount P3 [m³/day] | 32.6 | 36.4 | 0.56 | 30.5 |
| | | Desalination ratio R3 [%] | 95.2 | 97.4 | 94.3 | 96.5 |

| | | | Example 5 | Example 6 | Example 7 | Example 8 |
|---|---|---|---|---|---|---|
| Permeate-side channel member | Constituent resin and composition ratio | Polypropylene (A1) | Low-stereoregularity PP | Low-stereoregularity PP | Low-stereoregularity PP | Low-stereoregularity PP |
| | | Polypropylene (A2) | — | — | — | — |
| | | Additive (B) | Talc | Terpene-based hydrogenated resin | — | Hydrogenated petroleum resin |

TABLE 1-continued

|  |  |  |  |  |  |  |
|---|---|---|---|---|---|---|
|  |  | Additive (C) | — | — | — | — |
|  |  | Weight ratio (A1)/(A2)/(B)/(C) | 90/0/10/0 | 80/0/20/0 | 100/0/0/0 | 70/0/30/0 |
|  | Melt viscosity [Pa · sec] |  | 8.8 | 27.6 | 6.8 | 21.0 |
|  | Softening point temperature [° C.] |  | 82 | 65 | 75 | 62 |
|  | Crystallization temperature [° C.] |  | 42 | — | — | — |
|  | Half-crystallization time [min] |  | — | 9 | 6 | 11 |
|  | Mechanical properties | Tensile elongation [%] | 585 | 554 | 630 | 40 |
|  |  | Yield point stress [MPa] (50° C.) | 3.3 | 2.3 | 3.0 | 2.0 |
|  |  | Yield point elongation [%] (50° C.) | 18 | 29 | 24 | 26 |
|  | Height of permeate-side channel member [μm] |  | 295 | 310 | 285 | 260 |
|  | Space between permeate-side channel members [μm] |  | 405 | 400 | 410 | 410 |
| Sealing part | Maximum value of width [mm] |  | 13 | 65 | 56 | 56 |
|  | Minimum value of width [mm] |  | 10 | 50 | 30 | 30 |
|  | Variation coefficient of width [%] |  | 6 | 10 | 9 | 15 |
|  | Difference of projected area (in the lengthwise direction of separation membrane) [%] |  | 8 | 17 | 15 | 15 |
|  | Difference of projected area (in the width direction of separation membrane) [%] |  | 11 | 15 | 18 | 18 |
| Separation membrane | Evaluation of quality and handleability of separation membrane |  | Excellent | Excellent | Excellent | Good |
|  | Evaluation of storage stability of separation membrane |  | Good | Good | Good | Good |
| Separation membrane element | Initial evaluation | Water production amount P1 [m³/day] | 0.72 | 31.4 | 31.9 | 32.2 |
|  |  | Water production amount ratio P2/P1 | 1.28 | 1.26 | 1.15 | 1.35 |
|  |  | Desalination ratio R1 [%] | 98.2 | 97.3 | 97.2 | 97.7 |
|  | Effective membrane area [m²] |  | 0.57 | 29.3 | 30.4 | 31.4 |
|  | Long-term evaluation | Water production amount P3 [m³/day] | 0.70 | 28.3 | 28.7 | 29.0 |
|  |  | Desalination ratio R3 [%] | 97.8 | 95.4 | 95.0 | 95.3 |

TABLE 2

|  |  |  | Example 9 | Example 10 | Example 11 | Example 12 |
|---|---|---|---|---|---|---|
| Permeate-side channel member | Constituent resin and composition ratio | Polypropylene (A1) | High-stereoregularity PP | High-stereoregularity PP | High-stereoregularity PP | Low-stereoregularity PP |
|  |  | Polypropylene (A2) | Low-stereoregularity PP | Low-stereoregularity PP | Low-stereoregularity PP | — |
|  |  | Additive (B) | Talc | Terpene-based hydrogenated resin | Hydrogenated petroleum resin | Crystallization nucleating agent |
|  |  | Additive (C) | — | — | Crystallization nucleating agent | — |
|  |  | Weight ratio (A1)/(A2)/(B)/(C) | 35/55/10/0 | 30/40/30/0 | 25/40/34.5/0.5 | 99.7/0/0.3/0 |
|  | Melt viscosity [Pa · sec] |  | 12.9 | 11.0 | 24.0 | 6.9 |
|  | Softening point temperature [° C.] |  | 130 | 125 | 122 | 78 |
|  | Crystallization temperature [° C.] |  | 103 | 99 | 92 | 48 |
|  | Half-crystallization time [min] |  | — | — | — | — |
|  | Mechanical properties | Tensile elongation [%] | 22 | 16 | 13 | 620 |
|  |  | Yield point stress [MPa] (50° C.) | 6.1 | 7.0 | 6.3 | 3.1 |
|  |  | Yield point elongation [%] (50° C.) | 9 | 6 | 8 | 20 |
|  | Height of permeate-side channel member [μm] |  | 270 | 255 | 283 | 301 |
|  | Space between permeate-side channel members [μm] |  | 409 | 410 | 399 | 406 |

TABLE 2-continued

|  |  |  |  |  |  |  |
|---|---|---|---|---|---|---|
| Sealing part | Maximum value of width [mm] |  | 55 | 14 | 61 | 56 |
|  | Minimum value of width [mm] |  | 44 | 10 | 37 | 28 |
|  | Variation coefficient of width [%] |  | 10 | 7 | 10 | 16 |
|  | Difference of projected area (in the lengthwise direction of separation membrane) [%] |  | 20 | 14 | 12 | 15 |
|  | Difference of projected area (in the width direction of separation membrane) [%] |  | 15 | 13 | 17 | 14 |
| Separation membrane | Evaluation of quality and handleability of separation membrane |  | Excellent | Good | Good | Excellent |
|  | Evaluation of storage stability of separation membrane |  | Excellent | Excellent | Excellent | Good |
| Separation membrane element | Initial evaluation | Water production amount P1 [m³/day] | 36.7 | 0.71 | 35.5 | 33.9 |
|  |  | Water production amount ratio P2/P1 | 1.35 | 1.45 | 1.40 | 1.23 |
|  |  | Desalination ratio R1 [%] | 97.8 | 98.3 | 96.5 | 97.5 |
|  | Effective membrane area [m²] |  | 35.0 | 0.55 | 33.9 | 32.3 |
|  | Long-term evaluation | Water production amount P3 [m³/day] | 33.0 | 0.69 | 32.0 | 32.2 |
|  |  | Desalination ratio R3 [%] | 95.6 | 97.9 | 94.6 | 96.5 |

|  |  |  | Example 13 | Example 14 | Example 15 | Example 16 |
|---|---|---|---|---|---|---|
| Permeate-side channel member | Constituent resin and composition ratio | Polypropylene (A1) | Low-stereoregularity PP | Low-stereoregularity PP | Low-stereoregularity PP | Low-stereoregularity PP |
|  |  | Polypropylene (A2) | — | — | — | — |
|  |  | Additive (B) | Talc | Terpene-based hydrogenated resin | — | Hydrogenated petroleum resin |
|  |  | Additive (C) | — | — | — | — |
|  |  | Weight ratio (A1)/(A2)/(B)/(C) | 90/0/10/0 | 80/0/20/0 | 100/0/0/0 | 70/0/30/0 |
|  | Melt viscosity [Pa · sec] |  | 8.8 | 27.6 | 6.8 | 21.0 |
|  | Softening point temperature [° C.] |  | 82 | 65 | 75 | 62 |
|  | Crystallization temperature [° C.] |  | 42 | — | — | — |
|  | Half-crystallization time [min] |  | — | 9 | 6 | 11 |
|  | Mechanical properties | Tensile elongation [%] | 585 | 554 | 630 | 40 |
|  |  | Yield point stress [MPa] (50° C.) | 3.3 | 2.3 | 3.0 | 2.0 |
|  |  | Yield point elongation [%] (50° C.) | 18 | 29 | 24 | 26 |
|  | Height of permeate-side channel member [μm] |  | 295 | 310 | 285 | 260 |
|  | Space between permeate-side channel members [μm] |  | 405 | 400 | 410 | 410 |
| Sealing part | Maximum value of width [mm] |  | 45 | 6 | 35 | 65 |
|  | Minimum value of width [mm] |  | 40 | 3 | 20 | 44 |
|  | Variation coefficient of width [%] |  | 6 | 10 | 10 | 14 |
|  | Difference of projected area (in the lengthwise direction of separation membrane) [%] |  | 15 | 18 | 14 | 14 |
|  | Difference of projected area (in the width direction of separation membrane) [%] |  | 15 | 15 | 18 | 18 |
| Separation membrane | Evaluation of quality and handleability of separation membrane |  | Excellent | Excellent | Excellent | Good |
|  | Evaluation of storage stability of separation membrane |  | Good | Good | Good | Good |
| Separation membrane element | Initial evaluation | Water production amount P1 [m³/day] | 38.8 | 41.0 | 0.49 | 32.4 |
|  |  | Water production amount ratio P2/P1 | 1.28 | 1.26 | 1.26 | 1.35 |
|  |  | Desalination ratio R1 [%] | 98.2 | 95.2 | 98.0 | 97.7 |
|  | Effective membrane area [m²] |  | 37.0 | 39.2 | 0.40 | 31.5 |
|  | Long-term evaluation | Water production amount P3 [m³/day] | 37.6 | 36.9 | 0.44 | 30.6 |
|  |  | Desalination ratio R3 [%] | 96.3 | 93.5 | 96.2 | 95.4 |

TABLE 3

|  |  |  | Comparative Example 1 | Comparative Example 2 | Comparative Example 3 | Comparative Example 4 |
|---|---|---|---|---|---|---|
| Permeate-side channel member | Constituent resin and composition ratio | Polypropylene (A1) | Low-stereoregularity PP | High-stereoregularity PP | High-stereoregularity PP | Low-stereoregularity PP |
|  |  | Polypropylene (A2) | — | Low-stereoregularity PP | — | — |
|  |  | Additive (B) | Terpene-based hydrogenated resin | Hydrogenated petroleum resin | — | Terpene-based hydrogenated resin |
|  |  | Additive (C) | — | — | — | — |
|  |  | Weight ratio (A1)/(A2)/(B)/(C) | 60/0/40/0 | 10/30/60/0 | 100/0/0/0 | 60/0/40/0 |
|  | Melt viscosity [Pa·sec] |  | 15.5 | 1.3 | 33.1 | 15.5 |
|  | Softening point temperature [°C.] |  | 55 | 95 | 150 | 55 |
|  | Crystallization temperature [°C.] |  | — | 62 | 110 | — |
|  | Half-crystallization time [min] |  | 13 | — | — | 13 |
|  | Mechanical properties | Tensile elongation [%] | 22 | 6 | 2 | 22 |
|  |  | Yield point stress [MPa] (50°C.) | 1.4 | 4.2 | 19.2 | 1.4 |
|  |  | Yield point elongation [%] (50°C.) | 20 | 5 | 2 | 20 |
|  | Height of permeate-side channel member [μm] |  | 304 | 289 | 265 | 304 |
|  | Space between permeate-side channel members [μm] |  | 395 | 407 | 395 | 395 |
| Sealing part | Maximum value of width [mm] |  | 65 | 56 | 56 | 6 |
|  | Minimum value of width [mm] |  | 50 | 35 | 35 | 3 |
|  | Variation coefficient of width [%] |  | 10 | 6 | 6 | 10 |
|  | Difference of projected area (in the lengthwise direction of separation membrane) [%] |  | 17 | 18 | 18 | 18 |
|  | Difference of projected area (in the width direction of separation membrane) [%] |  | 15 | 15 | 15 | 15 |
| Separation membrane | Evaluation of quality and handleability of separation membrane |  | Excellent | Poor | Poor | Excellent |
|  | Evaluation of storage stability of separation membrane |  | Poor | Good | Excellent | Poor |
| Separation membrane element | Initial evaluation | Water production amount P1 [m³/day] | 31.4 | 36.3 | 36.2 | 41.1 |
|  |  | Water production amount ratio P2/P1 | 0.50 | 1.30 | 1.46 | 0.50 |
|  |  | Desalination ratio R1 [%] | 97.3 | 97.5 | 97.4 | 95.3 |
|  | Effective membrane area [m²] |  | 29.3 | 34.1 | 34.0 | 39.3 |
|  | Long-term evaluation | Water production amount P3 [m³/day] | 26.7 | 32.7 | 32.6 | 37.0 |
|  |  | Desalination ratio R3 [%] | 94.2 | 95.5 | 95.2 | 93.1 |

|  |  |  | Comparative Example 5 | Comparative Example 6 | Reference Example 1 | Reference Example 2 |
|---|---|---|---|---|---|---|
| Permeate-side channel member | Constituent resin and composition ratio | Polypropylene (A1) | High-stereoregularity PP | High-stereoregularity PP | Tricot | Tricot |
|  |  | Polypropylene (A2) | Low-stereoregularity PP | — |  |  |
|  |  | Additive (B) | Hydrogenated petroleum resin | — |  |  |
|  |  | Additive (C) | — | — |  |  |
|  |  | Weight ratio (A1)/(A2)/(B)/(C) | 10/30/60/0 | 100/0/0/0 |  |  |
|  | Melt viscosity [Pa·sec] |  | 1.3 | 33.1 | — | — |
|  | Softening point temperature [°C.] |  | 95 | 150 | — | — |
|  | Crystallization temperature [°C.] |  | 62 | 110 | — | — |
|  | Half-crystallization time [min] |  | — | — | — | — |
|  | Mechanical properties | Tensile elongation [%] | 6 | 2 | — | — |
|  |  | Yield point stress [MPa] (50°C.) | 4.2 | 19.2 | — | — |
|  |  | Yield point elongation [%] (50°C.) | 5 | 2 | — | — |
|  | Height of permeate-side channel member [μm] |  | 289 | 265 | — | — |
|  | Space between permeate-side channel members [μm] |  | 407 | 395 | — | — |

TABLE 3-continued

| | | | | | | |
|---|---|---|---|---|---|---|
| Sealing part | Maximum value of width [mm] | | 55 | 14 | 56 | 45 |
| | Minimum value of width [mm] | | 44 | 10 | 35 | 4 |
| | Variation coefficient of width [%] | | 8 | 7 | 6 | 10 |
| | Difference of projected area (in the lengthwise direction of separation membrane) [%] | | 20 | 14 | 18 | 12 |
| | Difference of projected area (in the width direction of separation membrane) [%] | | 15 | 13 | 15 | 19 |
| Separation membrane | Evaluation of quality and handleability of separation membrane | | Poor | Poor | — | — |
| | Evaluation of storage stability of separation membrane | | Good | Excellent | — | — |
| Separation membrane element | Initial evaluation | Water production amount P1 [m³/day] | 36.5 | 0.70 | 36.5 | 0.63 |
| | | Water production amount ratio P2/P1 | 1.30 | 1.46 | 1.43 | 1.43 |
| | | Desalination ratio R1 [%] | 97.7 | 98.2 | 97.8 | 96.5 |
| | Effective membrane area [m²] | | 34.9 | 0.55 | 34.3 | 0.47 |
| | Long-term evaluation | Water production amount P3 [m³/day] | 32.9 | 0.63 | 33.4 | 0.50 |
| | | Desalination ratio R3 [%] | 95.4 | 95.9 | 94.3 | 93.5 |

While the invention has been described in detail and with reference to specific embodiments thereof, it will be apparent to one skilled in the art that various changes and modifications can be made therein without departing from the spirit and scope thereof. It is to be noted that the present application is based on a Japanese patent applications filed on Jan. 31, 2014 (Japanese Patent Applications Nos. 2014-016973 and 2014-017889), and the contents are incorporated herein by reference.

INDUSTRIAL APPLICABILITY

The separation membrane of present invention has sufficient flexibility and heat resistance, and the separation membrane element is able to exhibit good element performances even under a high-temperature and low-pressure operation, and in particular, is able to be suitably used for desalination of city water or brackish water.

DESCRIPTION OF REFERENCE NUMERALS AND SIGNS

1: Separation membrane element
2: Feed-side channel member
3: Separation membrane
30, 30A, 30B: Separation membrane main body
31: Sealing part
311: Sealing part (first sealing part) of outer edge in the winding direction
312: Upstream-side portion of sealing part (second sealing part) of outer edge in the width direction
313: Downstream-side portion of sealing part (second sealing part) of outer edge in the width direction
4, 42 to 46: Permeate-side channel member
5: Envelope-shaped membrane
51: Separation membrane leaf
6: Water collection tube
7: Feed water (raw fluid)
8: Permeated water
9: Concentrated water
10: Adhesive support
11: Substrate
12: Porous supporting layer
13: Separation functional layer
15: Permeate-side flow channel
17: Feed-side face
18: Permeate-side face
19: Sheet
20 to 25: Projection
47: Sheet channel member

The invention claimed is:

1. A separation membrane comprising: a separation membrane main body having a feed-side face and a permeate-side face; and a permeate-side channel member fixed onto the permeate-side face of the separation membrane main body,
  wherein the permeate-side channel member comprises a composition of polypropylene as a main component and the composition satisfies the following requirements (a) to (c) and (d) or (e):
  (a) a softening point temperature that is 60° C. or higher;
  (b) a tensile elongation in a standard state that is 15% or more; and
  (c) a yield point stress under a wet condition at 50° C. that is 2 MPa or more; and
  (d) a crystallization peak temperature as measured with a differential scanning calorimeter (DSC) that is 30° C. or higher; or
  (e) if an exothermic peak based on crystallization cannot be confirmed with DSC, a half-crystallization time at 30° C. that is 10 minutes or less.

2. The separation membrane according to claim 1, wherein the separation membrane main body comprises a substrate, a porous supporting layer formed on the substrate, and a separation functional layer formed on the porous supporting layer.

3. A sheet channel member having projections fixed to a sheet, wherein the projections comprise a composition of polypropylene as a main component and the composition satisfies the following requirements (a) to (c) and (d) or (e):
  (a) a softening point temperature that is 60° C. or higher;
  (b) a tensile elongation in a standard state that is 15% or more; and
  (c) a yield point stress under a wet condition at 50° C. that is 2 MPa or more; and
  (d) a crystallization peak temperature as measured with a differential scanning calorimeter (DSC) that is 30° C. or higher; or (e) if an exothermic peak based on crystallization cannot be confirmed with DSC, a half-crystallization time at 30° C. that is 10 minutes or less.

4. A separation membrane element comprising a water collection tube and an envelope-shaped membrane wound around the water collection tube from an open side of the membrane,
wherein, in the envelope-shaped membrane, the separation membrane(s) according to claim 1 is/are arranged such that the permeate-side faces thereof face to each other, and at least both edges in a width direction on the permeate-side faces of the separation membrane(s) are sealed by sealing parts.

5. A separation membrane element comprising a water collection tube, an envelope-shaped membrane wound around the water collection tube from an open side of the membrane, and the sheet channel member according to claim 3,
wherein, in the envelope-shaped membrane, a separation membrane main body(ies) having a feed-side face and a permeate-side face is/are arranged such that the permeate-side faces thereof face to each other via the sheet channel member, and at least both edges in a width direction on the permeate-side faces are sealed by sealing parts.

6. A separation membrane element comprising a water collection tube, an envelope-shaped membrane wound around the water collection tube from an open side of the membrane, and the sheet channel member according to claim 3,
wherein, in the envelope-shaped membrane, a separation membrane main body(ies) having a feed-side face and a permeate-side face is/are arranged such that the permeate-side faces thereof face to each other via the sheet channel member, and at least both edges in a width direction on the permeate-side faces are sealed by sealing parts.

7. The separation membrane element according to claim 5, wherein the separation membrane main body comprises a substrate, a porous supporting layer formed on the substrate, and a separation functional layer formed on the porous supporting layer.

8. The separation membrane element according to claim 6, wherein the separation membrane main body comprises a substrate, a porous supporting layer formed on the substrate, and a separation functional layer formed on the porous supporting layer.

9. The separation membrane element according to claim 4, wherein the sealing part is formed by an adhesive.

10. The separation membrane element according to claim 4, wherein a projected view of the sealing part includes a plurality of asperities, and a variation coefficient of widths of the asperities is 10% or less.

11. The separation membrane element according to claim 10, wherein a width of the sealing part is 5 mm or more and 60 mm or less.

12. The separation membrane element according to claim 4, wherein when the envelope-shaped membrane is equally bisected so as to be orthogonal to a lengthwise direction thereof, a difference in projected area of the sealing parts provided on the both edges in the width direction of the separation membrane as compared while making a parting line as an axis of symmetry is 15% or less.

13. The separation membrane element according to claim 4, wherein when the envelope-shaped membrane is equally bisected so as to be orthogonal to the width direction thereof, a difference in projected area of the sealing parts as compared while making a parting line as an axis of symmetry is 15% or less.

14. The separation membrane element according to claim 5, wherein the sealing part is formed by an adhesive.

15. The separation membrane element according to claim 5, wherein a projected view of the sealing part includes a plurality of asperities, and a variation coefficient of widths of the asperities is 10% or less.

16. The separation membrane element according to claim 15, wherein a width of the sealing part is 5 mm or more and 60 mm or less.

17. The separation membrane element according to claim 5, wherein when the envelope-shaped membrane is equally bisected so as to be orthogonal to a lengthwise direction thereof, a difference in projected area of the sealing parts provided on the both edges in the width direction of the separation membrane as compared while making a parting line as an axis of symmetry is 15% or less.

18. The separation membrane element according to claim 5, wherein when the envelope-shaped membrane is equally bisected so as to be orthogonal to the width direction thereof, a difference in projected area of the sealing parts as compared while making a parting line as an axis of symmetry is 15% or less.

19. The separation membrane element according to claim 6, wherein the sealing part is formed by an adhesive.

20. The separation membrane element according to claim 6, wherein a projected view of the sealing part includes a plurality of asperities, and a variation coefficient of widths of the asperities is 10% or less.

21. The separation membrane element according to claim 20, wherein a width of the sealing part is 5 mm or more and 60 mm or less.

22. The separation membrane element according to claim 6, wherein when the envelope-shaped membrane is equally bisected so as to be orthogonal to a lengthwise direction thereof, a difference in projected area of the sealing parts provided on the both edges in the width direction of the separation membrane as compared while making a parting line as an axis of symmetry is 15% or less.

23. The separation membrane element according to claim 6, wherein when the envelope-shaped membrane is equally bisected so as to be orthogonal to the width direction thereof, a difference in projected area of the sealing parts as compared while making a parting line as an axis of symmetry is 15% or less.

24. The separation membrane element according to claim 1, wherein the composition constituting the permeate-side channel member satisfies the following requirement (f):
(f) an elongation of the permeate-side channel member at a yield point under a wet condition at 50° C. is 30% or less.

25. The separation membrane element according to claim 3, wherein the composition constituting the permeate-side channel member satisfies the following requirement (f):
(f) an elongation of the projections at a yield point under a wet condition at 50° C. is 30% or less.

* * * * *